United States Patent
Yasui et al.

(10) Patent No.: US 9,169,423 B2
(45) Date of Patent: *Oct. 27, 2015

(54) ADHESIVE OPTICAL FILM, MANUFACTURING METHOD FOR THE SAME AND IMAGE DISPLAY DEVICE USING THE SAME

(71) Applicant: NITTO DENKO CORPORATION, Ibaraki-shi, Osaka (JP)

(72) Inventors: Atsushi Yasui, Ibaraki (JP); Yuusuke Toyama, Ibaraki (JP); Takaaki Ishii, Ibaraki (JP); Masakuni Fujita, Ibaraki (JP); Tomoyuki Kimura, Ibaraki (JP); Masayuki Satake, Ibaraki (JP); Shusaku Goto, Ibaraki (JP); Takeharu Kitagawa, Ibaraki (JP); Minoru Miyatake, Ibaraki (JP); Tomohiro Mori, Ibaraki (JP); Takashi Kamijo, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/156,907

(22) Filed: Jan. 16, 2014

(65) Prior Publication Data
US 2014/0130955 A1    May 15, 2014

Related U.S. Application Data

(62) Division of application No. 13/820,606, filed as application No. PCT/JP2011/067337 on Jul. 28, 2011.

(30) Foreign Application Priority Data

Sep. 3, 2010  (JP) ................................. 2010-198126
Dec. 1, 2010  (JP) ................................. 2010-268471
May 26, 2011 (JP) ................................. 2011-118362

(51) Int. Cl.
G02B 5/30       (2006.01)
B05D 5/00       (2006.01)
C09J 7/02       (2006.01)

(52) U.S. Cl.
CPC ............. *C09J 7/026* (2013.01); *C09J 7/0207* (2013.01); *C09J 7/0217* (2013.01); *C09J 7/0246* (2013.01); *G02B 5/3025* (2013.01); *G02B 5/3033* (2013.01); *Y10T 156/10* (2015.01)

(58) Field of Classification Search
USPC ........ 428/1.5–1.55; 427/162, 163.1; 349/122; 156/331.8
See application file for complete search history.

(56) References Cited

U.S. PATENT DOCUMENTS 7,413,766 B2 * 8/2008 Satake et al. ................. 427/162
2004/0209007 A1 10/2004 Satake et al.
(Continued)

FOREIGN PATENT DOCUMENTS

CN    101290367 A    10/2008
JP    08-240716 A    9/1996
(Continued)

OTHER PUBLICATIONS

U.S. Office Action dated Mar. 7, 2014, issued in related U.S. Appl. No. 13/820,606, (16 pages).
(Continued)

*Primary Examiner* — Carson Gross
(74) *Attorney, Agent, or Firm* — Westerman, Hattori, Daniels & Adrian, LLP

(57) ABSTRACT

A pressure-sensitive adhesive optical film of the invention comprises an optical film and a pressure-sensitive adhesive layer provided on the optical film, wherein the pressure-sensitive adhesive layer has a thickness (μm) standard deviation of 0.12 μm or less. The pressure-sensitive adhesive optical film makes it possible to reduce the problem of visible unevenness caused by a pressure-sensitive adhesive layer.

44 Claims, 8 Drawing Sheets

(56) References Cited

U.S. PATENT DOCUMENTS

| | | | |
|---|---|---|---|
| 2006/0158076 A1 | 7/2006 | Kondou et al. | |
| 2006/0188712 A1* | 8/2006 | Okada et al. | 428/354 |
| 2007/0111888 A1 | 5/2007 | Mito et al. | |
| 2007/0218276 A1 | 9/2007 | Hiramatsu et al. | |
| 2008/0231793 A1 | 9/2008 | Futamura et al. | |
| 2008/0252973 A1 | 10/2008 | Akari et al. | |
| 2009/0023869 A1 | 1/2009 | Shirafuji et al. | |
| 2009/0087650 A1 | 4/2009 | Inoue et al. | |
| 2009/0229733 A1* | 9/2009 | Kishioka et al. | 156/60 |
| 2009/0231519 A1 | 9/2009 | Toyama et al. | |
| 2009/0244710 A1 | 10/2009 | Tsuno et al. | |
| 2009/0323185 A1 | 12/2009 | Goto et al. | |
| 2010/0157206 A1 | 6/2010 | Oka et al. | |
| 2010/0284072 A1* | 11/2010 | Saitou | 359/485 |
| 2012/0305181 A1 | 12/2012 | Nam et al. | |

FOREIGN PATENT DOCUMENTS

| | | | |
|---|---|---|---|
| JP | 09-090125 | A | 4/1997 |
| JP | 2000-338329 | A | 12/2000 |
| JP | 2006-206639 | A | 8/2006 |
| JP | 2007-114449 | A | 5/2007 |
| JP | 2007-197694 | A | 8/2007 |
| JP | 2007-224184 | A | 9/2007 |
| JP | 2007-248871 | A | 9/2007 |
| JP | 2007-277510 | A | 10/2007 |
| JP | 2008-241907 | A | 10/2008 |
| JP | 2008-292751 | A | 12/2008 |
| JP | 2008-302580 | A | 12/2008 |
| JP | 2009-258411 | A | 11/2009 |
| JP | 2010-9007 | A | 1/2010 |
| JP | 2010-33007 | A | 2/2010 |
| JP | 2010-66756 | A | 3/2010 |
| TW | 200500720 | A | 1/2005 |
| TW | 200502594 | | 1/2005 |
| TW | 200600853 | A | 1/2006 |
| TW | 200911536 | A | 3/2009 |
| TW | 201130946 | A1 | 9/2011 |
| WO | 2007/119646 | A1 | 10/2007 |
| WO | 2008/149890 | A1 | 12/2008 |
| WO | 2009/096090 | A1 | 8/2009 |

OTHER PUBLICATIONS

Japanese Office Action dated Jun. 6, 2014, issued in corresponding Japanese Application No. 2012-258813 with English translation (8 pages).
U.S. Final Office Action dated May 5, 2014, issued in related U.S. Appl. No. 13/846,168 (27 pages).
International Search Report of PCT/JP2011/067337, mailing date Oct. 4, 2011.
Taiwanese Office Action dated Feb. 18, 2013, issued in corresponding Taiwanese Patent Application No. 100128721.
Translation of the International Preliminary Report on Patentability (PCT/ISA/237) (6 pages), (PCT/IB/373) (1 page) of International Application No. PCT/JP2011/067337 mailed Apr. 18, 2013 (Form PCT/IB/338) (1 page).
Chinese Office Action dated Jul. 16, 2013, issued in corresponding Chinese Patent Application No. 201180042486.X, with English translation (12 pages).
Non-Final Office Action dated Sep. 3, 2013, issued in U.S. Appl. No. 13/820,606.
US Office Action dated Oct. 24, 2013, issued in U.S. Appl. No. 13/846,168.
Japanese Office Action dated Sep. 20, 2013, issued in corresponding Japanese Patent Application No. 2012-258813 with English translation (7 pages).
Office Action dated Oct. 30, 2014, issued in corresponding Chinese Patent Application No. 201310180210.9, with English Translation (18 pages).
Office Action dated Oct. 27, 2014, issued in corresponding Taiwanese Patent Application No. 101146712, with English Translation (14 pages).
Notification of Reasons for Refusal dated Dec. 19, 2014, issued in Japanese Application No. 2012-127266, w/ English translation. (8 pages).
Office Action dated Jul. 28, 2015, issued in counterpart Japanese application No. 2012-127266 (w/English translation) (6 pages).
Office Action dated Aug. 21, 2015, issued in counterpart Chinese application No. 201310180210.9 (w/English translation) (11 pages).

* cited by examiner

Fig. 13

| | STRETCHING METHOD | SUBSTRATE | MAXIMUM STRETCHING RATIO (STRETCHING RATIO JUST BEFORE BREAKING) | STRETCHING TEMPERATURE (°C) | TRANSMITTANCE (%) | POLARIZATION RATE (%) |
|---|---|---|---|---|---|---|
| REFERENCE PRODUCTION EXAMPLE 1 | WET | NON-CRYSTALLIZED POLYETHYLENE TEREPHTHALATE (PET) GLASS-TRANSITION TEMPERATURE 80°C | 5.0 | 60 | 42.4 | 99.95 |
| REFERENCE PRODUCTION EXAMPLE 2 | WET | POLYMETHYL PENTENE (PMP) GLASS-TRANSITION TEMPERATURE 30°C | 5.5 | 60 | 42.5 | 99.99 |
| REFERENCE COMPARATIVE EXAMPLE 1 | DRY | NON-CRYSTALLIZED POLYETHYLENE TEREPHTHALATE (PET) GLASS-TRANSITION TEMPERATURE 80°C | 4.0 | 110 | 42.4 | 99.00 |
| REFERENCE COMPARATIVE EXAMPLE 2 | DRY | NON-CRYSTALLIZED POLYETHYLENE TEREPHTHALATE (PET) GLASS-TRANSITION TEMPERATURE 80°C | 4.5 | 90 | 42.5 | 96.10 |

Fig.14

|  | SINGLE LAYER TRANSMITTANCE (%) | POLARIZATION RATE (%) |
|---|---|---|
| REFERENCE PRODUCTION EXAMPLE 1 | 40.1 | 99.99 |
|  | 41.4 | 99.99 |
|  | 42.2 | 99.96 |
|  | 42.4 | 99.95 |
| REFERENCE PRODUCTION EXAMPLE 2 | 41.6 | 99.99 |
|  | 42.1 | 99.99 |
|  | 42.5 | 99.99 |
|  | 42.8 | 99.96 |

|  | SINGLE LAYER TRANSMITTANCE (%) | POLARIZATION RATE (%) |
|---|---|---|
| REFERENCE COMPARATIVE EXAMPLE 1 | 40.5 | 99.96 |
|  | 41.0 | 99.79 |
|  | 42.1 | 99.57 |
|  | 42.4 | 99.00 |
| REFERENCE COMPARATIVE EXAMPLE 2 | 40.9 | 98.44 |
|  | 42.0 | 97.18 |
|  | 42.5 | 96.10 |
|  | 43.6 | 94.48 |

ADHESIVE OPTICAL FILM, MANUFACTURING METHOD FOR THE SAME AND IMAGE DISPLAY DEVICE USING THE SAME

CROSS-REFERENCE TO RELATED APPLICATIONS

This application is a Divisional of U.S. patent application Ser. No. 13/820,606, filed Mar. 4, 2013, which in turn is a U.S. National Stage entry of International Patent Application No. PCT/JP2011/067337, filed Jul. 28, 2011, which is based on and claims priority to Japanese Patent Application No. 2010-198126, filed Sep. 3, 2010, Japanese Patent Application No. 2010-268471, filed Dec. 1, 2010, and Japanese Patent Application No. 2011-118362, filed May 26, 2011, the entirety of each of which is incorporated herein by reference.

TECHNICAL FIELD

The invention relates to a pressure-sensitive adhesive optical film and a producing method thereof. The invention also relates to an image display such as a liquid crystal display, an organic electroluminescence (EL) display, a cathode-ray tube (CRT), or a plasma display panel (PDP) produced using the pressure-sensitive adhesive optical film and to a part used together with an image display, such as a front face plate, produced using the pressure-sensitive adhesive optical film. Examples of the optical film that may be used include a polarizing plate, a retardation plate, an optical compensation film, a brightness enhancement film, a surface treatment film such as an anti-reflection film, and a laminate of any combination thereof.

The pressure-sensitive adhesive optical film may be a pressure-sensitive adhesive polarizing plate including a polarizing plate as the optical film. Such a pressure-sensitive adhesive polarizing plate may be provided on the viewer side in an image display such as a liquid crystal display or an organic electroluminescent (EL) display. In particular, such a pressure-sensitive adhesive polarizing plate is preferably provided as what is called an upper-side pressure-sensitive adhesive polarizing plate on the viewer side of a liquid crystal cell in a liquid crystal display. The upper-side pressure-sensitive adhesive polarizing plate used in the liquid crystal display is bonded to the liquid crystal cell with the pressure-sensitive adhesive layer interposed therebetween.

DESCRIPTION OF THE RELATED ART

Liquid crystal displays, organic EL displays, etc. have an image-forming mechanism including polarizing elements as essential components. For example, therefore, in a liquid crystal display, polarizing elements are essentially placed on both sides of a liquid crystal cell, and generally, polarizing plates which include a polarizer and a transparent protective film bonded on one side or both sides of the polarizer are attached as the polarizing elements. Besides polarizing plates, various optical elements have been used in display panels such as liquid crystal panels and organic EL panels for improving display quality. Front face plates are also used to protect image displays such as liquid crystal displays, organic EL displays, CRTs, and PDPs or to provide a high-grade appearance or a differentiated design. Examples of parts used in image displays such as liquid crystal displays and organic EL displays or parts used together with image displays, such as front face plates, include retardation plates for preventing discoloration, viewing angle-widening films for improving the viewing angle of liquid crystal displays, brightness enhancement films for increasing the contrast of displays, and surface treatment films such as hard-coat films for use in imparting scratch resistance to surfaces, antiglare treatment films for preventing glare on image displays, and anti-reflection films such as anti-reflective films and low-reflective films. These films are generically called optical films.

A display panel such as the liquid crystal panel or the organic EL panel is used in a liquid crystal display or an organic EL display for clocks, cellular phones, personal digital assistants (PDAs), note PCs, PC monitors, DVD players, TVs, etc. A liquid crystal panel has polarizing plates as optical films provided on both sides of a liquid crystal cell (upper side: viewer side, lower side: side opposite to the viewer side or backlight side) according to the display mechanism of a liquid crystal display. A common polarizing plate includes a polarizer and a transparent protective film or films provided on one or both sides of the polarizer. In recent years, display panels such as liquid crystal panels and organic EL panels have been required to have more improved display characteristics, such as higher brightness, higher definition, and lower reflection. Optical films for use in display panels such liquid crystal panels and organic EL panels have also been required to have a higher level of appearance.

When such optical films are bonded to a display panel such as a liquid crystal cell or an organic EL panel or bonded to a front face plate, a pressure-sensitive adhesive is generally used. In the process of bonding an optical film to a display panel such as a liquid crystal cell or an organic EL panel or to a front face plate or bonding optical films together generally reduce optical loss. Therefore, a pressure-sensitive adhesive is used to bond the materials together. In such a case, a pressure-sensitive adhesive optical film including an optical film and a pressure-sensitive adhesive layer previously formed on one side of the optical film is generally used, because it has some advantages such as no need for a drying process to fix the optical film.

It is proposed that the surface state of the pressure-sensitive adhesive layer should be controlled from various aspects. For example, it is proposed that the standard deviation for variations in the thickness of a pressure-sensitive adhesive layer provided on a polarizing plate or the like should be reduced so that durability in a high-temperature or high-temperature, high-humidity environment can be improved (Patent Document 1). It is also proposed that the surface roughness of a pressure-sensitive adhesive layer should be controlled so that unevenness of the pressure-sensitive adhesive can be reduced and that visibility can be improved (Patent Document 2).

PRIOR ART DOCUMENTS

Patent Documents

Patent Document 1: JP-A-09-90125
Patent Document 2: JP-A-2008-302580

DISCLOSURE OF THE INVENTION

Problems to be Solved by the Invention

Patent Documents 1 and 2 propose that the surface state of a pressure-sensitive adhesive layer should be controlled. Unfortunately, Patent Document 1 does not disclose any specific process for forming a pressure-sensitive adhesive layer, although it discloses that a solvent casting method can be used to form a pressure-sensitive adhesive layer with a small standard deviation. The disclosure in Patent Document 1 cannot make it possible to form a pressure-sensitive adhesive layer with a substantially small standard deviation. Patent Document 2 discloses controlling the surface roughness of a pressure-sensitive adhesive layer, but does not disclose that variations in the thickness of a pressure-sensitive adhesive layer are controlled to be small.

In a conventional upper-side polarizing plate, the viewer side of a polarizer is provided with a transparent protective film having undergone an antiglare treatment for providing a high haze value. Thus, any irregularities on the polarizing plate or the pressure-sensitive adhesive layer are not clearly visible as unevenness because the antiglare treated transparent protective film has a high haze value.

On the other hand, in recent years, liquid crystal display s, specifically, liquid crystal panels for TVs, note PCs, or PC monitors, have been desired to have a brightness-enhanced uppermost surface, what is called a clear high-grade appearance. Such a clear-type liquid crystal display is produced using a front face plate such as a glass or acrylic plate, which is placed to form the uppermost surface of the liquid crystal display. Unfortunately, the use of the front faceplate undesirably increases cost and weight. When the clear-type liquid crystal display is produced, the transparent protective film used on the viewer side of the polarizer in the upper side polarizing plate has not undergone an antiglare treatment or has undergone an antiglare treatment for providing a low haze value. However, when such a transparent protective film having undergone no antiglare treatment or a low-haze-value antiglare treatment is used, irregularities on the polarizing plate or the pressure-sensitive adhesive layer are made visible by reflection, which would otherwise be invisible if a conventional transparent protective film with a high haze value is used.

There also have been an increasing number of liquid crystal display models having a front face plate or a touch panel on the viewer side. In such a structure, a pressure-sensitive adhesive layer-carrying surface treatment film is sometimes bonded to the front face plate or the touch panel in order to suppress a reduction in visibility caused by reflection at the interface between the air layer and the front face plate or the touch panel. Unfortunately, as described above, the conventional pressure-sensitive adhesive optical film has relatively large surface irregularities due to variations in the thickness of the optical film and the pressure-sensitive adhesive layer. In recent years, as a surface treatment for a low-haze clear appearance becomes a main stream, a problem has arisen in which a clear appearance is degraded due to irregularities on a pressure-sensitive adhesive layer and an optical film. Thus, a pressure-sensitive adhesive layer-carrying surface treatment film also has been required to have a smooth pressure-sensitive adhesive layer with no irregularities.

It is an object of the invention to provide a pressure-sensitive adhesive optical film that includes an optical film and a pressure-sensitive adhesive layer and makes it possible to reduce the problem of visible unevenness caused by a pressure-sensitive adhesive layer, and to provide a method for producing such a pressure-sensitive adhesive optical film.

It is another object of the invention to provide a pressure-sensitive adhesive polarizing plate as the pressure-sensitive adhesive optical film, which includes a polarizing plate and a pressure-sensitive adhesive layer, has a clear high-grade appearance, and makes it possible to reduce the problem of visible unevenness caused by a pressure-sensitive adhesive polarizing plate, and to provide a method for producing such a pressure-sensitive adhesive polarizing plate.

It is further object of the invention is to provide an image display including the pressure-sensitive adhesive optical film.

Means for Solving the Problems

As a result of earnest studies to solve the above problems, the inventors have accomplished the invention based on the finding the pressure-sensitive adhesive optical film etc., described below can solve the problems.

The invention relates to a pressure-sensitive adhesive optical film, comprising an optical film and a pressure-sensitive adhesive layer provided on the optical film, wherein the pressure-sensitive adhesive layer has a thickness (μm) standard deviation of 0.12 μm or less.

In the pressure-sensitive adhesive optical film, the optical film is mentioned a polarizing plate comprising a polarizer and a first transparent protective film provided on one side of the polarizer or first and second transparent protective films provided on both sides of the polarizer (hereinafter, the pressure-sensitive adhesive optical film using the polarizing plate as the optical film is called a pressure-sensitive adhesive polarizing plate), the first transparent protective film has a haze value of 15% or less, and the pressure-sensitive adhesive layer is provided on a side of the polarizing plate opposite to a side where the first transparent protective film is provided.

In the pressure-sensitive adhesive polarizing plate, the first transparent protective film preferably has a thickness of 60 μm or less.

In the pressure-sensitive adhesive polarizing plate, the polarizing plate preferably has first and second transparent protective films on both sides of the polarizer, and at least one of the first and second transparent protective films has a thickness of 60 μm or less.

In the pressure-sensitive adhesive polarizing plate, the polarizer preferably has a thickness of 10 μm or less.

In the pressure-sensitive adhesive optical film, the optical film may be a retardation plate. The retardation plate preferably has a thickness of 60 μm or less.

In the pressure-sensitive adhesive optical film, the optical film preferably has a haze value of 15% or less. The optical film is preferably used as intended to be bonded to a front face plate or a touch panel.

The optical film, which has a haze value of 15% or less, preferably has a thickness of 60 μm or less. The optical film, which has a haze value of 15% or less, is preferably a surface treatment film.

The invention also relates to a method for producing the pressure-sensitive adhesive optical film comprising an optical film and a pressure-sensitive adhesive layer provided on the optical film, the method comprising the steps of:

(1A) applying a pressure-sensitive adhesive coating liquid with a viscosity Y (P) to the optical film to form a coating with a thickness X (μm); and (2A) drying the applied pressure-sensitive adhesive coating liquid to form a pressure-sensitive adhesive layer, wherein the viscosity Y of the pressure-sensitive adhesive coating liquid and the thickness X of the coating satisfy the relation $0.8X-Y \le 68$.

The invention also relates to a method for producing the pressure-sensitive adhesive optical film comprising an optical film and a pressure-sensitive adhesive layer provided on the optical film, the method comprising the steps of:

(1B) applying a pressure-sensitive adhesive coating liquid with a viscosity Y (P) to a release film to form a coating with a thickness X (μm);

(2B) drying the applied pressure-sensitive adhesive coating liquid to form a pressure-sensitive adhesive layer; and (3) bonding the pressure-sensitive adhesive layer, which is formed on the release film, to the optical film, wherein the viscosity Y of the pressure-sensitive adhesive coating liquid and the thickness X of the coating satisfy the relation 0.8X−Y≤68.

In the method for producing the pressure-sensitive adhesive optical film, the pressure-sensitive adhesive coating liquid preferably has a viscosity Y (P) of 2 to 160 P, and the coating has a thickness X (μm) of 20 to 250 μm.

The invention also relates to a pressure-sensitive adhesive optical film, comprising at least two optical films and at least two pressure-sensitive adhesive layers alternately laminated, wherein at least one of the pressure-sensitive adhesive layers has a thickness (μm) standard deviation of 0.12 μm or less (hereinafter, the pressure-sensitive adhesive optical film is called a laminated pressure-sensitive adhesive polarizing plate).

In the laminated pressure-sensitive adhesive optical film, each of the at least two pressure-sensitive adhesive layers preferably has a thickness (μm) standard deviation of 0.12 μm or less.

In the laminated pressure-sensitive adhesive optical film, one of the optical films is mentioned a polarizing plate comprising a polarizer and a first transparent protective film provided on one side of the polarizer or first and second transparent protective films provided on both sides of the polarizer (hereinafter, the laminated pressure-sensitive adhesive optical film using the polarizing plate as one of the optical film is called a laminated pressure-sensitive adhesive polarizing plate), the first transparent protective film has a haze value of 15% or less, and the pressure-sensitive adhesive layer is provided on a side of the polarizing plate opposite to a side where the first transparent protective film is provided.

In the laminated pressure-sensitive adhesive polarizing plate, the first transparent protective film preferably has a thickness of 60 μm or less.

In the laminated pressure-sensitive adhesive polarizing plate, the polarizing plate preferably has first and second transparent protective films on both sides of the polarizer, and at least one of the first and second transparent protective films has a thickness of 60 μm or less.

In the laminated pressure-sensitive adhesive polarizing plate, the polarizer preferably has a thickness of 10 μm or less.

In the laminated pressure-sensitive adhesive optical film, preferably, one of the optical films is a polarizing plate comprising a polarizer and a first transparent protective film provided on one side of the polarizer or first and second transparent protective films provided on both sides of the polarizer, the first transparent protective film has a haze value of 15% or less, the pressure-sensitive adhesive layer is provided on a side of the polarizing plate opposite to a side where the first transparent protective film is provided, and at least one of the other optical film or films is a retardation plate. The retardation plate preferably has a thickness of 60 μm or less.

The invention also relates to an image display, comprising at least one piece of the pressure-sensitive adhesive optical film (or the laminated pressure-sensitive adhesive optical film).

Effects of the Invention

In the pressure-sensitive adhesive optical film (or the laminated pressure-sensitive adhesive optical film) of the invention, the thickness (μm) of the pressure-sensitive adhesive layer is controlled to have a standard deviation of 0.12 μm or less. Thus, the pressure-sensitive adhesive layer is highly smooth and has a very low level of irregularities in thickness. Surface irregularities of a pressure-sensitive adhesive optical film are caused by variations in the thickness of its pressure-sensitive adhesive layer and its optical film. The pressure-sensitive adhesive optical film of the invention makes it possible to reduce unevenness caused by irregularities on the optical film and the pressure-sensitive adhesive layer.

The invention is based on the finding that irregularities in the thickness of a pressure-sensitive adhesive layer are caused by flowing of a pressure-sensitive adhesive coating liquid during drying. Thus, increasing the viscosity Y of a pressure-sensitive adhesive coating liquid or decreasing the coating thickness X of the pressure-sensitive adhesive coating liquid makes it possible to reduce flowing of the pressure-sensitive adhesive coating liquid, and forming a pressure-sensitive adhesive layer in such a manner that the thickness X and the viscosity Y satisfy the specified relation enables irregularities in the thickness of the pressure-sensitive adhesive layer to be controlled to a low level.

The pressure-sensitive adhesive optical film (or the laminated pressure-sensitive adhesive optical film) may be a pressure-sensitive adhesive polarizing plate (or a laminated pressure-sensitive adhesive polarizing plate). In this case, the pressure-sensitive adhesive polarizing plate (or laminated pressure-sensitive adhesive polarizing plate) may have a transparent protective film with a haze value of 15% or less for forming the uppermost surface of an image display such as a liquid crystal display or an organic EL display (a transparent protective film for forming the uppermost surface of an upper-side polarizing plate in a liquid crystal display), so that an image display, such as a liquid crystal display or an organic EL display, having a clear high-grade appearance can be provided without using any front face plate. In the pressure-sensitive adhesive polarizing plate, the thickness (μm) of the pressure-sensitive adhesive layer is controlled to have a standard deviation of 0.12 μm or less. Thus, the pressure-sensitive adhesive layer is highly smooth and has a very low level of irregularities in thickness. The use of the pressure-sensitive adhesive polarizing plate of the invention makes it possible to prevent visible unevenness, which would otherwise be caused by irregularities on a pressure-sensitive adhesive polarizing plate, and to impart a clear high-grade appearance to an image display such as a liquid crystal display.

The optical film (e.g., a surface treatment film) used in the pressure-sensitive adhesive optical film may have a haze of 15% or less. In this case, the pressure-sensitive adhesive optical film may be bonded to a front face plate, so that the front face plate can provide a clear high-grade appearance, while the pressure-sensitive adhesive layer with a controlled standard deviation of 0.12 μm or less provides no visible irregularities-induced unevenness, which makes it possible to impart a clear high-grade appearance to an image display such as a liquid crystal display or an organic EL display.

BRIEF DESCRIPTION OF THE DRAWINGS

FIG. 13 shows a table for a comparison between the optical properties of the thin high-performance polarizing films of reference production examples and the films of reference comparative examples.

FIG. 14 shows tables of the T/P values of the thin high-performance polarizing films of reference production examples and the films of reference comparative examples.

MODE FOR CARRYING OUT THE INVENTION

Figure 1:
FIG. 1 is a cross-sectional view showing an example of the pressure-sensitive adhesive optical film of the invention.

Hereinafter, the pressure-sensitive adhesive optical film of the invention is described with reference to the drawings. As shown in FIG. 1, the pressure-sensitive adhesive optical film includes an optical film 1 and a pressure-sensitive adhesive layer 2 provided on the optical film 1. The pressure-sensitive adhesive layer 2 has a thickness (μm) standard deviation of 0.12 μm or less. The optical film 1 may be any of various optical films such as a polarizing plate, a retardation plate, an optical compensation film, a brightness enhancement film, and a surface treatment film such as an anti-reflection film. FIGS. 2 to 10 illustrate different modes of the optical film.

Figure 2:
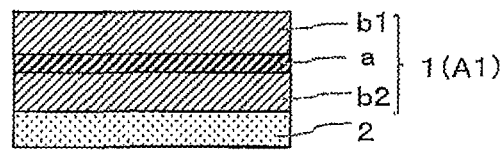
FIG. 2 is a cross-sectional view showing an example of the pressure-sensitive adhesive optical film of the invention.
Figure 3:
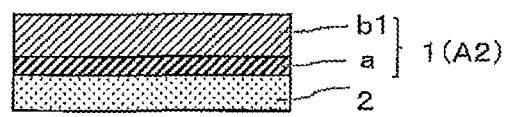
FIG. 3 is a cross-sectional view showing an example of the pressure-sensitive adhesive optical film of the invention.

FIGS. 2 and 3 show cases where the pressure-sensitive adhesive optical film of the invention is a pressure-sensitive adhesive polarizing plate. The pressure-sensitive adhesive polarizing plate includes a polarizing plate A1 or A2, which corresponds to the optical film 1, and a pressure-sensitive adhesive layer 2 provided on the polarizing plate A1 or A2. In a liquid crystal display, the pressure-sensitive adhesive polarizing plate is disposed on the viewer side of a liquid crystal cell with the pressure-sensitive adhesive layer 2 interposed therebetween. The polarizing plate A1 or A2 includes a polarizer (a) and a first transparent protective film (b1) provided on one side of the polarizer (a) or first and second transparent protective films (b1) and (b2) provided on both sides of the polarizer (a). In the case of FIG. 2, the polarizing plate A1 has a first transparent protective film (b1) on only one side of the polarizer (a). In the case of FIG. 3, the polarizing plate A2 has first and second transparent protective films (b1) and (b2) on both sides of the polarizer (a). The polarizing plate A1 or A2 has at least the first transparent protective film (b1), and the first transparent protective film (b1) side corresponds to the uppermost surface in an image display such as a liquid crystal display and an organic EL display. In FIGS. 2 and 3, the pressure-sensitive adhesive layer 2 is provided on a side of the polarizing plate A1 or A2 opposite to its side where the first transparent protective film (b1) is provided. Specifically, when a first transparent protective film 1b is provided on only one side of the polarizer (a) as shown in FIG. 2, the pressure-sensitive adhesive layer 1b is provided on the polarizer (a), and when first and second transparent protective films (b1) and (b2) are provided on both sides of the polarizer (a), the pressure-sensitive adhesive layer 2 is provided on the second transparent protective film (b2).

Figure 4:
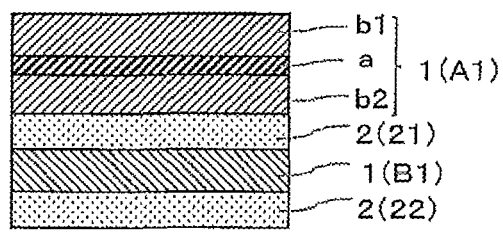
FIG. 4 is a cross-sectional view showing an example of the laminated pressure-sensitive adhesive optical film of the invention.
Figure 5:
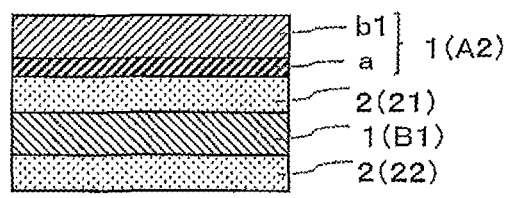
FIG. 5 is a cross-sectional view showing an example of the laminated pressure-sensitive adhesive optical film of the invention.
Figure 6:
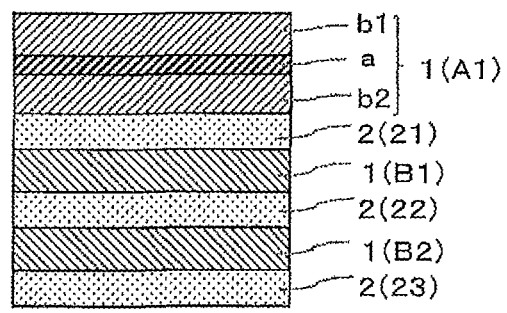
FIG. 6 is a cross-sectional view showing an example of the laminated pressure-sensitive adhesive optical film of the invention.
Figure 7:
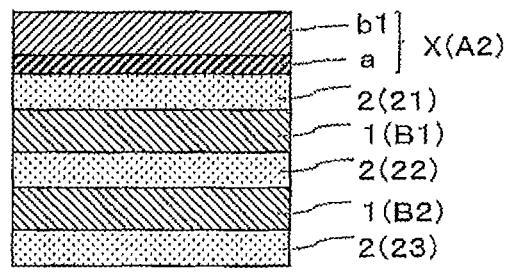
FIG. 7 is a cross-sectional view showing an example of the laminated pressure-sensitive adhesive optical film of the invention.

FIGS. 4 to 7 each show a laminated pressure-sensitive adhesive optical film in which at least two optical films 1 and at least two pressure-sensitive adhesive layers 2 are alternately laminated. In FIGS. 4 to 7, a retardation plate B, which corresponds to the optical film 1, is placed on the pressure-sensitive adhesive layer 2 of the pressure-sensitive adhesive polarizing plate of FIG. 2 or 3, and another pressure-sensitive adhesive layer 2 is provided on the retardation plate B. In FIG. 4, a first pressure-sensitive adhesive layer 21, a first retardation plate B1, and a second pressure-sensitive adhesive layer 22 are provided in this order on the second transparent protective film (b2) of the polarizing plate A1 of FIG. 2. In FIG. 6, a second retardation plate B2 and a third pressure-sensitive adhesive layer 23 are further provided in this order on the second pressure-sensitive adhesive layer 22. In FIG. 5, a first pressure-sensitive adhesive layer 21, a first retardation plate B1, and a second pressure-sensitive adhesive layer 22 are provided in this order on the polarizer (a) of the polarizing plate A2 of FIG. 3. In FIG. 6, a second retardation plate B2 and a third pressure-sensitive adhesive layer 23 are further provided in this order on the second pressure-sensitive adhesive layer 22. In the laminated pressure-sensitive adhesive optical film, at least one pressure-sensitive adhesive layer 2 has a thickness (μm) standard deviation of 0.12 μm or less. Preferably, each pressure-sensitive adhesive layer 2 has a thickness (μm) standard deviation of 0.12 μm or less.

Figure 8:
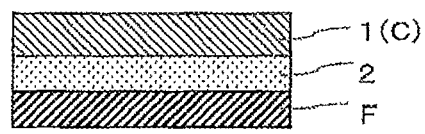
FIG. 8 is a cross-sectional view showing an example of how to use the pressure-sensitive adhesive optical film of the invention.
Figure 9:
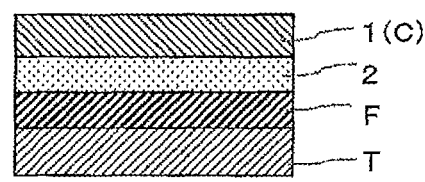
FIG. 9 is a cross-sectional view showing an example of how to use the pressure-sensitive adhesive optical film of the invention.
Figure 10:
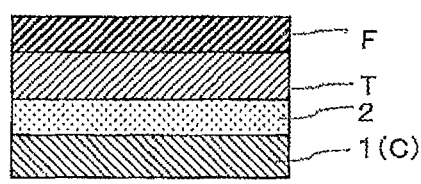
FIG. 10 is a cross-sectional view showing an example of how to use the pressure-sensitive adhesive optical film of the invention.

FIGS. 8 to 10 show modes of the use of a pressure-sensitive adhesive surface treatment film having a surface treatment film C, which is used as the optical film 1 in the pressure-sensitive adhesive optical film of the invention. The surface treatment film C includes a base film whose one side is surface-treated. In the pressure-sensitive adhesive surface treatment film, the pressure-sensitive adhesive layer 2 is provided on the non-surface-treated side of the base film. FIG. 8 shows a mode where the pressure-sensitive adhesive layer 2 of the pressure-sensitive adhesive surface treatment film is bonded to a front face plate F. FIG. 9 shows a case where a touch panel T is further provided on the front face plate T in the mode of FIG. 8. FIG. 10 shows a mode where the pressure-sensitive adhesive layer 2 of the pressure-sensitive adhesive surface treatment film is bonded to a touch panel T. In FIG. 10, a front face plate F is further provided on the touch panel T. In all cases shown in FIGS. 8 to 10, the pressure-sensitive adhesive surface treatment film C is bonded to the front face plate F, the touch panel T, or the like in such a manner that the surface treatment film C forms the surface on one side. The pressure-sensitive adhesive surface treatment film C bonded to the front face plate F, the touch panel T, or the like is placed on the viewer side of an image display such as a liquid crystal display and an organic EL display. It may be bonded in such a manner that the surface treatment film C side is located on the image display side or on the uppermost surface side opposite to the image display side.

A polarizer, which is applied to the invention, is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol-based film, partially formalized polyvinyl alcohol-based film, and ethylene-vinyl acetate copolymer-based partially saponified film; poly-ene-based alignment films, such as dehydrated polyvinyl alcohol and dehydrochlorinated polyvinyl chloride, etc. may be mentioned. In these, a polyvinyl alcohol-based film on which dichromatic materials such as iodine, is absorbed and aligned after stretched is suitably used. Although thickness of polarizer is not especially limited, the thickness of about 80 μm or less is commonly adopted. The thickness is preferably from 10 to 50 μm, more preferably from 15 to 30 μm.

A polarizer that is uniaxially stretched after a polyvinyl alcohol-based film dyed with iodine is obtained by stretching a polyvinyl alcohol-based film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol-based film may be dipped in water and rinsed if needed. By rinsing polyvinyl alcohol-based film with water, effect of preventing un-uniformity, such as unevenness of dyeing, is expected by making polyvinyl alcohol-based film swelled in addition that also soils and blocking inhibitors on the polyvinyl alcohol-based film surface may be cleaned off. Stretching may be applied after dyed with iodine or may be applied concurrently, or conversely dyeing with iodine may be applied after stretching. Stretching is applicable in aqueous solutions, such as boric acid and potassium iodide, and in water bath.

A thin polarizer with a thickness of 10 μm or less may also be used. In view of thinning, the thickness is preferably from 1 to 7 μm. Such a thin polarizer is less uneven in thickness, has good visibility, and is less dimensionally-variable and therefore has high durability. It is also preferred because it can form a thinner polarizing film.

Typical examples of such a thin polarizer include the thin polarizing films disclosed in JP-A No. 51-069644, JP-A No. 2000-338329, WO2010/100917, specification of PCT/JP2010/001460, specification of Japanese Patent Application No. 2010-269002, or specification of Japanese Patent Application No. 2010-263692. These thin polarizing films can be obtained by a process including the processes of stretching a laminate of a polyvinyl alcohol-based resin (hereinafter also referred to as PVA-based resin) layer and a stretchable resin substrate and dyeing the laminate. Using this process, the PVA-type resin layer, even when thin, can be stretched without problems such as breakage, which would otherwise be caused by stretching of the layer supported on a stretchable resin substrate.

Among processes including the processes of stretching and dyeing a laminate, a process capable of high-ratio stretching to improve polarizing performance is preferably used to obtain the thin polarizing film. Therefore, the thin polarizing film is preferably obtained by a process including the step of stretching in an aqueous boric acid solution as disclosed in WO2010/100917, the specification of PCT/JP2010/001460, the specification of Japanese Patent Application No. 2010-269002, or the specification of Japanese Patent Application No. 2010-263692, in particular, preferably obtained by a process including the step of performing auxiliary in-air stretching before stretching in an aqueous boric acid solution as disclosed in the specification of Japanese Patent Application No. 2010-269002 or the specification of Japanese Patent Application or 2010-263692.

The specification of PCT/JP2010/001460 discloses a thin high-performance polarizing film that is formed integrally with a resin substrate, made of a PVA-based resin containing an oriented dichroic material, and has a thickness of 7 μm or less and the optical properties of a single transmittance of 42.0% or more and a polarization rate of 99.95% or more.

The thin high-performance polarizing film described in PCT/JP2010/001460 is preferably used as the thin polarizer.

The thin high-performance polarizing film includes a polyvinyl alcohol-based resin (hereinafter also referred to as "PVA-based resin") with a thickness of 7 μm or less, which is formed integrally with a resin substrate and contains an oriented dichroic material. The thin high-performance polarizing film has the optical properties of a single transmittance of 42.0% or more and a polarization rate of 99.95% or more. The thickness is preferably from 2 to 6 μm.

This thin high-performance polarizing film can be produced by a process including forming a PVA-based resin coating on a resin substrate with a thickness of at least 20 μm, drying the coating to form a PVA-type resin layer, immersing the resulting PVA-type resin layer in a dyeing liquid containing a dichroic material to absorb the dichroic material to the PVA-type resin layer, and stretching the PVA-type resin layer, which contains the absorbed dichroic material, together with the resin substrate in an aqueous boric acid solution to a total stretch ratio of 5 times or more the original length.

A laminate film having a thin high-performance polarizing film containing an oriented dichroic material can be produced by a method including the processes of: coating a PVA-based resin-containing aqueous solution to one side of a resin substrate with a thickness of at least 20 μm, drying the coating to form a PVA-type resin layer so that a laminate film including the resin substrate and the PVA-type resin layer formed thereon is produced; immersing the laminate film in a dyeing liquid containing a dichroic material to absorb the dichroic material to the PVA-type resin layer in the laminate film, wherein the laminate film includes the resin substrate and the PVA-type resin layer formed on one side of the resin substrate; and stretching the laminate film, which has the PVA-type resin layer containing the absorbed dichroic material, in an aqueous boric acid solution to a total stretch ratio of 5 times or more the original length, wherein the PVA-type resin layer containing the absorbed dichroic material is stretched together with the resin substrate, so that a laminate film including the resin substrate and a thin high-performance polarizing film formed on one side of the resin substrate is produced, in which the thin high-performance polarizing film is made of the PVA-type resin layer containing the oriented dichroic material and has a thickness of 7 μm or less and the optical properties of a single transmittance of 42.0% or more and a polarization rate of 99.95% or more.

Herein, background art related to optical properties should be summarized. In brief, the optical properties of polarizing films suitable for use in large displays can be expressed using degree P of polarization and single transmittance T. The performance of a polarizing film is usually expressed by a T-P graph plotted with degree P of polarization and single transmittance T, which are two optical characteristic values in trade-off relationship.

Figure 16:
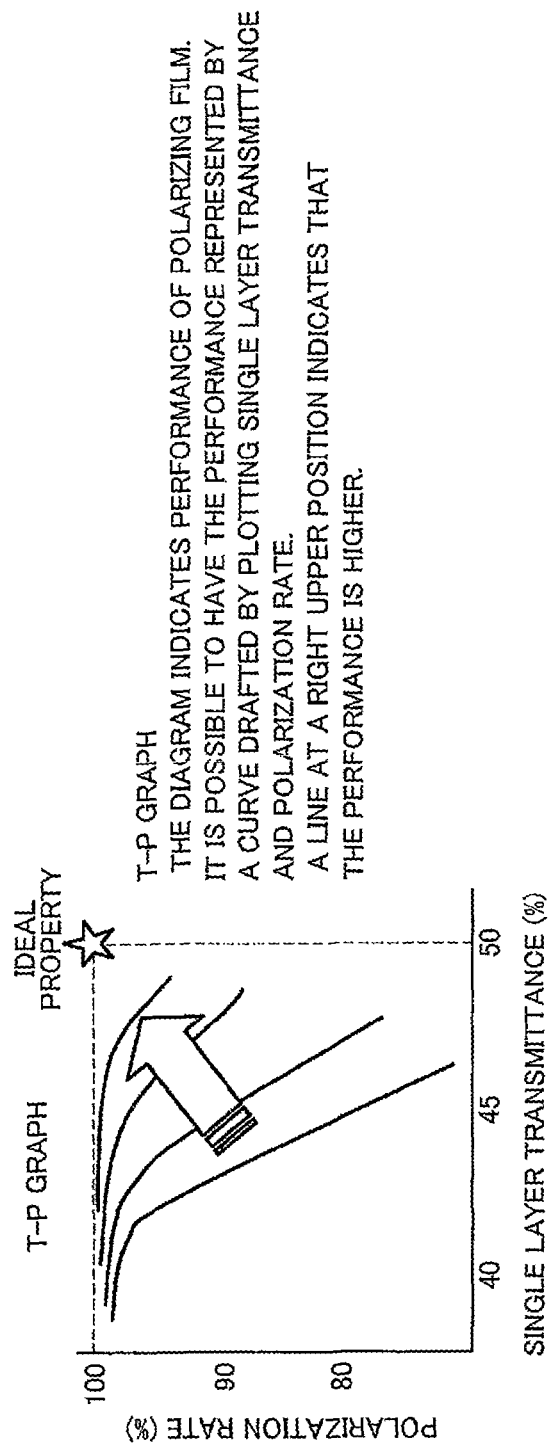
FIG. 16 is a schematic T-P graph for thin high-performance polarizing films.

Refer to the schematic graph of FIG. 16. T=50% and P=100% are ideal properties. When the T value is low, it is easy to increase the value, and when the T value is high, it is difficult to increase the value. Thus, a degree P of polarization of 99.95% or more and a single transmittance T of 42.0% or more are optical properties desired now or in the future for the performance of a polarizing film for use in a large display or any other device, while such properties have not been achieved yet. It should be noted that while ideal properties are T=50% and P=100%, light is partially reflected at the interface between a polarizing film and air when passing through the polarizing film. Taking this reflection phenomenon into account, the transmittance is reduced by the part of the reflection, and thus the practically achievable maximum T value would be from about 45 to 46%.

The degree P of polarization can indicate the contrast ratio (CR) of a polarizing film or a display. A degree P of polarization of 99.95% corresponds to a CR of 2,000:1 for a polarizing film, which corresponds to a CR of 1,050:1 for a display produced using such a polarizing film and a common commercially-available liquid crystal television cell. In any case, the larger CR means the higher display contrast and the higher visibility. As described below, the CR of a polarizing film is a value obtained by dividing the parallel transmittance by the cross transmittance. The CR of a display is a value obtained by dividing the maximum brightness by the minimum brightness. The minimum brightness is defined as the level of brightness when black is displayed, which is required to be 0.5 cd/m$^2$ or less for a liquid crystal television intended to be used in a common audio-visual environment. If it exceeds this value, color reproducibility can decrease. The maximum brightness is defined as the level of brightness when white is displayed, which is in the range of 450 to 550 cd/cm$^2$ for a liquid crystal television intended to be used in a common audio-visual environment. If it is less than the range, visibility can decrease.

It is thus thought that liquid crystal televisions usually need to have a CR of 1,000:1 or more. On the other hand, a polarizing film needs to have a CR of 2,000:1 or more in view of depolarization in a liquid crystal cell. This corresponds to a degree P of polarization of 99.95% or more.

Polarizing films generally used in liquid crystal televisions have a single transmittance T of 42.0% or more. The brightness L of a display can be relatively low when a polarizing film with a single transmittance T of less than 42.0% is used. For example, when the brightness L of a display produced using a polarizing film with T=42.0% is normalized as 100, a display produced using a polarizing film with T=40.0% has a brightness L of 90. This means that to ensure a display brightness L of 100 at T=42.0%, the lighting energy of a light source during use must be increased by 10% in a display produced using a polarizing film with T=40.0%. In view of the light source used in the display, this suggests that the display brightness L must be increased by increasing the brightness L of the light source itself in order for the display to be equivalent to that produced using a polarizing film with a single transmittance T of 42.0%.

The use of the thin high-performance polarizing film and the method for production thereof make it possible to provide a thin polarizing film with a high level of optical properties.

Conventional methods for producing a thin polarizing film need to perform dry stretching using a stretching machine in a heating apparatus such as an oven. It is difficult for dry stretching to stretch a laminate of a resin substrate and a PVA-type resin layer to 5 times or more its original length because crystallization of the resin substrate and the PVA-type resin layer formed thereon proceeds in the process. This crystallization phenomenon similarly occurs when a thick polarizing film is produced by dry-stretching a monolayer material. Dichroic materials cannot be sufficiently oriented due to the crystallization of the PVA-type resin layer and the limitation on stretch ratio. This was a first technical problem.

As a matter of course, so far there has been developed no thin polarizing film having optical properties comparable to those of a thick polarizing film produced through wet stretching. PVA-based resin is a hydrophilic polymer composition, which is highly soluble in water. It has been a problem how to make a thin PVA-type resin layer insoluble in an aqueous solution, how to highly orient an adsorbed dichroic material by high-ratio stretching, and, thus, how to achieve a thin polarizing film with a high level of optical properties.

A thin PVA-type resin layer formed on a resin substrate by applying an aqueous solution of a PVA-based resin thereto and drying it can be stretched to a high ratio (5 times or more) together with the resin substrate in an aqueous boric acid solution at a low temperature (65° C. or less). More specifically, in an aqueous boric acid solution at a low temperature (65° C. or less), a thin PVA-type resin layer formed on a resin substrate can be insolubilized by a crosslinking reaction, and then the insolubilized thin PVA-type resin layer can be stretched to 5 times or more together with the resin substrate.

Figure 15:
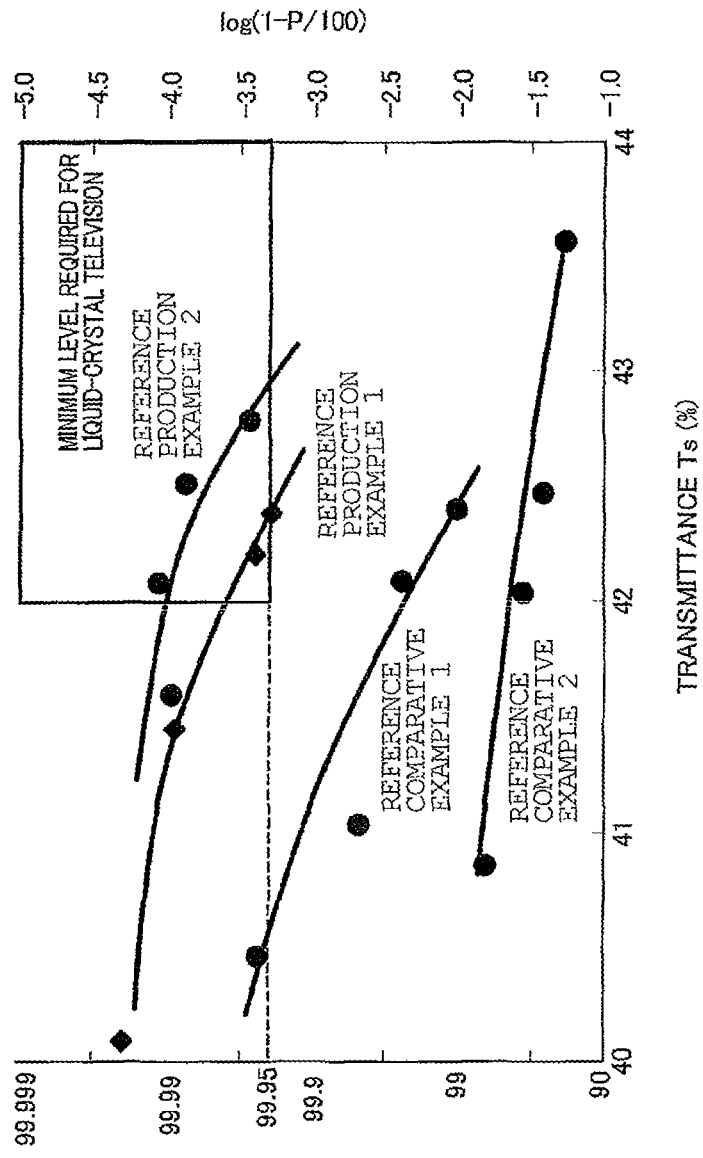
FIG. 15 is a T-P graph based on the T/P values of the thin high-performance polarizing films of reference production examples and the films of reference comparative examples.

Surprisingly, it has also been found that since water molecules play a role as a plasticizer, a thin PVA-type resin layer can be stretched to a high ratio together with a resin substrate even in an aqueous boric acid solution at a temperature lower than the glass transition temperature of the resin substrate. Based on this finding, a PVA-based resin can be stretched to a high ratio while crystallization of the resin is suppressed, so that a thin polarizing film containing a dichroic material oriented and adsorbed sufficiently, what is called a thin high-performance polarizing film, can be obtained for use in a large display, as shown in Reference Production Examples 1 and 2 where the thin high-performance polarizing films of FIG. 14 or 15 are produced. The thin high-performance polarizing film, processes used in the method for production thereof, and the effects of the processes are described below.

(a) Effect of Stretching in an Aqueous Boric Acid Solution at Low Temperature (65° C. or Less)

In order to stretch a thin PVA-based resin film with a thickness of a few ten μm or less to a high ratio in an aqueous solution, the PVA-based resin film must stand the tension applied during the stretching, even when formed on a resin substrate with a thickness of 20 μm or more, and must have water resistance so as to be insoluble in water during the stretching. Thus, the PVA-based resin film must be insolubilized.

Boric acid produces tetrahydroxyborate anions in an aqueous solution as shown in the following formula.

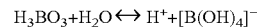

It can be hypothesized that the tetrahydroxyborate anions form hydrogen bonds with the hydroxy groups of a vinyl alcohol-based polymer to crosslink the vinyl alcohol-based polymer. The state shown in Chemical Formula (1) can be provided as a hypothetical model for the crosslinked state (in Chemical Formula (1), dotted lines represent crosslinks. The crosslinkage insolubilizes the vinyl alcohol-based polymer.

[Chemical Formula 1]

(1)

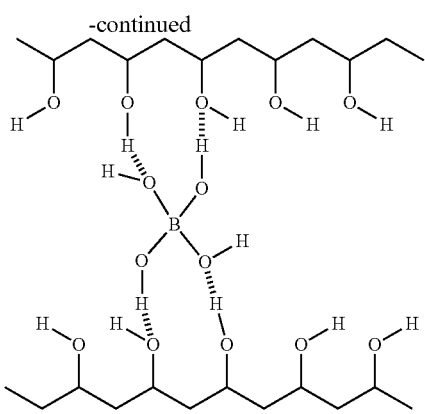

When a PVA-based resin is stretched in an aqueous boric acid solution, the PVA-type resin layer is successfully insolubilized, so that it can be stretched to a high stretch ratio of 5 times or more.

(b) Effect of High-Ratio Stretching

Figure 12:
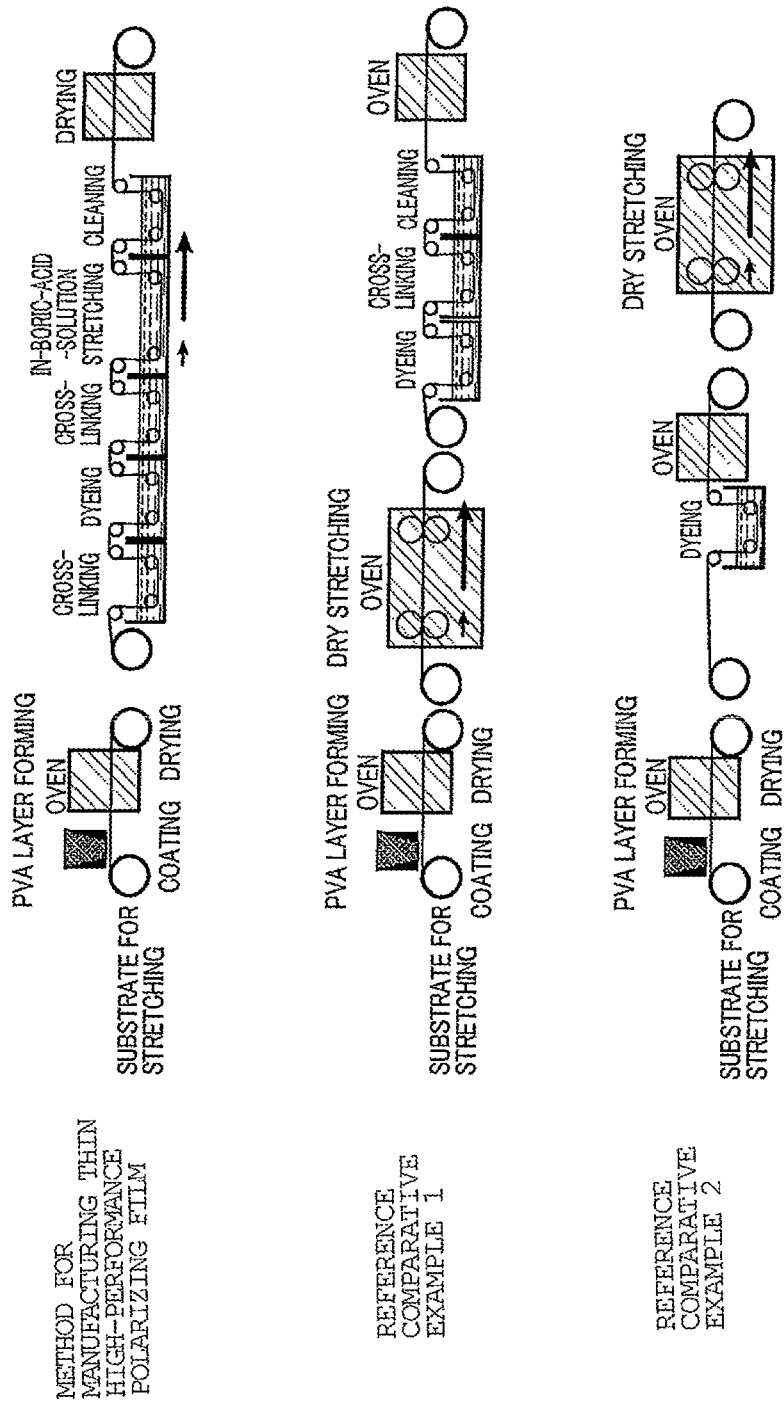
FIG. 12 is a schematic diagram showing a process of producing a thin high-performance polarizing film and processes including dry stretching.

In FIG. 12, Reference Comparative Examples 1 and 2 for thin high-performance polarizing films show conventional processes that include subjecting a thin PVA-based resin to dry stretching together with a resin substrate. It is difficult for such conventional processes to make a thin polarizing film having the optical properties of a single transmittance of 42.0% or more and a polarization rate of 99.95% or more. This is because of the use of a stretching method called "dry stretching". It is difficult for dry stretching to achieve stretching at a temperature lower than the glass transition temperature of the resin substrate to be stretched. It usually leads to breaking of the resin substrate being stretched. Even if the resin substrate was stretched, it would not be uniformly stretched. Thus, dry stretching is usually performed at a temperature higher than the glass transition temperature of the resin substrate to be stretched. To perform stretching at a low temperature of 65° C. or less, it is necessary to select a resin substrate with a glass transition temperature of 65° C. or less as the object to be stretched.

The relationship between the glass transition temperature and the stretching temperature also applies to the PVA-type resin layer. A common PVA-based resin has a glass transition temperature of about 80° C., and it is difficult for dry stretching to achieve uniform, high-ratio stretching at a temperature lower than the glass transition temperature. In addition, if dry stretching is performed regardless of temperature, the PVA-based resin will be crystallized by the stretching, which makes it difficult to stretch the object including the resin substrate to a total stretch ratio of 5 times or more the original length. It is also conceivable that a higher order structure (larger structure) non-contributable to the orientation, such as a lamellar structure or a spherulite, is formed in the PVA-based resin, so that a dichroic material cannot be sufficiently adsorbed or highly oriented. These seem to be the reason why thin polarizing films obtained by conventional processes have a low level of optical properties.

A discussion is given of the method shown in FIG. 12 for producing a thin high-performance polarizing film. For example, a thin PVA-based resin formed on a resin substrate is stretched in an aqueous boric acid solution at 65° C. or less. The resin substrate is a composition having a glass transition temperature of 65° C. or more, preferably, a resin substrate made of an amorphous ester- or olefin-based thermoplastic resin. Thanks to the function of water molecules as a plasticizer, the resin substrate can be stretched even at 65° C. or less even when it has a glass transition temperature of 65° C. or more. Water molecules also function as a plasticizer for the PVA-based resin. Thus, the thin PVA-based resin can be stretched together with the resin substrate in an aqueous boric acid solution at 65° C. or less.

This makes it possible to stretch the thin PVA-based resin to a high ratio of 5 times or more while crystallization of the PVA-based resin is prevented. It is thus concluded that the amorphous part of the thin PVA-based resin can be highly oriented. The high-ratio stretching also makes it possible to align a dichroic material in the PVA-based resin, such as a polyiodide ion complex, highly in a single direction. As a result, a thin polarizing film with a high level of optical properties, what is called a thin high-performance polarizing film, is obtained.

Embodiments of the thin high-performance polarizing film are described below.

A first embodiment is directed to a thin high-performance polarizing film with a thickness of 7 μm or less, which is formed integrally with a resin substrate, made of a PVA-based resin containing an oriented dichroic material, and has the optical properties of a single transmittance of 42.0% or more and a polarization rate of 99.95% or more. Refer to the table of FIG. 13. This shows successful development of thin high-performance polarizing films that make it possible to form thinner display s, to eliminate display unevenness, and to reduce energy consumption, and have optical properties close to the ideal properties shown in the T-P graph of FIG. 16, which have been considered to be difficult to achieve. The optical properties are comparable to those achieved by thick polarizing films.

In the first embodiment, the resin substrate is made of an ester- or olefin-based thermoplastic resin having a water absorption of 0.50% or more and a glass transition temperature in the range of 25° C. to 85° C. Specifically, the resin substrate is an ester-based resin film such as an amorphous polyethylene terephthalate film (A-PET film). The resin substrate is preferably made of a transparent resin when it is used as an optically functional film to protect one side of the thin high-performance polarizing film. The dichroic material adsorbed to and oriented in the thin high-performance polarizing film may be any of iodine, an organic dye, or a mixture thereof.

A second embodiment is directed to a method for producing, on a resin substrate, a thin high-performance polarizing film with a thickness of 7 μm or less made of a PVA-based resin containing an oriented dichroic material, and having the optical properties of a single transmittance of 42.0% or more and a polarization rate of 99.95% or more. Specifically, the manufacturing method first includes the processes of applying a PVA-based resin aqueous solution to a resin substrate with a thickness of at least 20 μm and drying the applied solution to form a PVA-type resin layer. Also in the second embodiment, the resin substrate is made of an ester- or olefin-based thermoplastic resin having a water absorption of 0.50% or more and a glass transition temperature in the range of 25° C. to 85° C. as in the first embodiment. The resin substrate is preferably made of a transparent resin when it is used as an optically functional film to protect one side of the thin high-performance polarizing film.

The manufacturing method then includes the process of immersing the formed PVA-type resin layer in a dyeing solution containing a dichroic material to adsorb the dichroic material to the PVA-type resin layer. As in the first embodiment, the dichroic material may be any of iodine, an organic dye, or a mixture thereof. In the dyeing solution, the dichroic material at 0.1 wt % to 4.5 wt % in the aqueous solution is adsorbed into the PVA-type resin layer by immersion for 5 to 60 seconds. When iodine is used as the dichroic material, it is more preferred that an iodide should be further added to the solution, so that the dissolution of iodine can be enhanced and the dyeing efficiency can be further increased.

The effect of the elution of the hydrophilic PVA-based resin into the aqueous solution in the dyeing process is a non-negligible technical problem in the production of a thin polarizing film, while it is negligible in the production of a thick polarizing film. It is important to prevent the PVA-based resin from being eluted into the aqueous solution during the dyeing. If the dyeing process is performed in a short time, the elution will be negligible. In some cases, however, the elution can also affect the finished quality of the polarizing film. It is effective to previously subject the PVA-type resin layer to an insolubilization treatment before the PVA-type resin layer formed on the resin substrate is immersed in the dyeing solution. A method of immersing the PVA-type resin layer in an aqueous boric acid solution at room temperature enables the insolubilization of the PVA-type resin layer.

The manufacturing method further includes the process of stretching the PVA-type resin layer, which contains the adsorbed dichroic material, together with the resin substrate in an aqueous boric acid solution. If the PVA-type resin layer is eluted into an aqueous solution and decreases in thickness during stretching, it will be difficult to stretch the PVA-type resin layer to a total stretch ratio of 5 times or more, namely, to stretch the PVA-type resin layer to 5 times or more its original length. However, high-ratio stretching of the PVA-type resin layer containing an adsorbed dichroic material is achieved in an aqueous boric acid solution, where effective crosslinking with boric acid and insolubilization are possible at the same time, so that the performance of the orientation is successfully increased.

As already pointed out, "dry stretching" cannot achieve a total stretch ratio of 5 times or more the original length in the production of a thin polarizing film. In order to prevent crystallization of the PVA-type resin layer during the stretching, it is preferred that a resin substrate capable of being stretched to a high ratio even at a temperature lower than the glass transition temperature of the resin substrate should be selected for the use of an aqueous boric acid solution at a low temperature of 65° C. or less.

As shown in the table of FIG. 13, a thin high-performance polarizing film with a thickness of 7 μm or less made of a PVA-based resin containing an oriented dichroic material, and having the optical properties of a single transmittance of 42.0% or more and a polarization rate of 99.95% or more can be produced on a resin substrate through these processes.

Another resin film may be placed on the other side of the resin substrate, opposite to its side where the thin high-performance polarizing film is formed integrally with the resin substrate, with an adhesive interposed therebetween, and the thin high-performance polarizing film may be transferred to the other resin film by peeling off it from the resin substrate. An optically functional film may be used as the resin film for the transfer, so that the optically functional film can be provided on one side of the produced thin high-performance polarizing film. A second optically functional film may also be placed on the other side of the thin high-performance polarizing film, opposite to the side where the optically functional film has been formed, with an adhesive interposed therebetween. Thus, the produced thin high-performance polarizing film has both sides covered with the optically functional films.

A third embodiment is directed to a method for producing a laminate film including a thin high-performance polarizing film containing an oriented dichroic material. More specifically, the third embodiment is directed to a method for producing a laminate film including a resin substrate and a thin high-performance polarizing film with a thickness of 7 μm or less formed on one side of the resin substrate, made of a PVA-type resin layer containing an oriented dichroic material, and having the optical properties of a single transmittance of 42.0% or more and a polarization rate of 99.95% or more, which includes the processes described below.

The manufacturing method includes the manufacturing process of a laminate film including a resin substrate with a thickness of at least 20 μm and a PVA-type resin layer formed by applying a PVA-based resin-containing aqueous solution to one side of the resin substrate and drying the applied solution. Also in the third embodiment, the resin substrate is made of an ester- or olefin-based thermoplastic resin having a water absorption of 0.50% or more and a glass transition temperature in the range of 25° C. to 85° C. as in the first and the second embodiments. The resin substrate is preferably made of a transparent resin when it is used as an optically functional film to protect one side of the thin high-performance polarizing film.

The manufacturing method includes the process of immersing the laminate film, which includes the resin substrate and the PVA-type resin layer formed on one side of the resin substrate, in a dyeing solution containing a dichroic material to adsorb the dichroic material to the PVA-type resin layer of the laminate film. As in the first and second embodiments, the dichroic material may be any of iodine, an organic dye, or a mixture thereof. In the dyeing solution, the dichroic material at 0.1 wt % to 4.5 wt % in the aqueous solution is adsorbed into the PVA-type resin layer by immersion for 5 to 60 seconds as in the second embodiment. When iodine is used as the dichroic material, it is more preferred that an iodide should be further added to the solution, so that the dissolution of iodine can be enhanced and the dyeing efficiency can be further increased. It is more preferred that before the PVA-type resin layer of the laminate film is immersed in the dyeing solution containing a dichroic material, the PVA-type resin layer should be insolubilized by immersing the laminate film in an aqueous boric acid solution at room temperature in advance.

The manufacturing method further includes the process of stretching the laminate film, which has the PVA-type resin layer containing the adsorbed dichroic material, in an aqueous boric acid solution. As pointed out with respect to the second embodiment, if the PVA-type resin layer is eluted into an aqueous solution and decreases in thickness together with the resin substrate during stretching, it will be difficult to stretch the PVA-type resin layer of the laminate film to a total stretch ratio of 5 times or more, namely, to stretch the PVA-type resin layer to 5 times or more its original length. However, high-ratio stretching of the PVA-type resin layer, which is formed integrally with the resin substrate and contains the adsorbed dichroic material, is achieved in an aqueous boric acid solution, where effective crosslinking with boric acid and insolubilization are possible at the same time, so that the performance of the orientation of the dichroic material is successfully increased.

In order to prevent crystallization of the PVA-type resin layer during the stretching of the laminate film, it is preferred that a resin substrate capable of being stretched to a high ratio even at a temperature lower than the glass transition temperature of the resin substrate of the laminate film should be selected for the stretching of the laminate film in an aqueous boric acid solution at a low temperature of 65° C. or less.

As shown in the table of FIG. 13, a laminate film including a resin substrate and a thin high-performance polarizing film with a thickness of 7 μm or less formed on one side of the resin substrate, made of a PVA-type resin layer containing an oriented dichroic material, and having the optical properties of a single transmittance of 42.0% or more and a polarization rate of 99.95% or more is produced through these processes.

The manufacturing method may include the process of cleaning the produced laminate film, which has the thin high-performance polarizing film made of the PVA-based resin containing the oriented dichroic material, with an iodide salt-containing aqueous solution at a temperature lower than the glass transition temperature of the resin substrate of the laminate film. The manufacturing method may further include the process of drying the cleaned laminate film at a temperature of 50° C. to 100° C.

The manufacturing method may further include the process of placing an optically functional film on the other side of the thin high-performance polarizing film, which is formed on one side of the resin substrate film in the dried laminate film, with an adhesive interposed therebetween, so that the produced thin high-performance polarizing film has both sides covered with the optically functional films. Alternatively, another resin film may be placed on the other side of the resin substrate of the dried laminate film, opposite to its side where the thin high-performance polarizing film is formed, with an adhesive interposed therebetween, and the thin high-performance polarizing film may be transferred to the other resin film by peeling off it from the resin substrate, so that the produced thin high-performance polarizing film has one side covered with an optically functional film made of the resin film used for the transfer.

[Outline of the Process of Producing Thin High-Performance Polarizing Film]

Figure 11:
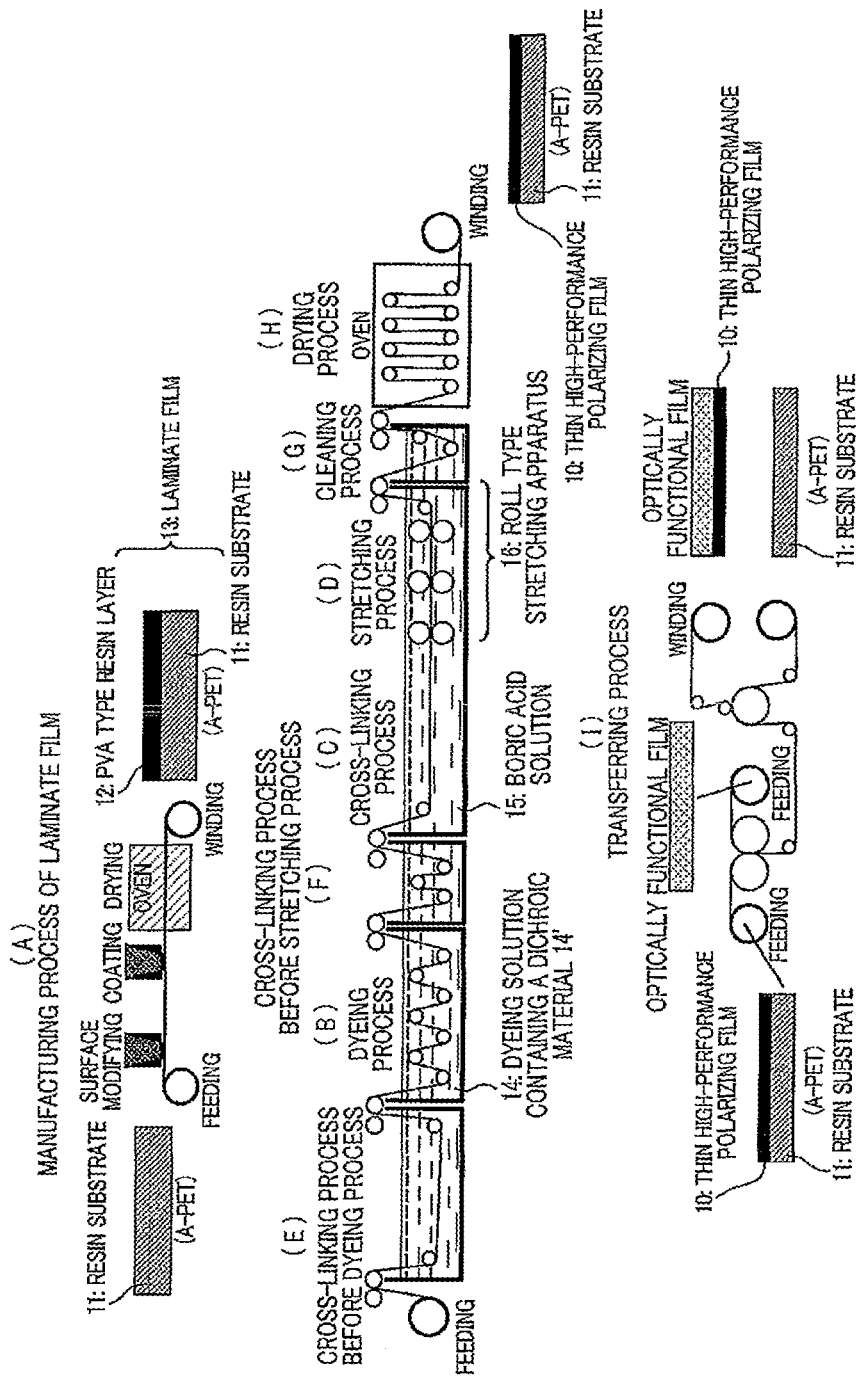
FIG. 11 is a schematic diagram showing a process of producing a thin high-performance polarizing film.

The production of the thin high-performance polarizing film 10 is described on the basis of Reference Production Example 1. As shown in FIG. 11, for example, the resin substrate 11 used is an amorphous polyethylene terephthalate film with a glass transition temperature of 80° C. The resin substrate 11 can support one side of the thin high-performance polarizing film 10. Before stretched, the resin substrate 11 may preferably have a thickness in the range of 20 μm to 500 μm. The resin substrate 11 may be made of a hydrophobic resin non-swellable and insoluble in water so that it can be prevented from being dyed with a dichroic material 14'. Specifically, such a resin does not have a dissociable group such as a carboxyl, sulfonic acid, or quaternary amino group, or a nonionic hydrophilic group such as a hydroxyl or amide group.

The resin substrate 11 is typically an ester-based resin film or an olefin-based resin film, preferably an amorphous polyethylene terephthalate film. A crystallized polyethylene terephthalate film, which usually has a high elastic modulus, is difficult to stretch at low temperature. In contrast, an amorphous polyethylene terephthalate film can be stretched even at low temperature. The surface of the resin substrate may be subjected to a surface modificating treatment such as a corona treatment so that it can have improved adhesion to the PVA-type resin layer 12. An adhesive layer may also be provided. The resin substrate 11 preferably has a water absorption (JIS K 7209) of 0.3% or more, and more preferably 0.5% or more. The resin substrate preferably has a glass transition temperature (JIS K 7121, DSC method) of 85° C. or less, and more preferably 25° C. to 85° C. A resin film with such physical properties can be stretched to a high ratio even in an aqueous boric acid solution at 65° C. or less.

A laminate film 13 including the resin substrate 11 and the PVA-type resin layer 12 is produced by a process (A).

In the producing process (A), a film roll is first provided, which includes the resin substrate 11 with a thickness of 100 μm. An aqueous solution containing 3 to 10 parts by weight of a PVA-based resin and 100 parts by weight of a solvent is then provided. The resin substrate 11 is drawn from the provided film roll, and the aqueous solution of the PVA-based resin is applied to the resin substrate. A PVA-type resin layer 12 with a thickness of 10 μm is formed on the resin substrate 11 by drying in an oven at 60° C. The resulting laminate film 13 in the form of a continuous web may be wound into a roll. The laminate film 13 is then processed by a series of processes as described below.

First, a dyeing process (B) is performed. This process includes immersing the laminate film 13 in a dyeing solution 14 to adsorb a dichroic material 14' to the PVA-type resin layer 12. Water is usually used as the solvent in the dyeing solution 14. The dichroic material 14' is generally used in an amount of 0.1 to 4.3 parts by weight (0.1 to 4.5 wt %) based on 100 parts by weight of the solvent composed mainly of water. For example, the dichroic material 14' may be iodine, an organic dye, or a mixture thereof. These dichroic materials may be used alone or in combination of two or more.

When iodine is used as the dichroic material 14', it is preferred that an iodide should be further added to the solution, so that the dissolution of iodine can be enhanced and the dyeing efficiency can be further increased. Based on 100 parts by weight of the solvent, the iodide is preferably used in an amount of 0.02 to 20 parts by weight, and more preferably 0.1 to 10 parts by weight. Examples of the iodide include potassium iodide, lithium iodide, sodium iodide, zinc iodide, aluminum iodide, lead iodide, copper iodide, barium iodide, calcium iodide, tin iodide, titanium iodide, etc. In particular, potassium iodide is preferably added. The immersion time in the dyeing solution 14 is generally, but not limited to, about 5 seconds to about 5 minutes. The temperature of the dyeing solution 14 is generally from about 20 to about 50° C.

In the dyeing process (B), the laminate film 13 was immersed in the dyeing solution 14 containing iodine and potassium iodide at a temperature of 30° C. for 30 seconds. In this process, iodide was adsorbed to the PVA-type resin layer 12. The dyeing solution 14 contained 0.1 parts by weight of iodine, 0.7 parts by weight of potassium iodide, and 100 parts by weight of water.

Subsequently, a crosslinking process (C) is performed together with a stretching process (D). The crosslinking process (C) includes immersing the laminate film 13 in an aqueous boric acid solution 15 to crosslink the PVA-type resin layer 12 containing the adsorbed dichroic material 14'. The crosslinking process (C) also serves as an insolubilization process in which the swelling PVA-based resin is made insoluble in water.

The aqueous boric acid solution 15 is obtained by dissolving boric acid or a borate in water as a solvent. Besides boric acid or a borate, a boron compound such as borax, glyoxal, glutaraldehyde, or the like may be used. In general, 1 to 10 parts by weight of boric acid is used based on 100 parts by weight of water. An iodide for suppressing elution of iodine adsorbed to the PVA-type resin layer 12 is preferably added to the aqueous boric acid solution 15. The concentration of the iodide is preferably from 0.05 to 15% by weight, more preferably from 0.5 to 8% by weight. Examples of the iodide are the same as those in the case of the dyeing process (A). The immersion time in the aqueous boric acid solution 16 is generally, but not limited to, about 15 seconds to about 5 minutes.

The temperature of the aqueous boric acid solution 15 is generally from about 20 to about 70° C.

The PVA-type resin layer 12 containing the adsorbed iodine was stretched together with the resin substrate 11 by means of a roll type stretching apparatus 16 having a plurality of sets of rollers different in circumferential speed, while it was crosslinked in the aqueous boric acid solution 15 containing potassium iodide at a temperature of 60° C. Thus, the crosslinking process (C) is performed together with the stretching process (D). In the stretching process (D), the laminate film 13 was longitudinally and uniaxially stretched to a stretch ratio of 5.0 times. In this process, the aqueous boric acid solution 15 contained 4 parts by weight of boric acid, 5 parts by weight of potassium iodide, and 100 parts by weight of water.

The temperature of the aqueous boric acid solution 15 is preferably 85° C. or less. If it is more than 85° C., elution of iodine adsorbed to the PVA-based resin can be facilitated, and the PVA-based resin can also be eluted, so that the produced thin high-performance polarizing film 10 may have degraded optical properties. In addition, if the PVA-type resin layer 12 is thin, the PVA-type resin layer 12 can be dissolved, so that the optical properties of the resulting thin high-performance polarizing film 10 may be further degraded. The temperature of the aqueous boric acid solution is more preferably from 30° C. to 65° C. If the temperature of the aqueous boric acid solution 15 is less than 30° C., water cannot sufficiently function as a plasticizer, so that the resin substrate 11 and the PVA-type resin layer 12 cannot be sufficiently softened, which makes it difficult to stretch the laminate film 13 to a total stretch ratio of 5 times or more its original length.

In the aqueous boric acid solution 15, the laminate film 13 is preferably stretched to a stretch ratio of 5 times or more, more preferably 5.5 times or more its original length. If the stretch ratio is less than 5 times, the dichroic material 14' cannot be sufficiently oriented, so that the resulting thin high-performance polarizing film 10 can have degraded optical properties. If the stretch ratio is more than 6.5 times, the laminate film 13 will be more likely to rupture, which makes stable production difficult. When single-step stretching is performed, the term "stretch ratio" refers to the stretch ratio in the single-step stretching procedure. When multi-step stretching is performed using a plurality of stretching machines placed in an aqueous solution, the term "stretch ratio" refers to the total of stretch ratios (the total stretch ratio) in the respective steps.

As shown in FIG. 11, the crosslinking process using the aqueous boric acid solution may be performed before the dyeing process (B). In the production of a thick polarizing film, this crosslinking process (E) is unnecessary because elution of PVA-based resin is negligible. However, elution of PVA-based resin into the dyeing solution 14 is not negligible in the production of the thin high-performance polarizing film 10 using the laminate film 13 including the resin substrate 11 and the thin PVA resin layer 12 formed thereon. Thus, performing the crosslinking process (E) before the dyeing process (B) is effective in the production of a thin high-performance polarizing film with a high level of optical properties. A separate crosslinking process (F) using an aqueous boric acid solution may also be performed before the stretching process (D) in the aqueous boric acid solution so that boric acid released during the dyeing process can be supplemented.

After stretched to 5.0 times, the laminate film 13 was taken out of the aqueous boric acid solution 15 and then fed to a cleaning process (G). The cleaning process (G) includes cleaning away unnecessary residues from the laminate film including the thin high-performance polarizing film 10 having undergone various treatments. If this treatment is insufficient, boric acid may precipitate from the thin high-performance polarizing film 10 after the drying of the laminate film. The cleaning may be performed in a cleaning liquid containing potassium iodide so that the PVA resin can be prevented from being dissolved. The concentration of potassium iodide in the cleaning liquid is from about 0.5 to about 10% by weight. The temperature of the cleaning liquid is from about 10 to about 50° C. The immersion time is generally from about 1 second to about 1 minute.

The final process is a drying process (H). The drying process (H) may be performed using any appropriate method such as natural drying, drying by blowing, or drying by heating. In Reference Production Example 1, drying was performed with heated air at 60° C. for 30 seconds.

In the finished laminate film, the PVA-type resin layer 12 stretched together with the resin substrate 11 had a thickness of 3 μm. The thin high-performance polarizing film 10 made of the PVA resin with a thickness of 3 μm containing oriented iodine was successfully formed on the resin substrate 11. This product is the thin high-performance polarizing film 10 of Reference Production Example 1 whose properties are shown in the table of FIG. 13.

The laminate film having the thin high-performance polarizing film 10 formed on the resin substrate 11 may be subjected to a transferring process (I) as shown in FIG. 11. In the transferring process (I), the resin substrate 11 may be released from the thin high-performance polarizing film 10, and the thin high-performance polarizing film 10 may be transferred to any other optically functional film.

The PVA-based resin used to form the thin high-performance polarizing film can be obtained by saponifying a polyvinyl acetate-based resin. The degree of saponification is generally from 85% by mole to 100% by mole, and the degree of polymerization is generally from 1,000 to 10,000. This PVA-based resin is polyvinyl alcohol or an ethylene-vinyl alcohol copolymer.

The produced thin high-performance polarizing film 10 preferably exhibits absorption dichroism at any wavelength in the visible light region (a wavelength of 380 nm to 780 nm). The produced thin high-performance polarizing film 10 has a thickness of 7 μm or less, preferably 0.5 μm to 5 μm. The thin high-performance polarizing film 10 has low shrinkage stress and thus has high dimensional stability even in a high-temperature environment, and also exhibits the optical properties of a single transmittance of 42.0% or more and a polarization rate of 99.95% or more.

REFERENCE PRODUCTION EXAMPLE 1

(Process of Preparing Laminate)

The resin substrate used was an amorphous polyethylene terephthalate film (NOVACLEAR manufactured by Mitsubishi Plastics, Inc.) with a glass transition temperature of 80° C. A laminate film including the resin substrate and a polyvinyl alcohol layer was prepared as follows. First, the resin substrate was provided, which had a thickness of 100 μm. An aqueous solution of polyvinyl alcohol (NH26 manufactured by The Nippon Synthetic Chemical Industry Co., Ltd.) was then applied to the resin substrate. A 12-μm-thick polyvinyl alcohol layer was formed by drying the applied solution at a temperature of 60° C. As a result, a laminate film was obtained.

(Insolubilization Process)

The resulting laminate film was immersed in an aqueous boric acid solution at a temperature of 30° C. for 30 seconds.

The aqueous boric acid solution contained 4 parts by weight of boric acid and 100 parts by weight of water.
(Dyeing Process)

The prepared laminate film was immersed in a dyeing solution containing iodine and potassium iodide at a temperature of 30° C. for a desired period of time in such a manner that a polarizing film with a single transmittance of 40 to 44% could be finally obtained. In this process, iodine was adsorbed to the polyvinyl alcohol layer. The dyeing solution contained 0.1 parts by weight of iodine, 0.7 parts by weight of potassium iodide, and 100 parts by weight of water.
(Crosslinking Process)

The laminate film was then immersed in an aqueous boric acid solution containing boric acid and potassium iodide at a temperature of 30° C. for 30 seconds. The aqueous boric acid solution contained 3 parts by weight of boric acid, 3 parts by weight of potassium iodide, and 100 parts by weight of water.

In an aqueous boric acid solution containing boric acid and potassium iodide at a temperature of 60° C., the laminate film including the resin substrate and the polyvinyl alcohol layer containing the adsorbed iodine was longitudinally and uniaxially stretched to an extent just before breaking point by allowing it to pass through a plurality of sets of rollers different in circumferential speed. In this process, the stretch ratio (maximum stretch ratio) was 5.0 times. The aqueous boric acid solution contained 4 parts by weigh of boric acid, 5 parts by weight of potassium iodide, and 100 parts by weight of water. For this process, the phrases "just before breaking point" and the "maximum stretch ratio" were determined after the breaking stretch ratio was determined in advance. More specifically, the phrases refer to a stretch ratio about 0.2 (times) lower than the breaking stretch ratio determined in advance.
(Cleaning Process)

Subsequently, the laminate film was immersed in an aqueous potassium iodide solution at a temperature of 30° C. for 30 seconds so that the boric acid deposited on the surface was washed off. The aqueous potassium iodide solution contained 3 parts by weight of potassium iodide and 100 parts by weigh of water.

The laminate film, which had been stretched to 5.0 times, was taken out of the aqueous boric acid solution and then dried with heated air at 60° C. The polyvinyl alcohol layer stretched together with the resin substrate had a thickness of 5 μm. Thus, a 5-μm-thick polyvinyl alcohol resin layer containing oriented iodine was obtained on the resin substrate. The product is the thin high-performance polarizing film of Reference Production Example 1 whose properties are shown in the table of FIG. 13.

REFERENCE PRODUCTION EXAMPLE 2

The resin substrate used was a polymethylpentene film (TPX manufactured by Mitsui Chemicals, Inc.) with a glass transition temperature of 30° C. Using a process similar to that of Reference Production Example 1, Reference Production Example 2 was performed in which a laminate film including the resin substrate and a polyvinyl alcohol layer (7 μm in thickness) containing adsorbed iodine was longitudinally and uniaxially stretched to an extent just before breaking point by allowing it to pass through a plurality of sets of rollers different in circumferential speed in an aqueous boric acid solution containing boric acid and potassium iodide at a temperature of 60° C. In this process, the stretch ratio (maximum stretch ratio) was 5.5 times.

As used herein, the phrases "just before breaking point" and the "maximum stretch ratio" mean a stretch ratio about 0.2 (times) lower than the breaking stretch ratio determined in advance as in the case of Reference Production Example 1. As a result, a 3-μm-thick polyvinyl alcohol resin layer containing oriented iodine was obtained on the resin substrate. The product is the thin high-performance polarizing film of Reference Production Example 2 whose properties are shown in the table of FIG. 13.

REFERENCE COMPARATIVE EXAMPLE 1

The resin substrate used was an amorphous polyethylene terephthalate film (NOVACLEAR manufactured by Mitsubishi Plastics, Inc.) with a glass transition temperature of 80° C. A laminate film including the resin substrate with a thickness of 100 μm and a polyvinyl alcohol resin layer with a thickness of 10 μm formed thereon was prepared using the same process as in Reference Production Example 1. Subsequently, the laminate film was longitudinally and uniaxially stretched to an extent just before breaking point in an oven at 110° C. In this process, the stretch ratio (maximum stretch ratio) was 4.0 times. As used herein, the phrases "just before breaking point" and the "maximum stretch ratio" mean a stretch ratio about 0.2 (times) lower than the breaking stretch ratio determined in advance as in the case of Reference Production Example 1.

The stretched laminate film was further immersed in a dyeing solution as in Reference Production Example 1 for a desired period of time in such a manner that a polarizing film with a transmittance of 40 to 44% could be finally obtained. The laminate film taken out of the dyeing solution was dried with heated air at 60° C. The polyvinyl alcohol resin layer stretched together with the resin substrate had a thickness of 4 μm. Thus, a 4-μm-thick polyvinyl alcohol resin layer containing oriented iodine was obtained on the resin substrate. The product is the thin polarizing film of Reference Comparative Example 1 whose properties are shown in the table of FIG. 13.

REFERENCE COMPARATIVE EXAMPLE 2

A laminate film including a 100-μm-thick resin substrate and a 10-μm-thick polyvinyl alcohol resin layer formed thereon was prepared as in Reference Production Example 1. The prepared laminate film was immersed in a dyeing solution as in Reference Production Example 1 for a desired period of time in such a manner that a polarizing film with a transmittance of 40 to 44% could be finally obtained. The laminate film taken out of the dyeing solution was dried with heated air at 60° C. The laminate film containing the adsorbed iodine was longitudinally and uniaxially stretched to an extent just before breaking point in an oven at 90° C. In this process, the stretch ratio (maximum stretch ratio) was 4.5 times. As used herein, the "just before breaking point" and the "maximum stretch ratio" mean a stretch ratio about 0.2 (times) lower than the breaking stretch ratio determined in advance as in the case of Reference Production Example 1.

The polyvinyl alcohol layer stretched together with the resin substrate had a thickness of 4 μm. Thus, a 4-μm-thick polyvinyl alcohol resin layer containing oriented iodine was obtained on the resin substrate. The product is the thin polarizing film of Reference Comparative Example 2 whose properties are shown in the table of FIG. 13.
[Measurement Methods]
[Measurement of Thickness]

The thickness of the resin substrate and the thin polarizing film was measured using a digital micrometer (KC-351C manufactured by ANRITSU CORPORATION).

[Measurement of Transmittance and Polarization Rate]

The single transmittance T, parallel transmittance Tp, and cross transmittance Tc of the thin polarizing film were measured using an ultraviolet-visible spectrometer (V7100 manufactured by JASCO Corporation). The transmittances T, Tp, and Tc are Y values which have undergone luminosity correction in the two-degree visual field (C illuminant) according to JIS Z 8701.

The degree P of polarization was calculated from the following formula, using the transmittances.

Degree $P$ (%) of polarization=$\{(Tp-Tc)/(Tp+Tc)\}^{1/2} \times 100$

The contrast ratio (CR) of the polarizing film was calculated from the following formula.

$CR = Tp/Tc$

The contrast ratio (CR) of the display was calculated from the following formula.

$CR$ = maximum brightness/minimum brightness

The thin polarizing film disclosed in the specification of Japanese Patent Application No. 2010-269002 or the specification of Japanese Patent Application No. 2010-263692 is a polarizing film in the form of a continuous web including a PVA-based resin containing an oriented dichroic material, which is made with a thickness of 10 μm or less by a two-stage stretching process including auxiliary in-air stretching of a laminate and stretching of the laminate in an aqueous boric acid solution, wherein the laminate includes an amorphous ester-based thermoplastic resin substrate and a PVA-type resin layer formed thereon. This thin polarizing film is preferably made to have optical properties satisfying the following requirements: $P > -(10^{0.929T-42.4} - 1) \times 100$ (provided that $T<42.3$) and $P \geq 99.9$ (provided that $T \geq 42.3$), wherein T represents the single transmittance, and P represents the polarization rate.

Specifically, the thin polarizing film can be produced by a thin polarizing film-manufacturing method including the processes of: performing elevated temperature in-air stretching of a PVA-type resin layer, so that a stretched intermediate product including an oriented PVA-type resin layer is produced, wherein the PVA-type resin layer is formed on an amorphous ester-based thermoplastic resin substrate in the form of a continuous web; absorbing a dichroic material (which is preferably iodine or a mixture of iodine and an organic dye) to the stretched intermediate product to produce a colored intermediate product including the PVA-type resin layer in which the dichroic material is oriented; and performing stretching of the colored intermediate product in an aqueous boric acid solution so that a polarizing film with a thickness of 10 μm or less is produced, which includes the PVA-type resin layer containing the oriented dichroic material.

In this manufacturing method, the elevated temperature in-air stretching and the stretching in an aqueous boric acid solution are preferably performed in such a manner that the PVA-type resin layer formed on the amorphous ester-based thermoplastic resin substrate is stretched to a total stretch ratio of 5 times or more. The aqueous boric acid solution preferably has a temperature of 60° C. or more for the stretching therein. Before stretched in the aqueous boric acid solution, the colored intermediate product is preferably subjected to an insolubilization treatment, in which the colored intermediate product is preferably immersed in an aqueous boric acid solution with a temperature of 40° C. or less. The amorphous ester-based thermoplastic resin substrate may be made of amorphous polyethylene terephthalate including co-polyethylene terephthalate in which isophthalic acid, cyclohexanedimethanol, or any other monomer is copolymerized, and is preferably made of a transparent resin. The thickness of the substrate may be at least seven times the thickness of the PVA-type resin layer to be formed. The elevated temperature in-air stretching is preferably performed at a stretch ratio of 3.5 times or less, and the temperature of the elevated temperature in-air stretching is preferably equal to or higher than the glass transition temperature of the PVA-based resin. Specifically, it is preferably in the range of 95° C. to 150° C. When the elevated temperature in-air stretching is end-free uniaxial stretching, the PVA-type resin layer formed on the amorphous ester-based thermoplastic resin substrate is preferably stretched to a total stretch ratio of from 5 to 7.5 times. When the elevated temperature in-air stretching is fixed-end uniaxial stretching, the PVA-type resin layer formed on the amorphous ester-based thermoplastic resin substrate is preferably stretched to a total stretch ratio of from 5 to 8.5 times.

More specifically, the thin polarizing film can be produced by the method described below.

A substrate in the form of a continuous web is prepared, which is made of co-polymerized polyethylene terephthalate (amorphous PET) in which 6 mol % of isophthalic acid is copolymerized. The amorphous PET has a glass transition temperature of 75° C. A laminate of a polyvinyl alcohol (PVA) layer and the amorphous PET substrate in the form of a continuous web is prepared as described below. Incidentally, the glass transition temperature of PVA is 80° C.

A 200 μm thick amorphous PET substrate is provided, and an aqueous 4-5% PVA solution is prepared by dissolving PVA powder with a polymerization degree of 1,000 or more and a saponification degree of 99% or more in water. Subsequently, the aqueous PVA solution is applied to a 200 μm thick amorphous PET substrate and dried at a temperature of 50 to 60° C. so that a laminate composed of the amorphous PET substrate and a 7 μm thick PVA layer formed thereon is obtained.

The laminate having the 7 μm thick PVA layer is subjected to a two-stage stretching process including auxiliary in-air stretching and stretching in an aqueous boric acid solution as described below, so that a thin high-performance polarizing film with a thickness of 3 μm is obtained. At the first stage, the laminate having the 7 μm thick PVA layer is subjected to an auxiliary in-air stretching process so that the layer is stretched together with the amorphous PET substrate to form a stretched laminate having a 5 μm thick PVA layer. Specifically, the stretched laminate is formed by a process including feeding the laminate having the 7 μm thick PVA layer to a stretching apparatus placed in an oven with the stretching temperature environment set at 130° C. and subjecting the laminate to end-free uniaxial stretching to a stretch ratio of 1.8 times. In the stretched laminate, the PVA layer is modified, by the stretching, into a 5 μm thick PVA layer containing oriented PVA molecules.

Subsequently, a dyeing process is performed to produce a colored laminate having a 5 μm thick PVA layer containing oriented PVA molecules and absorbed iodine. Specifically, the colored laminate is produced by immersing the stretched laminate for a certain time period in a dyeing liquid containing iodine and potassium iodide and having a temperature of 30° C. so that iodine can be absorbed to the PVA layer of the stretched laminate and that the PVA layer for finally forming a highly-functional polarizing film can have a single transmittance of 40 to 44%. In this process, the dyeing liquid contains water as a solvent and has an iodine concentration in the range of 0.12 to 0.30% by weight and a potassium iodide concentration in the range of 0.7 to 2.1% by weight. The concentration ratio of iodine to potassium iodide is 1:7. It should be noted that potassium iodide is necessary to make iodine soluble in water. More specifically, the stretched laminate is immersed for 60 seconds in a dyeing liquid containing 0.30% by weight of iodine and 2.1% by weight of potassium iodide, so that a colored laminate is produced, in which the 5 µm thick PVA layer contains oriented PVA molecules and absorbed iodine.

At the second stage, the colored laminate is further subjected to a stretching process in an aqueous boric acid so that the layer is further stretched together with the amorphous PET substrate to form an optical film laminate having a 3 µm thick PVA layer, which forms a highly-functional polarizing film. Specifically, the optical film laminate is formed by a process including feeding the colored laminate to a stretching apparatus placed in a treatment system in which an aqueous boric acid solution containing boric acid and potassium iodide is set in the temperature range of 60 to 85° C. and subjecting the laminate to end-free uniaxial stretching to a stretch ratio of 3.3 times. More specifically, the aqueous boric acid solution has a temperature of 65° C. In the solution, the boric acid content and the potassium iodide content are 4 parts by weight and 5 parts by weight, respectively, based on 100 parts by weight of water. In this process, the colored laminate having a controlled amount of absorbed iodine is first immersed in the aqueous boric acid solution for 5 to 10 seconds. Subsequently, the colored laminate is directly fed between a plurality of pairs of rolls different in peripheral speed, which form the stretching apparatus placed in the treatment system, and subjected to end-free uniaxial stretching for 30 to 90 seconds to a stretch ratio of 3.3 times. This stretching treatment converts the PVA layer of the colored laminate to a 3 µm thick PVA layer in which the absorbed iodine forms a polyiodide ion complex highly oriented in a single direction. This PVA layer forms a highly-functional polarizing film in the optical film laminate.

A cleaning process, which is however not essential for the manufacture of the optical film laminate, is preferably performed, in which the optical film laminate is taken out of the aqueous boric acid solution, and boric acid deposited on the surface of the 3 µm thick PVA layer formed on the amorphous PET substrate is washed off with an aqueous potassium iodide solution. Subsequently, the cleaned optical film laminate is dried in a drying process using warm air at 60° C. It should be noted that the cleaning process is to prevent appearance defects such as boric acid precipitation.

A lamination and/or transfer process, which is also not essential for the manufacture of the optical film laminate, may also be performed, in which an 80 µm thick triacetylcellulose film is laminated to the surface of the 3 µm thick PVA layer formed on the amorphous PET substrate, while an adhesive is applied to the surface, and then the amorphous PET substrate is peeled off, so that the 3 µm thick PVA layer is transferred to the 80 µm thick triacetylcellulose film.

[Other Processes]

The thin polarizing film-manufacturing method may include additional processes other than the above processes. For example, additional processes may include an insolubilization process, a crosslinking process, a drying process (moisture control), etc. Additional processes may be performed at any appropriate timing.

The insolubilization process is typically achieved by immersing the PVA-type resin layer in an aqueous boric acid solution. The insolubilization treatment can impart water resistance to the PVA-type resin layer. The concentration of boric acid in the aqueous boric acid solution is preferably from 1 to 4 parts by weight based on 100 parts by weight of water. The insolubilization bath (aqueous boric acid solution) preferably has a temperature of 20° C. to 50° C. Preferably, the insolubilization process is performed after the preparation of the laminate and before the dyeing process or the process of stretching in water.

The crosslinking process is typically achieved by immersing the PVA-type resin layer in an aqueous boric acid solution. The crosslinking treatment can impart water resistance to the PVA-type resin layer. The concentration of boric acid in the aqueous boric acid solution is preferably from 1 to 4 parts by weight based on 100 parts by weight of water. When the crosslinking process is performed after the dyeing process, an iodide is preferably added to the solution. The addition of an iodide can suppress the elution of absorbed iodine from the PVA-type resin layer. The amount of the addition of an iodide is preferably from 1 to 5 parts by weight based on 100 parts by weight of water. Examples of the iodide include those listed above. The temperature of the crosslinking bath (aqueous boric acid solution) is preferably from 20° C. to 50° C. Preferably, the crosslinking process is performed before the second stretching process in the aqueous boric acid solution. In a preferred embodiment, the dyeing process, the crosslinking process, and the second stretching process in the aqueous boric acid solution are performed in this order.

A thermoplastic resin with a high level of transparency, mechanical strength, thermal stability, moisture blocking properties, isotropy, and the like may be used as a material for forming the first and second transparent protective film. Examples of such a thermoplastic resin include cellulose resins such as triacetylcellulose, polyester resins, polyethersulfone resins, polysulfone resins, polycarbonate resins, polyamide resins, polyimide resins, polyolefin resins, (meth) acrylic resins, cyclic olefin polymer resins (norbornene resins), polyarylate resins, polystyrene resins, polyvinyl alcohol resins, and any mixture thereof. The transparent protective film is generally laminated to one side of the polarizer with the adhesive layer, but thermosetting resins or ultraviolet curing resins such as (meth)acrylic, urethane, acrylic urethane, epoxy, or silicone resins may be used to other side of the polarizer for the transparent protective film. The transparent protective film may also contain at least one type of any appropriate additive. Examples of the additive include an ultraviolet absorbing agent, an antioxidant, a lubricant, a plasticizer, a release agent, an anti-discoloration agent, a flame retardant, a nucleating agent, an antistatic agent, a pigment, and a colorant. The content of the thermoplastic resin in the transparent protective film is preferably from 50 to 100% by weight, more preferably from 50 to 99% by weight, still more preferably from 60 to 98% by weight, particularly preferably from 70 to 97% by weight. If the content of the thermoplastic resin in the transparent protective film is 50% by weight or less, high transparency and other properties inherent in the thermoplastic resin can fail to be sufficiently exhibited.

At least one selected from cellulose resins, polycarbonate resins, cyclic polyolefin resins, (meth)acrylic resins and polyester resins is preferably used for the transparent protective film according to the invention.

The cellulose resins are an ester of cellulose and a fatty acid. Examples of such a cellulose ester resin include triacetyl cellulose, diacetyl cellulose, tripropionyl cellulose, dipropionyl cellulose, and the like. In particular, triacetyl cellulose is preferred. Much commercially available triacetyl celluloses are placing on sale and are advantageous in view of easy availability and cost. Examples of commercially available products of triacetyl cellulose include UV-50, UV-80, SH-80, TD-80U, TD-TAC, and UZ-TAC (trade names) manufactured by Fujifilm Corporation, and KC series manufactured by Konica.

For example, a norbornene resin is preferable in the cyclic polyolefin resins. Cyclic olefin resins are a generic name for resins produced by polymerization of cyclic olefin used as a polymerizable unit, and examples thereof include the resins disclosed in JP-A Nos. 01-240517, 03-14882, and 03-122137. Specific examples thereof include ring-opened (co)polymers of cyclic olefins, addition polymers of cyclic olefins, copolymers (typically random copolymers) of cyclic olefins and α-olefins such as ethylene and propylene, graft polymers produced by modification thereof with unsaturated carboxylic acids or derivatives thereof, and hydrides thereof. Examples of the cyclic olefin include norbornene monomers. Various commercially available cyclic polyolefin resins are placing on sale. Examples thereof include Zeonex (trade name) and Zeonor (trade name) series manufactured by Zeon Corporation, Arton (trade name) series manufactured by JSR Corporation, Topas (trade name) series manufactured by Ticona, and Apel (trade name) series manufactured by Mitsui Chemicals, Inc.

Any appropriate (meth)acrylic resins may be used as long as the advantages of the invention are not reduced. Examples of such a (meth)acrylic resin include poly(meth)acrylate such as poly(methyl methacrylate), methyl methacrylate-(meth)acrylic acid copolymers, methyl methacrylate-(meth)acrylate copolymers, methyl methacrylate-acrylate-(meth)acrylic acid copolymers, methyl(meth)acrylate-styrene copolymers (such as MS resins), and alicyclic hydrocarbon group-containing polymers (such as methyl methacrylate-cyclohexyl methacrylate copolymers and methyl methacrylate-norbornyl(meth)acrylate copolymers). Poly($C_{1-6}$ alkyl(meth)acrylate) such as poly(methyl(meth)acrylate) is preferred, and a methyl methacrylate-based resin mainly composed of a methyl methacrylate unit (50 to 100% by weight, preferably 70 to 100% by weight) is more preferred.

Examples of the (meth)acrylic resin include Acrypet VH and Acrypet VRL20A each manufactured by Mitsubishi Rayon Co., Ltd., (meth)acrylic resins having a ring structure in their molecule as disclosed in JP-A No. 2004-70296, and high-Tg (meth)acrylic resins produced by intramolecular crosslinking or intramolecular cyclization reaction.

Lactone ring structure-containing (meth)acrylic resins may also be used, because they have high heat resistance and high transparency and also have high mechanical strength after biaxially stretched. Examples of the lactone ring structure-containing (meth)acrylic reins include the lactone ring structure-containing (meth)acrylic reins disclosed in JP-A Nos. 2000-230016, 2001-151814, 2002-120326, 2002-254544, and 2005-146084.

Examples of polyester resins include, but are not limited to, homopolymers obtained by polycondensation of one dicarboxylic acid and one diol, copolymers obtained by polycondensation of one or more dicarboxylic acids and two or more diols or copolymers obtained by polycondensation of two or more dicarboxylic acids and one or more diols, and a resin blend containing two or more of the homopolymers or copolymers, in which examples of one or more dicarboxylic acids include terephthalic acid, isophthalic acid, orthophthalic acid, 2,5-naphthalenedicarboxylic acid, 2,6-naphthalenedicarboxylic acid, 1,4-naphthalenedicarboxylic acid, 1,5-naphthalenedicarboxylic acid, diphenylcarboxylic acid, diphenoxyethanedicarboxylic acid, diphenylsulfonecarboxylic acid, anthracenedicarboxylic acid, 1,3-cyclopentanedicarboxylic acid, 1,3-cyclohexanedicarboxylic acid, 1,4-cyclohexanedicarboxylic acid, hexahydroterephthalic acid, hexahydroisophthalic acid, malonic acid, dimethylmalonic acid, succinic acid, 3,3-diethylsuccinic acid, glutaric acid, 2,2-dimethylglutaric acid, adipic acid, 2-methyladipic acid, trimethyladipic acid, pimelic acid, azelaic acid, dimer acid, sebacic acid, suberic acid, and dodecadicarboxylic acid, and examples of one or more diols include ethylene glycol, propylene glycol, hexamethylene glycol, neopentyl glycol, 1,2-cyclohexanedimethanol, 1,4-cyclohexanedimethanol, decamethylene glycol, 1,3-propanediol, 1,4-butanediol, 1,5-pentanediol, 1,6-hexanediol, 2,2-bis(4-hydroxyphenyl)propane, and bis(4-hydroxyphenyl)sulfone. In particular, polyethylene terephthalate resins are preferably used. Amorphous polyethylene terephthalate resins are particularly preferred.

The thickness of the first transparent protective film may be determined as desired. Generally, in view of strength, workability such as handleability, thin layer formability, or other properties, the thickness of the first transparent protective film is preferably from 1 to 80 μm. The first transparent protective film preferably has a thickness of 60 μm or less, more preferably 10 to 60 μm, even more preferably 10 to 50 μm so that irregularities derived from the polarizing plate can be kept at a low level.

The first transparent protective film to be used preferably has a haze value of 15% or less. A transparent protective film made of any of the above materials generally has a haze value of 1% or less, preferably 0.5% or less, and more preferably 0.3%. Thus, the transparent protective film made of any of the above materials can be used as the first transparent protective film without modification.

Alternatively, the first transparent protective film to be used may include a transparent protective film made of any of the above materials and a hard coating layer or a functional layer for anti-reflection, diffusion, or antiglare purpose, which is provided on a surface of the protective film opposite to its surface where the polarizer is to be bonded, as long as the first transparent protective film has a haze value of 15% or less. When the haze value is 15% or less, a clear, high-grade appearance can be provided. The first transparent protective film having a functional layer also preferably has a low haze value, which is preferably 10% or less, and more preferably 5% or less.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 20 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 70 weight parts to the transparent resin 100 weight parts that forms the fine concavo-convex structure on the surface, and preferably 5 to 50 weight parts. An anti glare layer may serve as a diffusion layer (viewing angle expanding function etc.) for diffusing transmitting light through the polarizing plate and expanding a viewing angle etc.

In addition, the above-mentioned functional layer such as antireflection layer, diffusion layer and antiglare layer, etc. may be prepared on the protective film itself, and also they may be prepared as an optical layer different from the protective film. The functional layer generally has a thickness of 10 µm or less, preferably 1 to 10 µm, and more preferably 3 to 7 µm. The thickness of these functional layers is so designed that the first transparent protective film can have a haze value of 15% or less, depending on the type or composition of the material used to form the functional layer. The first transparent protective film having the functional layer also preferably has a thickness in the above range.

While the first transparent protective film is provided on one side of the polarizer, a second transparent protective film may be provided on the other side of the polarizer. In this case, the first and second transparent protective films may be made of the same polymer material or different polymer materials.

The thickness of the second transparent protective film may be determined as desired. Generally, in view of strength, workability such as handleability, thin layer formability, or other properties, the thickness of the second transparent protective film is preferably from 1 to 80 µm. When the first and second transparent protective films are provided, at least one of the first and second transparent protective films preferably has a thickness of 60 µm or less, more preferably 10 to 60 µm, and even more preferably 10 to 50 µm so that irregularities derived from the polarizing plate can be kept at a low level.

The first and second transparent protective films each preferably have a thickness of 60 µm or less, more preferably 10 to 60 µm, and even mover preferably 10 to 50 µm.

The second transparent protective film generally has a haze value of 1% or less, preferably 0.5% or less, more preferably 0.3% or less. A transparent protective film made of any of the above materials can be used as the second transparent protective film without modification.

The polarizer may be bonded to the first and/or second transparent protective film with an adhesive. Examples of such an adhesive include isocyanate adhesives, polyvinyl alcohol adhesives, gelatin adhesives, vinyl latexes, and aqueous polyesters. The adhesive is generally used in the form of an aqueous solution, which generally has a solids content of 0.5 to 60% by weight. Besides the above, an active energy ray-curable adhesive such as an ultraviolet-curable adhesive or an electron beam-curable adhesive may also be used as the adhesive to bond the polarizer to the transparent protective film. Electron beam-curable adhesives for polarizing plates exhibit good adhesion to the transparent protective film, especially to acrylic resins. In the adhesive used in the invention may contain a metal compound filler.

An optical film except the polarizing plate may be exemplified as other optical layers, such as a reflective plate, a transflective plate, a retardation plate (a half wavelength plate and a quarter wavelength plate included), a viewing angle compensation film, a brightness enhancement film, a surface treatment film or the like, which may be used for formation of a liquid crystal display etc. These are used in practice as an optical film, or as one layer or two layers or more of optical layers laminated with polarizing plate.

A pressure-sensitive adhesive polarizing plate as an example of the pressure-sensitive adhesive optical film of the invention is placed on the viewer side when used to form an image display such as a liquid crystal display. In this case, the pressure-sensitive adhesive polarizing plate may be used in combination with any other optical film to form an image display. In a liquid crystal display, the pressure-sensitive adhesive polarizing plate of the invention is used as a polarizing plate on the viewer side of a liquid crystal cell. Any type of polarizing plate may be placed on the opposite side of the liquid crystal cell.

Although an optical film with the above described optical layer laminated to the polarizing plate may be formed by a method in which laminating is separately carried out sequentially in manufacturing process of a liquid crystal display or the like, an optical film in a form of being laminated beforehand has an outstanding advantage that it has excellent stability in quality and assembly workability, and thus manufacturing processes ability of a liquid crystal display or the like may be raised. Proper adhesion means, such as a pressure-sensitive adhesive layer, may be used for laminating. On the occasion of adhesion of the above described polarizing plate and other optical films, the optical axis may be set as a suitable configuration angle according to the target retardation characteristics or the like.

Examples of the retardation plate include a birefringent film produced by uniaxially or biaxially stretching a polymer material, an oriented liquid crystal polymer film, and an oriented liquid crystal polymer layer supported on a film. The thickness of the retardation plate is generally, but not limited to, from about 10 to about 150 µm. The retardation plate preferably has a thickness of 60 µm or less, more preferably 10 to 60 µm, and even more preferably 10 to 50 µm so that irregularities derived from the polarizing plate can be kept at a low level.

Examples of the polymer material include polyvinyl alcohol, polyvinyl butyral, poly(methyl vinyl ether), poly(hydroxyethyl acrylate), hydroxyethyl cellulose, hydroxypropyl cellulose, methylcellulose, polycarbonate, polyarylate, polysulfone, polyethylene terephthalate, polyethylene naphthalate, polyethersulfone, polyphenylene sulfide, polyphenylene oxide, polyallylsulfone, polyamide, polyimide, polyolefin, polyvinyl chloride, cellulose resins, cyclic polyolefin resins (norbornene reins), and various types of binary or ternary copolymers thereof, graft copolymers thereof, and any blend thereof. Any of these polymer materials may be formed into an oriented product (a stretched film) by stretching or the like.

Examples of the liquid crystal polymer include various main-chain or side-chain types having a liquid crystal molecular orientation property-imparting conjugated linear atomic group (mesogen) introduced in a main or side chain of a polymer. Examples of the main chain type liquid crystal polymer include polymers having a mesogen group bonded thereto via a flexibility-imparting spacer moiety, such as nematically ordered polyester liquid-crystalline polymers, discotic polymers, and cholesteric polymers. For example, the side-chain type liquid crystal polymer may be a polymer comprising: a main chain skeleton of polysiloxane, polyacrylate, polymethacrylate, or polymalonate; and a side chain having a mesogen moiety that comprises a nematic orientation-imparting para-substituted cyclic compound unit and is bonded thereto via a spacer moiety comprising a conjugated atomic group. For example, any of these liquid crystal polymers may be applied by a process that includes spreading a solution of the liquid crystalline polymer on an alignment surface such as a rubbed surface of a thin film of polyimide, polyvinyl alcohol or the like, formed on the glass plate, and an obliquely vapor-deposited silicon oxide surface, and heat-treating it.

The retardation plate may have any appropriate retardation depending on the intended use such as compensation for coloration, viewing angle, or the like due to the birefringence of various wave plates or liquid crystal layers. Two or more types of retardation plates may also be laminated to provide controlled optical properties, including retardation.

The optical film to be used preferably has a haze value of 15% or less. Examples of the optical film may include those listed above for the transparent protective film. The optical film with a haze value of 15% or less is suitable for use as a base film to be bonded to a front faceplate or a touch panel. A surface treatment film with a haze value of 15% or less can be used as the optical film. The surface treatment film can be obtained by subjecting the base film to a surface treatment.

The haze value is preferably 1% or less, more preferably 0.5% or less, and even more preferably 0.3% or less. Generally, in view of strength, workability such as handleability, thin layer formability, or other properties, the thickness of the optical film with a haze value of 15% or less is preferably from 1 to 80 µm. The optical film with a haze value of 15% or less preferably has a thickness of 60 µm or less, more preferably 10 to 60 µm, and even more preferably 10 to 50 µm so that irregularities on the optical film can be kept at a low level.

Examples of the surface treatment film include a hard-coat film for use in imparting scratch resistance to the surface, an antiglare treatment film for preventing glare on image displays, and an anti-reflection film such as an anti-reflective film or a low-reflective film, etc. The front faceplate is provided on and bonded to the surface of an image display such as a liquid crystal display, an organic EL display, a CRT, or a PDP to protect the image display or to provide a high-grade appearance or a differentiated design. The front faceplate is also used as a support for a λ/4 plate in a 3D-TV. In a liquid crystal display, for example, the front faceplate is provided above a polarizing plate on the viewer side. When the pressure-sensitive adhesive layer according to the invention is used, the same effect can be produced using a plastic base material such as a polycarbonate or poly(methyl methacrylate) base material for the front face plate, as well as using a glass base material.

The pressure-sensitive adhesive layer provided on the optical film is made from a pressure-sensitive adhesive. Any of various pressure-sensitive adhesives may be used, such as a rubber-based pressure-sensitive adhesive, an acrylic pressure-sensitive adhesive, a silicone-based pressure-sensitive adhesive, a urethane-based pressure-sensitive adhesive, a vinyl alkyl ether-based pressure-sensitive adhesive, a polyvinyl alcohol-based pressure-sensitive adhesive, a polyvinylpyrrolidone-based pressure-sensitive adhesive, a polyacrylamide-based pressure-sensitive adhesive, or a cellulose-based pressure-sensitive adhesive. The pressure-sensitive adhesive base polymer is selected depending on the type of the pressure-sensitive adhesive.

Among the above pressure-sensitive adhesives, an acrylic pressure-sensitive adhesive is preferably used because it has a high level of optical transparency and weather resistance or heat resistance and exhibits appropriate wettability and pressure-sensitive adhesive properties such as appropriate cohesiveness and tackiness.

The acrylic pressure-sensitive adhesive includes, as a base polymer, a (meth)acryl-based polymer having an alkyl(meth) acrylate monomer unit in the main skeleton. As used therein, the term "alkyl(meth)acrylate" refers to alkyl acrylate and/or alkyl methacrylate, and "(meth)" is used in the same meaning in the description. For example, the alkyl(meth)acrylate used to form the main skeleton of the (meth)acryl-based polymer may have a straight or branched chain alkyl group of 1 to 18 carbon atoms. For example, the alkyl group may be methyl, ethyl, propyl, isopropyl, butyl, isobutyl, amyl, hexyl, cyclohexyl, heptyl, 2-ethylhexyl, isooctyl, nonyl, decyl, isodecyl, dodecyl, isomyristyl, lauryl, tridecyl, pentadecyl, hexadecyl, heptadecyl, or octadecyl. These may be used alone or in any combination. The average carbon number of the alkyl groups is preferably from 3 to 9.

An aromatic ring-containing alkyl(meth)acrylate may also be used, such as phenoxyethyl(meth)acrylate or benzyl (meth)acrylate. The aromatic ring-containing alkyl(meth) acrylate may be used to form a polymer, and such a polymer may be mixed with any of the (meth)acryl-based polymers listed above when uses. In view of transparency, a copolymer of the alkyl(meth)acrylate and the aromatic ring-containing alkyl(meth)acrylate is preferably used.

In order to improve tackiness or heat resistance, one or more copolymerizable monomers having an unsaturated double bond-containing polymerizable functional group such as a (meth)acryloyl group or a vinyl group may be introduced into the (meth)acryl-based polymer by copolymerization. Examples of such copolymerizable monomers include hydroxyl group-containing monomers such as 2-hydroxyethyl(meth)acrylate, 3-hydroxypropyl(meth)acrylate, 4-hydroxybutyl(meth)acrylate, 6-hydroxyhexyl(meth)acrylate, 8-hydroxyoctyl(meth)acrylate, 10-hydroxydecyl(meth)acrylate, 12-hydroxylauryl(meth)acrylate, and (4-hydroxymethylcyclohexyl)-methyl acrylate; carboxyl group-containing monomers such as (meth)acrylic acid, carboxyethyl(meth)acrylate, carboxypentyl(meth)acrylate, itaconic acid, maleic acid, fumaric acid, and crotonic acid; acid anhydride group-containing monomers such as maleic anhydride and itaconic anhydride; caprolactone adducts of acrylic acid; sulfonic acid group-containing monomers such as styrenesulfonic acid, allylsulfonic acid, 2-(meth)acrylamido-2-methylpropanesulfonic acid, (meth)acrylamidopropanesulfonic acid, sulfopropyl(meth)acrylate, and (meth)acryloyloxynaphthalenesulfonic acid; and phosphate group-containing monomers such as 2-hydroxyethylacryloyl phosphate.

Examples of such a monomer for modification also include (N-substituted) amide monomers such as (meth)acrylamide, N,N-dimethyl(meth)acrylamide, N-butyl(meth)acrylamide, N-methylol(meth)acrylamide, and N-methylolpropane (meth)acrylamide; alkylaminoalkyl(meth)acrylate monomers such as aminoethyl(meth)acrylate, N,N-dimethylaminoethyl(meth)acrylate, and tert-butylaminoethyl(meth) acrylate; alkoxyalkyl(meth)acrylate monomers such as methoxyethyl(meth)acrylate and ethoxyethyl(meth)acrylate; succinimide monomers such as N-(meth)acryloyloxymethylenesuccinimide, N-(meth)acryloyl-6-oxyhexamethylenesuccinimide, N-(meth)acryloyl-8-oxyoctamethylenesuccinimide, and N-acryloylmorpholine; maleimide monomers such as N-cyclohexylmaleimide, N-isopropylmaleimide, N-laurylmaleimide, and N-phenylmaleimide; and itaconimide monomers such as N-methylitaconimide, N-ethylitaconimide, N-butylitaconimide, N-octylitaconimide, N-2-ethylhexylitaconimide, N-cyclohexylitaconimide, and N-laurylitaconimide.

Examples of modification monomers that may also be used include vinyl monomers such as vinyl acetate, vinyl propionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinylcarboxylic acid amides, styrene, α-methylstyrene, and N-vinylcaprolactam; cyanoacrylate monomers such as acrylonitrile and methacrylonitrile; epoxy group-containing acrylic monomers such as glycidyl(meth) acrylate; glycol acrylic ester monomers such as polyethylene glycol(meth)acrylate, polypropylene glycol(meth)acrylate, methoxyethylene glycol(meth)acrylate, and methoxypolypropylene glycol(meth)acrylate; and acrylate ester monomers such as tetrahydrofurfuryl(meth)acrylate, fluoro (meth)acrylate, silicone(meth)acrylate, and 2-methoxyethyl acrylate. Examples also include isoprene, butadiene, isobutylene, and vinyl ether.

Besides the above, a silicon atom-containing silane monomer may be exemplified as the copolymerizable monomer. Examples of the silane monomers include 3-acryloxypropyltriethoxysilane, vinyltrimethoxysilane, vinyltriethoxysilane, 4-vinylbutyltrimethoxysilane, 4-vinylbutyltriethoxysilane, 8-vinyloctyltrimethoxysilane, 8-vinyloctyltriethoxysilane, 10-methacryloyloxydecyltrimethoxysilane, 10-acryloyloxydecyltrimethoxysilane, 10-methacryloyloxydecyltriethoxysilane, and 10-acryloyloxydecyltriethoxysilane.

Copolymerizable monomers that may be used also include polyfunctional monomers having two or more unsaturated double bonds such as (meth)acryloyl groups or vinyl groups, which include (meth)acrylate esters of polyhydric alcohols, such as tripropylene glycol di(meth)acrylate, tetraethylene glycol di(meth)acrylate, 1,6-hexanediol di(meth)acrylate, bisphenol A diglycidyl ether di(meth)acrylate, neopentyl glycol di(meth)acrylate, trimethylolpropane tri(meth)acrylate, pentaerythritol tri(meth)acrylate, pentaerythritol tetra(meth) acrylate, dipentaerythritol penta(meth)acrylate, dipentaerythritol hexa(meth)acrylate, and caprolactone-modified dipentaerythritol hexa(meth)acrylate; and compounds having a polyester, epoxy or urethane skeleton to which two or more unsaturated double bonds are added in the form of functional groups such as (meth)acryloyl groups or vinyl groups in the same manner as the monomer component, such as polyester (meth)acrylates, epoxy(meth)acrylates and urethane(meth) acrylates.

Among these copolymerizable monomers, hydroxyl group-containing monomers or carboxyl group-containing monomers are preferably used in view of tackiness or durability. When the pressure-sensitive adhesive composition contains a crosslinking agent, these copolymerizable monomers can serve as a reactive site with the crosslinking agent. Such hydroxyl group-containing monomers or carboxyl group-containing monomers are highly reactive with intermolecular crosslinking agents and therefore are preferably used to improve the cohesiveness or heat resistance of the resulting pressure-sensitive adhesive layer.

A hydroxyl group-containing monomer and a carboxyl group-containing monomer may be added as copolymerizable monomers. In this case, the copolymerizable monomers may be used in the above content. Specifically, the content of the carboxyl group-containing monomer is preferably from 0.1 to 10% by weight, and the content of the hydroxyl group-containing monomer is preferably from 0.01 to 2% by weight. The content of the carboxyl group-containing monomer is more preferably from 0.2 to 8% by weight, even more preferably from 0.6 to 6% by weight. The content of the hydroxyl group-containing monomer is more preferably from 0.03 to 1.5% by weight, even more preferably from 0.05 to 1% by weight.

In an embodiment of the invention, the (meth)acryl-based polymer used generally has a weight average molecular weight in the range of 300,000 to 3,000,000. In view of durability, particularly in view of heat resistance, the weight average molecular weight of the (meth)acryl-based polymer used is preferably from 800,000 to 3,000,000, more preferably from 1,400,000 to 2,700,000, more preferably from 1,700,000 to 2,500,000, more preferably from 1,800,000 to 2,400,000. If the weight average molecular weight is less than 300,000, it is not preferred in view of heat resistance. If a weight average molecular weight is more than 3,000,000, it is not preferred because a laminating ability or an adhesive strength may decrease. The weight average molecular weight refers to the value obtained by measurement by gel permeation chromatography (GPC) and conversion of the measured value into the polystyrene-equivalent value. The degree of dispersion (weight average molecular weight/number average molecular weight) is preferably from 1.8 to 10, more preferably from 2 to 7, and even more preferably from 2 to 5.

For the production of the (meth)acryl-based polymer, any appropriate method may be selected from known production methods such as solution polymerization, bulk polymerization, emulsion polymerization, and various radical polymerization methods. The resulting (meth)acryl-based polymer may be any type of copolymer such as a random copolymer, a block copolymer and a graft copolymer.

In a solution polymerization process, for example, ethyl acetate, toluene or the like is used as a polymerization solvent. In a specific solution polymerization process, for example, the reaction is performed under a stream of inert gas such as nitrogen at a temperature of about 50 to about 70° C. for about 5 to about 30 hours in the presence of a polymerization initiator.

Any appropriate polymerization initiator, chain transfer agent, emulsifying agent and so on may be selected and used for radical polymerization. The weight average molecular weight of the (meth)acryl-based polymer may be controlled by the reaction conditions including the amount of addition of the polymerization initiator or the chain transfer agent and monomers concentration. The amount of the addition may be controlled as appropriate depending on the type of these materials.

Examples of the polymerization initiator include, but are not limited to, azo initiators such as 2,2'-azobisisobutylonitrile, 2,2'-azobis(2-amidinopropane)dihydrochloride, 2,2'-azobis[2-(5-methyl-2-imidazoline-2-yl)propane]dihydrochloride, 2,2'-azobis(2-methylpropionamidine)disulfate, 2',2'''-azobis(2-amidinopropane)dibasic acid, 2,2'-azobis[2-(2-imidazolin-2-yl)propane]dibasic acid, 2,2'-azobis(N,N'-dimethyleneisobutylamidine), and 2,2'-azobis[N-(2-carboxyethyl)-2-methylpropionamidine]hydrate (VA-057, manufactured by Wako Pure Chemical Industries, Ltd.); persulfates such as potassium persulfate and ammonium persulfate; peroxide initiators such as di(2-ethylhexyl)peroxydicarbonate, di(4-tert-butylcyclohexyl)peroxydicarbonate, di-sec-butylperoxydicarbonate, tert-butylperoxyneodecanoate, tert-hexylperoxypivalate, tert-butylperoxypivalate, dilauroyl peroxide, di-n-octanoyl peroxide, 1,1,3,3-tetramethylbutylperoxy-2-ethyl hexanoate, di(4-methylbenzoyl)peroxide, dibenzoyl peroxide, tert-butylperoxyisobutylate, 1,1-di(tert-hexylperoxy)cyclohexane, tert-butylhydroperoxide, and hydrogen peroxide; and redox system initiators of a combination of a peroxide and a reducing agent, such as a combination of a persulfate and sodium hydrogen sulfite and a combination of a peroxide and sodium ascorbate. Examples of the reducing agent include reducing organic compounds such as ascorbic acid, erythorbic acid, tartaric acid, citric acid, glucose, and metal salts such as a sodium salts of formaldehyde sulfoxylate or the like; reducing inorganic compounds such as sodium thiosulfate, sodium sulfite, sodium bisulfite, and sodium metabisulfite; and ferrous chloride, Rongalite, and thiourea dioxide.

One of the above polymerization initiators may be used alone, or two or more thereof may be used in a mixture. The total content of the polymerization initiator is preferably from about 0.005 to 1 part by weight, more preferably from about 0.02 to about 0.5 parts by weight, based on 100 parts by weight of the monomer.

For example, when 2,2'-azobisisobutyronitrile is used as a polymerization initiator for the production of the (meth) acryl-based polymer with the above weight average molecular weight, the polymerization initiator is preferably used in a content of from about 0.06 to 0.2 parts by weight, more preferably of from about 0.08 to 0.175 parts by weight, based on 100 parts by weight of the total content of the monomer components.

Examples of the chain transfer agent include lauryl mercaptan, glycidyl mercaptan, mercaptoacetic acid, 2-mercaptoethanol, thioglycolic acid, 2-ethylhexyl thioglycolate, and 2,3-dimercapto-1-propanol. One of these chain transfer agents may be used alone, or two or more thereof may be used in a mixture. The total content of the chain transfer agent is preferably 0.1 parts by weight or less, based on 100 parts by weight of the total content of the monomer components.

The surfactant (emulsifying agent) used is not particularly limited, and may be any of various surfactants commonly used in emulsion polymerization. For example, the surfactant may be an anionic or nonionic surfactant. Examples of the anionic surfactant include higher fatty acid salts such as sodium oleate; alkylarylsulfonate salts such as sodium dodecylbenzenesulfonate; alkylsulfate ester salts such as sodium laurylsulfate and ammonium laurylsulfate; polyoxyethylene alkyl ether sulfate ester salts such as sodium polyoxyethylene lauryl ether sulfate; polyoxyethylene alkyl aryl ether sulfate ester salts such as sodium polyoxyethylene nonyl phenyl ether sulfate; alkyl sulfosuccinic acid ester salts such as sodium monooctyl sulfosuccinate, sodium dioctyl sulfosuccinate, and sodium polyoxyethylene lauryl sulfosuccinate, and derivatives thereof; and polyoxyethylene distyrenated phenyl ether sulfate ester salts; polyoxyethylene distyrenated phenyl ether sulfate ester salts; sodium naphthalenesulfonate-formalin condensate. Examples of the nonionic surfactant include polyoxyethylene alkyl ethers such as polyoxyethylene lauryl ether and polyoxyethylene stearyl ether; polyoxyethylene alkyl phenyl ethers such as polyoxyethylene octyl phenyl ether and polyoxyethylene nonyl phenyl ether; sorbitan higher fatty acid esters such as sorbitan monolaurate, sorbitan monostearate, and sorbitan trioleate; polyoxyethylene sorbitan higher fatty acid esters such as polyoxyethylene sorbitan monolaurate; polyoxyethylene higher fatty acid esters such as polyoxyethylene monolaurate and polyoxyethylene monostearate; glycerin higher fatty acid esters such as oleic acid monoglyceride and stearic acid monoglyceride; and polyoxyethylene-polyoxypropylene block copolymers, and polyoxyethylene distyrenated phenyl ether.

Besides the non-reactive surfactants, a reactive surfactant having an ethylenic unsaturated double bond-containing radically-polymerizable functional group may also be used. The reactive surfactant may be a radical-polymerizable surfactant prepared by introducing a radical-polymerizable functional group (radically reactive group) such as a propenyl group or an allyl ether group into the anionic surfactant or the nonionic surfactant. These surfactants may be appropriately used alone or in any combination. Among these surfactants, the radical-polymerizable surfactant having a radical-polymerizable functional group is preferably used in view of the stability of the aqueous dispersion or the durability of the pressure-sensitive adhesive layer.

Examples of anionic reactive surfactants include alkyl ether surfactants (examples of commercially available products include AQUALON KH-05, KH-10, and KH-20 manufactured by Dai-ichi Kogyo Seiyaku Co., Ltd., ADEKA REASOAP SR-10N and SR-20N manufactured by ADEKA CORPORATION, LATEMUL PD-104 manufactured by Kao Corporation, and others); sulfosuccinic acid ester surfactants (examples of commercially available products include LATEMUL S-120, S-120A, S-180P, and S-180A manufactured by Kao Corporation and ELEMINOL JS-2 manufactured by Sanyo Chemical Industries, Ltd., and others); alkyl phenyl ether surfactants or alkyl phenyl ester surfactants (examples of commercially available products include AQUALON H-2855A, H-3855B, H-3855C, H-3856, HS-05, HS-10, HS-20, HS-30, BC-05, BC-10, and BC-20 manufactured by Dai-ichi Kogyo Seiyaku Co., Ltd., and ADEKA REASOAP SDX-222, SDX-223, SDX-232, SDX-233, SDX-259, SE-10N, and SE-20N manufactured by ADEKA CORPORATION); (meth)acrylate sulfate ester surfactants (examples of commercially available products include ANTOX MS-60 and MS-2N manufactured by Nippon Nyukazai Co., Ltd., ELEMINOL RS-30 manufactured by Sanyo Chemical Industries Co., Ltd., and others); and phosphoric acid ester surfactants (examples of commercially available products include H-3330PL manufactured by Dai-ichi Kogyo Seiyaku Co., Ltd. ADEKA REASOAP PP-70 manufactured by ADEKA CORPORATION, and others). Examples of nonionic reactive surfactants include alkyl ether surfactants (examples of commercially available products include ADEKA REASOAP ER-10, ER-20, ER-30, and ER-40 manufactured by ADEKA CORPORATION, LATEMUL PD-420, PD-430, and PD-450 manufactured by Kao Corporation, and others); alkyl phenyl ether surfactants or alkyl phenyl ester surfactants (examples of commercially available products include AQUALON RN-10, RN-20, RN-30, and RN-50 manufactured by Dai-ichi Kogyo Seiyaku Co., Ltd., ADEKA REASOAP NE-10, NE-20, NE-30, and NE-40 manufactured by ADEKA CORPORATION, and others); and (meth)acrylate sulfate ester surfactants (examples of commercially available products include RMA-564, RMA-568, and RMA-1114 manufactured by Nippon Nyukazai Co., Ltd, and others).

The content of the surfactant is preferably from 0.6 to 5 parts by weight based on 100 parts by weight of the monomers. The pressure-sensitive adhesive properties, polymerization stability, and mechanical stability can be improved by adjusting the content of the surfactant. The content of the surfactant is more preferably from 0.6 to 4 parts by weight.

The pressure-sensitive adhesive used to form the pressure-sensitive adhesive layer may further contain a crosslinking agent in addition to the base polymer such as the (meth)acryl-based polymer. An organic crosslinking agent or a polyfunctional metal chelate may also be used as the crosslinking agent. Examples of the organic crosslinking agent include an isocyanate crosslinking agent, an epoxy crosslinking agents, a peroxide crosslinking agents and an imine crosslinking agents. The polyfunctional metal chelate may include a polyvalent metal and an organic compound that is covalently or coordinately bonded to the metal. Examples of the polyvalent metal atom include Al, Cr, Zr, Co, Cu, Fe, Ni, V, Zn, In, Ca, Mg, Mn, Y, Ce, Sr, Ba, Mo, La, Sn, and Ti. The organic compound has a covalent or coordinate bond-forming atom such as an oxygen atom. Examples of the organic compound include alkyl esters, alcohol compounds, carboxylic acid compounds, ether compounds, and ketone compounds.

The crosslinking agent to be used is preferably selected from an isocyanate crosslinking agent and/or a peroxide crosslinking agent. Examples of such a compound for the isocyanate crosslinking agent include isocyanate monomers such as tolylene diisocyanate, chlorophenylene diisocyanate, tetramethylene diisocyanate, xylylene diisocyanate, diphenylmethane diisocyanate, and hydrogenated diphenylmethane diisocyanate, and isocyanate compounds produced by adding any of these isocyanate monomers to trimethylolpropane or the like; and urethane prepolymer type isocyanates produced by the addition reaction of isocyanurate compounds, burette type compounds, or polyether polyols, polyester polyols, acrylic polyols, polybutadiene polyols, polyisoprene polyols, or the like. Particularly preferred is a polyisocyanate compound such as one selected from the group consisting of hexamethylene diisocyanate, hydrogenated xylylene diisocyanate, and isophorone diisocyanate, or a derivative thereof. Examples of one selected from the group consisting of hexamethylene diisocyanate, hydrogenated xylylene diisocyanate, and isophorone diisocyanate, or a derivative thereof include hexamethylene diisocyanate, hydrogenated xylylene diisocyanate, isophorone diisocyanate, polyol-modified hexamethylene diisocyanate, polyol-modified hydrogenated xylylene diisocyanate, trimer-type hydrogenated xylylene diisocyanate, and polyol-modified isophorone diisocyanate. The listed polyisocyanate compounds are preferred, because their reaction with a hydroxyl group quickly proceeds as if an acid or a base contained in the polymer acts as a catalyst, which particularly contributes to the rapidness of the crosslinking.

Any peroxide capable of generating active radical species by heating or photoirradiation and promoting the crosslinking of the base polymer in the pressure-sensitive adhesive composition may be appropriately used. In view of workability and stability, a peroxide with a one-minute half-life temperature of 80° C. to 160° C. is preferably used, and a peroxide with a one-minute half-life temperature of 90° C. to 140° C. is more preferably used.

Examples of the peroxide for use in the invention include di(2-ethylhexyl)peroxydicarbonate (one-minute half-life temperature: 90.6° C.), di(4-tert-butylcyclohexyl)peroxydicarbonate (one-minute half-life temperature: 92.1° C.), di-sec-butyl peroxydicarbonate (one-minute half-life temperature: 92.4° C.), tert-butyl peroxyneodecanoate (one-minute half-life temperature: 103.5° C.), tert-hexyl peroxypivalate (one-minute half-life temperature: 109.1° C.), tert-butyl peroxypivalate (one-minute half-life temperature: 110.3° C.), dilauroyl peroxide (one-minute half-life temperature: 116.4° C.), di-n-octanoylperoxide (one-minute half-life temperature: 117.4° C.), 1,1,3,3-tetramethylbutylperoxy-2-ethyl hexanoate (one-minute half-life temperature: 124.3° C.), di(4-methylbenzoyl)peroxide (one-minute half-life temperature: 128.2° C.), dibenzoyl peroxide (one-minute half-life temperature: 130.0° C.), tert-butyl peroxyisobutylate (one-minute half-life temperature: 136.1° C.), and 1,1-di(tert-hexylperoxy)cyclohexane (one-minute half-life temperature: 149.2° C.). In particular, di(4-tert-butylcyclohexyl)peroxydicarbonate (one-minute half-life temperature: 92.1° C.), dilauroyl peroxide (one-minute half-life temperature: 116.4° C.), dibenzoyl peroxide (one-minute half-life temperature: 130.0° C.), or the like is preferably used, because they can provide high crosslinking reaction efficiency.

The half life of the peroxide is an indicator of how fast the peroxide can be decomposed and refers to the time required for the amount of the peroxide to reach one half of its original value. The decomposition temperature required for a certain half life and the half life time obtained at a certain temperature are shown in catalogs furnished by manufacturers, such as "Organic Peroxide Catalog, 9th Edition, May, 2003" furnished by NOF CORPORATION.

The amount of the crosslinking agent to be used is preferably from 0.01 to 20 parts by weight, more preferably from 0.03 to 10 parts by weight, based on 100 parts by weight of the base polymer such as the (meth)acryl-based polymer. If the amount of the crosslinking agent is less than 0.01 parts by weight, the cohesive strength of the pressure-sensitive adhesive may tend to be insufficient, and foaming may occur during heating. If the amount of the crosslinking agent is more than 20 parts by weight, the humidity resistance may be insufficient, so that peeling may easily occur in a reliability test or the like.

One of the isocyanate crosslinking agents may be used alone, or a mixture of two or more of the isocyanate crosslinking agents may be used. The total content of the polyisocyanate compound crosslinking agent (s) is preferably from 0.01 to 2 parts by weight, more preferably from 0.02 to 2 parts by weight, even more preferably from 0.05 to 1.5 parts by weight, based on 100 parts by weight of the (meth)acryl-based polymer. The content may be appropriately controlled taking into account the cohesive strength or the prevention of peeling in a durability test or the like.

One of the peroxide crosslinking agents may be used alone, or a mixture of two or more of the peroxide crosslinking agent may be used. The total content of the peroxide(s) is preferably from 0.01 to 2 parts by weight, more preferably from 0.04 to 1.5 parts by weight, even more preferably from 0.05 to 1 part by weight, based on 100 parts by weight of the (meth)acryl-based polymer. The content of the peroxide(s) may be appropriately selected in this range in order to control the workability, reworkability, crosslink stability or peeling properties.

The amount of decomposition of the peroxide may be determined by measuring the peroxide residue after the reaction process by high performance liquid chromatography (HPLC).

More specifically, for example, after the reaction process, about 0.2 g of each pressure-sensitive adhesive composition is taken out, immersed in 10 ml of ethyl acetate, subjected to shaking extraction at 25° C. and 120 rpm for 3 hours in a shaker, and then allowed to stand at room temperature for 3 days. Thereafter, 10 ml of acetonitrile is added, and the mixture is shaken at 25° C. and 120 rpm for 30 minutes. About 10 μl of the liquid extract obtained by filtration through a membrane filter (0.45 μm) is subjected to HPLC by injection and analyzed so that the amount of the peroxide after the reaction process is determined.

The pressure-sensitive adhesive of the invention may further contain a silane coupling agent. The durability or the reworkability can be improved using the silane coupling agent. Examples of silane coupling agent include epoxy group-containing silane coupling agents such as 3-glycidoxypropyltrimethoxysilane, 3-glycidoxypropyltriethoxysilane, 3-glycidoxypropylmethyldiethoxysilane, and 2-(3,4-epoxycyclohexyl)ethyltrimethoxysilane; amino group-containing silane coupling agents such as 3-aminopropyltrimethoxysilane, N-(2-aminoethyl)-3-aminopropylmethyldimethoxysilane, and 3-triethoxysilyl-N-(1,3-dimethylbutylidene)propylamine; (meth)acrylic group-containing silane coupling agents such as 3-acryloxypropyltrimethoxysilane and 3-methacryloxypropyltriethoxysilane; and isocyanate group-containing silane coupling agents such as 3-isocyanatepropyltriethoxysilane.

One of the silane coupling agents (E) may be used alone, or a mixture of two or more of the silane coupling agents. The total content of the silane coupling agent(s) is preferably from 0.001 to 5 parts by weight, more preferably from 0.01 to 1 part by weight, even more preferably from 0.02 to 1 part by weight, still more preferably from 0.05 to 0.6 parts by weight, based on 100 parts by weight of the (meth)acryl-based polymer. The content of the silane coupling agent may be appropriately amount in order to control improve durability and maintain adhesive strength to the optical member such as a liquid crystal cell.

The pressure-sensitive adhesive composition of the invention may also contain any other known additive. For example, a powder such as a colorant and a pigment, a tackifier, a dye, a surfactant, a plasticizer, a surface lubricant, a leveling agent, a softening agent, an antioxidant, an age resister, a light stabilizer, an ultraviolet absorbing agent, a polymerization inhibitor, an inorganic or organic filler, a metal powder, or a particle- or foil-shaped material may be added as appropriate depending on the intended use. A redox system including an added reducing agent may also be used in the controllable range.

The pressure-sensitive adhesive layer is made from the pressure-sensitive adhesive. The pressure-sensitive adhesive is generally used as a coating liquid, which may be in various forms such as an organic solvent-based liquid, a water-based liquid, and an aqueous dispersion type liquid (emulsion type liquid) depending on how to prepare the base polymer. The solid concentration of the pressure-sensitive adhesive coating liquid can be adjusted depending on each form. In general, for example, an organic solvent-based pressure-sensitive adhesive coating liquid preferably has a solid concentration of 5 to 50% by weight, more preferably 8 to 40% by weight, and even more preferably 20 to 35% by weight. In general, a water-based or aqueous dispersion-type pressure-sensitive adhesive coating liquid preferably has a solid concentration of 20 to 70% by weight, and more preferably 30 to 65% by weight. In the preparation of each example of the pressure-sensitive adhesive coating liquid, each pressure-sensitive adhesive can be diluted with any of various organic solvents (for an organic solvent-type pressure-sensitive adhesive) or with water (for a water-based or aqueous dispersion-type pressure-sensitive adhesive) so that the solid concentration and the viscosity of the pressure-sensitive adhesive coating liquid can be adjusted.

The thickness of the pressure-sensitive adhesive layer is typically, but not limited to, about 1 to about 100 µm, preferably 2 to 50 µm, more preferably 2 to 40 µm, and even more preferably 5 to 35 µm.

The thickness (µm) of the pressure-sensitive adhesive layer is adjusted to have a standard deviation of 0.12 µm or less. Adjusting the standard deviation to 0.12 µm or less makes it possible to reduce the problem of unevenness in visibility caused by a pressure-sensitive adhesive optical film, even when it has a clear appearance. The standard deviation is preferably 0.08 µm or less, and more preferably 0.06 µm or less.

The pressure-sensitive adhesive optical film of the invention having a pressure-sensitive adhesive layer with a thickness (µm) standard deviation of 0.12 µm or less is typically produced by a process (A) including the steps of:
(1A) applying a pressure-sensitive adhesive coating liquid with a viscosity Y (P) to an optical film to form a coating with a thickness X (µm); and
(2A) drying the applied pressure-sensitive adhesive coating liquid to form a pressure-sensitive adhesive layer, or by a process (B) including the steps of:
(1B) applying a pressure-sensitive adhesive coating liquid with a viscosity Y (P) to a release film to form a coating with a thickness X (µm);

(2B) drying the applied pressure-sensitive adhesive coating liquid to form a pressure-sensitive adhesive layer; and
(3) bonding the pressure-sensitive adhesive layer, which is formed on the release film, to an optical film.

The applying step (1A) of the process (A) and the applying step (1B) of the process (B) are each performed in such a manner that the viscosity Y of the pressure-sensitive adhesive coating liquid and the thickness X of the coating are adjusted to satisfy the relation $0.8X-Y \leq 68$. Adjusting the viscosity Y of the pressure-sensitive adhesive coating liquid and the thickness X of the coating to satisfy the relation $0.8X-Y \leq 68$ makes it possible to form a highly-smooth pressure-sensitive adhesive layer with a very low level of irregularities in thickness. The process (A) or (B) makes it possible to form a pressure-sensitive adhesive layer with a thickness (µm) standard deviation of 0.12 µm or less. If the value of $(0.8X-Y)$ is more than 68, the pressure-sensitive adhesive optical film cannot reduce the problem of unevenness in visibility. The value of $(0.8X-Y)$ is preferably 60 or less, and more preferably 50 or less. In view of the coatability of the pressure-sensitive adhesive coating liquid, the value of $(0.8X-Y)$ is preferably −144 or more.

For uniform application of the pressure-sensitive adhesive coating liquid, the viscosity Y of the pressure-sensitive adhesive coating liquid is preferably adjusted to fall within the range of 2 to 160 P. In the case of an organic solvent-based pressure-sensitive adhesive, the viscosity Y of the pressure-sensitive adhesive coating liquid is preferably from 5 to 160 P, more preferably from 10 to 150 P, even more preferably from 20 to 140 P, still more preferably from 40 to 140 P. In the case of a water-based or aqueous dispersion-type pressure-sensitive adhesive, the viscosity Y of the pressure-sensitive adhesive coating liquid is preferably from 2 to 100 P, more preferably from 5 to 50 P, even more preferably from 10 to 40 P. If the viscosity Y of the pressure-sensitive adhesive coating liquid is too low, the applied pressure-sensitive adhesive may have a degraded appearance, and if the viscosity Y of the pressure-sensitive adhesive coating liquid is too high, the coating appearance may be degraded, and it may be difficult to feed the liquid, which will undesirably reduce workability.

The thickness X of the coating made of the pressure-sensitive adhesive coating liquid is preferably adjusted to fall within the range of 20 to 250 µm so that the pressure-sensitive adhesive coating liquid can be uniformly applied. The coating thickness X is preferably from 30 to 230 µm, and more preferably from 50 to 200 µm. The coating thickness X should be determined taking into account the thickness (post-drying thickness) of the pressure-sensitive adhesive layer to be formed. If the coating thickness X is too large or small, the coating appearance may be degraded.

Various methods may be used in the applying step (1A) or (1B). Specific examples of such methods include roll coating, kiss roll coating, gravure coating, reverse coating, roll brush coating, spray coating, dip roll coating, bar coating, knife coating, air knife coating, curtain coating, lip coating, and extrusion coating with a die coater or the like. Among such methods, a die coater method is preferred, and a die coater method using a fountain die or a slot die is particularly preferred. In the process (A), an optical film is subjected to the applying step (1A). In the process (B), a release film is subjected to the applying step (1B).

In the process (A) or (B), the step (2A) or (2B) is performed to form a pressure-sensitive adhesive layer. In the forming step (2A) or (2B), the applied pressure-sensitive adhesive coating liquid is generally dried. The drying temperature is preferably from 40° C. to 200° C., more preferably from 50° C. to 180° C., in particular, preferably from 70° C. to 170° C.

The drying time to be used is appropriately selected. The drying time is preferably from 5 seconds to 20 minutes, more preferably from 5 seconds to 10 minutes, in particular, preferably from 10 seconds to 5 minutes.

When the pressure-sensitive adhesive contains a crosslinking agent, it is preferred that the total content of the crosslinking agent should be adjusted for the formation of the pressure-sensitive adhesive layer and that the effect of the crosslinking temperature and the crosslinking time should be carefully considered. The crosslinking treatment may be performed at the temperature during the drying process the pressure-sensitive adhesive layer, or may be separately performed after the drying process.

In the process (A), the pressure-sensitive adhesive layer is formed directly on the optical film by the step (2A) so that the pressure-sensitive adhesive optical film is obtained. In the process (B), the pressure-sensitive adhesive layer is formed on the release film by the step (2B), and then the pressure-sensitive adhesive layer is transferred to the optical film by the step (3) of bonding the pressure-sensitive adhesive layer to the optical film so that the pressure-sensitive adhesive optical film is obtained. When the pressure-sensitive adhesive polarizing plate shown in FIG. 2 or 3 is prepared, the pressure-sensitive adhesive plate A1 or A2 is used as the optical film 1, and the pressure-sensitive adhesive layer 2 is formed on a side of the polarizing plate A1 or A2 opposite to its side where the first transparent protective film (b1) is provided, in both of the processes (A) and (B).

Examples of the material used to form the release film include a plastic film such as a polyethylene, polypropylene, polyethylene terephthalate, or polyester film, a porous material such as paper, fabric, or nonwoven fabric, and an appropriate thin material such as a net, a foamed sheet, a metal foil, and a laminate thereof. A plastic film is preferably used, because of its good surface smoothness.

Any plastic film capable of protecting the pressure-sensitive adhesive layer may be used, examples of which include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, and an ethylene-vinyl acetate copolymer film.

The thickness of the release film is generally from about 5 to about 200 µm, preferably from about 5 to about 100 µm. If necessary, the separator may be subjected to a release treatment and an antifouling treatment with a silicone, fluoride, long-chain alkyl, or fatty acid amide release agent, silica powder or the like, or subjected to an antistatic treatment of coating type, kneading and mixing type, vapor-deposition type, or the like. In particular, when the surface of the release film is appropriately subjected to a release treatment such as a silicone treatment, a long-chain alkyl treatment, or a fluorine treatment, the releasability from the pressure-sensitive adhesive layer can be further increased.

The pressure-sensitive adhesive layer may be exposed. In such a case, the pressure-sensitive adhesive layer may be protected by the release film until it is actually used. The release film may be used as is as a separator for a pressure-sensitive adhesive optical film, so that the process can be simplified.

A surface of the optical film, provided that the surface is a side where the first protective film is not prepares if the optical film is the polarizing plate, may also be coated with an anchor layer or subjected to any adhesion-facilitating treatment such as a corona treatment or a plasma treatment so as to have improved adhesion to a pressure-sensitive adhesive layer, and then the pressure-sensitive adhesive layer may be formed.

The surface of the pressure-sensitive adhesive layer may also be subjected to an adhesion-facilitating treatment.

Materials that may be used to form the anchor layer preferably include an anchoring agent selected from polyurethane, polyester, polymers containing an amino group in the molecule, and polymers containing an oxazolinyl group in the molecule, in particular, preferably polymers containing an amino group in the molecule and polymers containing an oxazolinyl group in the molecule. Polymers containing an amino group in the molecule and polymers containing an oxazolinyl group in the molecule allow the amino group in the molecule or an oxazolinyl group in the molecule to react with a carboxyl group or the like in the pressure-sensitive adhesive or to make an interaction such as an ionic interaction, so that good adhesion can be ensured.

Examples of polymers containing an amino group in the molecule include polyethyleneimine, polyallylamine, polyvinylamine, polyvinylpyridine, polyvinylpyrrolidine, and a polymer of an amino group-containing monomer such as dimethylaminoethyl acrylate.

The pressure-sensitive adhesive optical film such as pressure-sensitive polarizing plate of the invention is preferably used to form various types of image displays such as liquid crystal displays. Liquid crystal displays may be produced according to conventional techniques. Specifically, liquid crystal displays are generally produced by appropriately assembling a display panel such as a liquid crystal cell and the pressure-sensitive polarizing plate and optionally other components such as a lighting system and incorporating a driving circuit according to any conventional technique, except that the pressure-sensitive adhesive optical film of the invention is used. Any type of liquid crystal cell may also be used such as a TN type, an STN type, a n type, a VA type and an IPS type.

Suitable liquid crystal displays, such as liquid crystal display with which the above pressure-sensitive polarizing plate has been provided on one side or both sides of the display panel such as a liquid crystal cell, and with which a backlight or a reflective plate is used for a lighting system may be manufactured. In this case, the pressure-sensitive polarizing plate of the invention may be provided on one side or both sides of the display panel such as a liquid crystal cell. When providing the pressure-sensitive polarizing plates on both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display: OLED) will be explained. Generally, in organic EL display, a transparent electrode, an organic luminescence layer and a metal electrode are laminated on a transparent substrate in an order configuring an illuminant (organic electro luminescence illuminant). Here, a organic luminescence layer is a laminated material of various organic thin films, and much compositions with various combination are known, for example, a laminated material of hole injection layer including triphenylamine derivatives etc., a luminescence layer including fluorescent organic solids, such as anthracene; a laminated material of electronic injection layer including such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in an intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarization plate, while preparing the polarization plate on the surface side of the transparent electrode.

Since the retardation plate and the polarization plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarization plate and the retardation plate is adjusted to $\pi/4$, the mirror surface of the metal electrode may be completely covered.

This means that only linearly polarized light component of the external light that enters as incident light into this organic EL display is transmitted with the work of polarization plate. This linearly polarized light generally gives an elliptically polarized light by the retardation plate, and especially the retardation plate is a quarter wavelength plate, and moreover when the angle between the two polarization directions of the polarization plate and the retardation plate is adjusted to $\pi/4$, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarization plate, it cannot be transmitted through the polarization plate. As the result, mirror surface of the metal electrode may be completely covered.

As described above, in order to block mirror reflection, the organic EL panel of an organic EL display may use an elliptically or circularly polarizing plate having a combination of a retardation plate and a polarizing plate with the pressure-sensitive adhesive layer interposed therebetween. Alternatively, without an elliptically or circularly polarizing plate directly bonded to an organic EL panel, a laminate formed by bonding an elliptically or circularly polarizing plate to a touch panel with the pressure-sensitive adhesive layer interposed therebetween may be used in an organic EL panel.

The invention is applicable to various types of touch panel, such as optical, ultrasonic, capacitance, and resistive touch panels. A resistive touch panel includes: a touch-side, touch panel-forming electrode plate having a transparent conductive thin film; and a display-side, touch panel-forming electrode plate having a transparent conductive thin film, wherein the electrode plates are opposed to each other with spacers interposed therebetween in such a manner that the transparent conductive thin films are opposed to each other. A capacitance touch panel generally includes a transparent conductive film that has a transparent conductive thin film in a specific pattern and is formed over the surface of a display unit. The pressure-sensitive adhesive optical film according to the invention may be used on any of the touch side and the display side.

EXAMPLES

Hereinafter, the invention is more specifically described with reference to the examples, which however are not intended to limit the invention. In each example, "parts" and "%" are all by weight. Unless otherwise specified below, the conditions for allowing standing at room temperature are 23° C. and 65% RH in all cases.

[Measurement of Weight Average Molecular Weight of (Meth)Acryl-Based Polymer]

The weight average molecular weight and the degree of dispersion (weight average molecular weight/number average molecular weight) of each (meth)acryl-based polymer were determined using gel permeation chromatography (GPC).

Analyzer: HLC-8120GPC manufactured by TOSOH CORPORATION
Columns: GM7000H$_{XL}$+GMH$_{XL}$+GMH$_{XL}$ manufactured by TOSOH CORPORATION
Column size: each 7.8 mm$\phi$×30 cm, 90 cm in total
Column temperature: 40° C.
Flow rate: 0.8 ml/minute
Injection volume: 100 μl
Eluent: tetrahydrofuran
Detector: differential refractometer (RI)
Standard sample: polystyrene

[Haze]

The haze (%) of each transparent protective film was measured using a haze meter (Model HM-150 manufactured by Murakami Color Research Laboratory).

[Viscosity Y of Pressure-Sensitive Adhesive Coating Liquid]

The viscosity Y (P) of each pressure-sensitive adhesive coating liquid was measured using VISCOMETER Model BH manufactured by TOKI SANGYO CO., LTD. under the following conditions.

Rotor: No. 4
Rotation speed: 20 rpm
Measurement temperature: 30° C.

[Thickness X of Pressure-Sensitive Adhesive Coating Liquid]

The thickness X (μm) of the pressure-sensitive adhesive coating liquid is the value calculated from the formula below using the solid concentration (%) of the pressure-sensitive adhesive coating liquid and the thickness (μm) of the pressure-sensitive adhesive layer formed by applying the coating liquid and drying the applied liquid.

The thickness X (μm) of the pressure-sensitive adhesive coating liquid={(the thickness (μm) of the pressure-sensitive adhesive layer)/(the solid concentration (%) of the pressure-sensitive adhesive coating liquid)}×100

<Preparation of Acrylic Pressure-Sensitive Adhesive (1)>

To a reaction vessel equipped with a condenser, a nitrogen-introducing tube, a thermometer, and a stirrer were added 99 parts of butyl acrylate, 1 part of 4-hydroxybutyl acrylate, and 0.3 parts of 2,2-azobisisobutyronitrile (based on 100 parts of the total solids of the monomers) together with ethyl acetate. Under a nitrogen gas stream, the mixture was allowed to react at 60° C. for 4 hours. Ethyl acetate was then added to the reaction liquid, so that a solution containing an acryl-based polymer (A) with a weight average molecular weight of 1,700,000 and a degree of dispersion of 4.1 was obtained (30% in solid concentration). Based on 100 parts of the solid in the solution containing the acryl-based polymer (A), 0.15 parts of trimethylolpropane xylylene diisocyanate (Takenate D110N manufactured by Mitsui Takeda Chemicals, Inc.) and 0.2 parts of a silane coupling agent (A-100 manufactured by Soken Chemical & Engineering Co., Ltd., an acetoacetyl group-containing silane coupling agent) were added to the solution, so that a solution of an acrylic pressure-sensitive adhesive (1) was obtained.

<Preparation of Acrylic Pressure-Sensitive Adhesive (2)>

To a reaction vessel equipped with a condenser, a nitrogen-introducing tube, a thermometer, and a stirrer were added 94.9 parts of butyl acrylate, 5 parts of acrylic acid, 0.1 parts of 2-hydroxyethyl acrylate, and 0.3 parts of dibenzoyl peroxide (based on 100 parts of the total solids of the monomers) together with ethyl acetate. Under a nitrogen gas stream, the mixture was allowed to react at 60° C. for 7 hours. Ethyl acetate was then added to the reaction liquid, so that a solution containing an acryl-based polymer (B) with a weight average molecular weight of 2,200,000 and a degree of dispersion of 3.9 was obtained (30% in solid concentration). Based on 100 parts of the solid in the solution containing the acryl-based polymer (B), 0.6 parts of trimethylolpropane tolylene diisocyanate (CORONATE L manufactured by Nippon Polyurethane Industry Co., Ltd.) and 0.075 parts of γ-glycidoxypropylmethoxysilane (KBM-403 manufactured by Shin-Etsu Chemical Co., Ltd.) were added to the solution, so that a solution of an acrylic pressure-sensitive adhesive (2) was obtained.

<Preparation of Acrylic Pressure-Sensitive Adhesive (3)>

To a reaction vessel equipped with a condenser, a nitrogen-introducing tube, a thermometer, and a stirrer were added 94.9 parts of butyl acrylate, 5 parts of acrylic acid, 0.1 parts of 2-hydroxyethyl acrylate, and 0.3 parts of dibenzoyl peroxide (based on 100 parts of the total solids of the monomers) together with a mixed solvent of ethyl acetate and toluene whose weight ratio is 50 to 50. Under a nitrogen gas stream, the mixture was allowed to react at 60° C. for 7 hours. Ethyl acetate was then added to the reaction liquid, so that a solution containing an acryl-based polymer (C) with a weight average molecular weight of 500,000 and a degree of dispersion of 5 was obtained (50% in solid concentration). Based on 100 parts of the solid in the solution containing the acryl-based polymer (C), 0.6 parts of trimethylolpropane tolylene diisocyanate (CORONATE L manufactured by Nippon Polyurethane Industry Co., Ltd.) and 0.075 parts of γ-glycidoxypropylmethoxysilane (KBM-403 manufactured by Shin-Etsu Chemical Co., Ltd.) were added to the solution, so that a solution of an acrylic pressure-sensitive adhesive (3) was obtained.

<Preparation of Acrylic Pressure-Sensitive Adhesive (4)>

To a reaction vessel equipped with a condenser, a nitrogen-introducing tube, a thermometer, and a stirrer were added 94.9 parts of butyl acrylate, 5 parts of acrylic acid, 0.1 parts of 2-hydroxyethyl acrylate, and 0.3 parts of dibenzoyl peroxide (based on 100 parts of the total solids of the monomers) together with a mixed solvent of ethyl acetate and toluene whose weight ratio is 80 to 20. Under a nitrogen gas stream, the mixture was allowed to react at 60° C. for 7 hours. Ethyl acetate was then added to the reaction liquid, so that a solution containing an acryl-based polymer (D) with a weight average molecular weight of 1,000,000 and a degree of dispersion of 4 was obtained (50% in solid concentration). Based on 100 parts of the solid in the solution containing the acryl-based polymer (D), 0.6 parts of trimethylolpropane tolylene diisocyanate (CORONATE L manufactured by Nippon Polyurethane Industry Co., Ltd.) and 0.075 parts of γ-glycidoxypropylmethoxysilane (KBM-403 manufactured by Shin-Etsu Chemical Co., Ltd.) were added to the solution, so that a solution of an acrylic pressure-sensitive adhesive (4) was obtained.

<Preparation of Acrylic Pressure-Sensitive Adhesive (5)>

To a reaction vessel equipped with a condenser, a nitrogen-introducing tube, a thermometer, and a stirrer were added 94.9 parts of butyl acrylate, 5 parts of acrylic acid, 0.1 parts of 2-hydroxyethyl acrylate, and 0.3 parts of dibenzoyl peroxide (based on 100 parts of the total solids of the monomers) together with a mixed solvent of ethyl acetate and toluene whose weight ratio is 60 to 40. Under a nitrogen gas stream, the mixture was allowed to react at 60° C. for 7 hours. Ethyl acetate was then added to the reaction liquid, so that a solution containing an acryl-based polymer (E) with a weight average molecular weight of 700,000 and a degree of dispersion of 4.8 was obtained (50% in solid concentration). Based on 100 parts of the solid in the solution containing the acryl-based polymer (E), 0.6 parts of trimethylolpropane tolylene diisocyanate (CORONATE L manufactured by Nippon Polyurethane Industry Co., Ltd.) and 0.075 parts of γ-glycidoxypropylmethoxysilane (KBM-403 manufactured by Shin-Etsu Chemical Co., Ltd.) were added to the solution, so that a solution of an acrylic pressure-sensitive adhesive (5) was obtained.

<Preparation of Acrylic Pressure-Sensitive Adhesive (6)>

To a vessel were added 980 parts of butyl acrylate and 20 parts of acrylic acid, and they are mixed to form a monomer mixture. Subsequently, 20 parts of AQUALON HS-10 (manufactured by Dai-ichi Kogyo Seiyaku Co., Ltd.) as a reactive surfactant and 635 parts of ion-exchanged water were added to 1,000 parts of the monomer mixture prepared with the above composition, and forcedly emulsified by stirring at 6,000 (rpm) for 5 minutes using a homomixer (manufactured by PRIMIX Corporation), so that a monomer emulsion was obtained. To a reaction vessel equipped with a condenser, a nitrogen-introducing tube, a thermometer, a dropping funnel, and a stirring blade were added 200 parts of a portion of the monomer emulsion prepared as described above and 330 parts of ion-exchanged water. Subsequently, after the space in the reaction vessel was sufficiently replaced with nitrogen gas, 0.6 parts of ammonium persulfate was added to the vessel, and the mixture was subjected to polymerization at 60° C. for 1 hour with stirring. Subsequently, 800 parts of the remaining portion of the monomer emulsion was added dropwise to the reaction vessel over 3 hours, while the reaction vessel was kept at 60° C. The mixture was then subjected to polymerization for 3 hours, so that an aqueous dispersion containing emulsion particles of a (meth)acryl-based polymer (F) at a solid concentration of 46.2% was obtained. Subsequently, after the aqueous dispersion was cooled to room temperature, 10% ammonia water was added thereto, so that an aqueous dispersion with an adjusted pH of 8 and an adjusted solids content of 45.9% was obtained. The resulting dispersion was used as an acrylic pressure-sensitive adhesive (6).

<Preparation of Acrylic Pressure-Sensitive Adhesive (7)>

Based on 100 parts of the solid in the solution containing the acryl-based polymer (A) prepared for the acrylic pressure-sensitive adhesive (1), 0.3 parts of dibenzoyl peroxide (NYPER BMT manufactured by NOF CORPORATION), 0.02 parts of trimethylolpropane xylylene diisocyanate (Takenate D110N manufactured by Mitsui Takeda Chemicals, Inc.), and 0.2 parts of a silane coupling agent (A-100 manufactured by Soken Chemical & Engineering Co., Ltd., an acetoacetyl group-containing silane coupling agent) were added to the solution, so that a solution of an acrylic pressure-sensitive adhesive (7) was obtained.

<Preparation of Acrylic Pressure-Sensitive Adhesive (8)>

To a reaction vessel equipped with a condenser, a nitrogen-introducing tube, a thermometer, and a stirrer were added 81.9 parts of butyl acrylate, 13.0 parts of benzyl acrylate, 5.0 parts of acrylic acid, 0.1 parts of 4-hydroxybutyl acrylate, and 0.1 parts of 2,2'-azobisisobutyronitrile (based on 100 parts of the total solids of the monomers) together with ethyl acetate. Under a nitrogen gas stream, the mixture was allowed to react at 55° C. for 8 hours. Ethyl acetate was then added to the reaction liquid, so that a solution containing an acryl-based polymer (G) with a weight average molecular weight of 2,000,000 and a degree of dispersion of 3 was obtained (30% in solid concentration). Based on 100 parts of the solid in the solution containing the acryl-based polymer (G), 0.09 parts of dibenzoyl peroxide (NYPER BMT manufactured by NOF CORPORATION), 0.45 parts of trimethylolpropane tolylene diisocyanate (CORONATE L manufactured by Nippon Polyurethane Industry Co., Ltd.), 0.2 parts of γ-glycidoxypropylmethoxysilane (KBM-403 manufactured by Shin-Etsu Chemical Co., Ltd.), and 0.25 parts of a polyether compound (Silyl SAT10, manufactured by Kaneka Corporation) were added to the solution, so that a solution of an acrylic pressure-sensitive adhesive (8) was obtained.

<Preparation of Acrylic Pressure-Sensitive Adhesive (9)>

Based on 100 parts of the solid in the solution containing the acryl-based polymer (A) prepared for the acrylic pressure-sensitive adhesive (1), 0.3 parts of dibenzoyl peroxide (NYPER BMT manufactured by NOF CORPORATION), 0.1 parts of trimethylolpropane xylylene diisocyanate (Takenate D110N manufactured by Mitsui Takeda Chemicals, Inc.), and 0.2 parts of a silane coupling agent (A-100 manufactured by Soken Chemical & Engineering Co., Ltd., an acetoacetyl group-containing silane coupling agent) were added to the solution, so that a solution of an acrylic pressure-sensitive adhesive (9) was obtained.

<Preparation of Polarizer (1)>

An 80-μm-thick polyvinyl alcohol film was stretched to 3 times between rollers different in velocity ratio, while it was dyed in a 0.3% iodine solution at 30° C. for 1 minute. The film was then stretched to a total stretch ratio of 6 times, while it was immersed in an aqueous solution containing 4% of boric acid and 10% of potassium iodide at 60° C. for 0.5 minutes. Subsequently, the film was cleaned by immersion in an aqueous solution containing 1.5% of potassium iodide at 30° C. for 10 seconds, and then dried at 50° C. for 4 minutes to give a 20-μm-thick polarizer.

<Preparation of Polarizer (2)>

The thin high-performance polarizing film (5 μm in thickness) obtained in Reference Production Example 1 described above was used.

<Preparation of Polarizer (3)>

The thin high-performance polarizing film (3 μm in thickness) obtained in Reference Production Example 2 described above was used.

<Preparation of Polarizer (4)>

A process for forming a thin polarizing film was performed. In the process, a laminate including an amorphous PET substrate and a 9-μm-thick PVA layer formed thereon was first subjected to auxiliary in-air stretching at a stretching temperature of 130° C. to form a stretched laminate. Subsequently, the stretched laminate was subjected to dyeing to form a colored laminate, and the colored laminate was subjected to stretching in an aqueous boric acid solution at a stretching temperature of 65° C. to a total stretch ratio of 5.94 times, so that an optical film laminate was obtained, which had a 4-μm-thick PVA layer stretched together with the amorphous PET substrate. Such two-stage stretching successfully formed an optical film laminate having a 4-μm-thick PVA layer, which was produced on the amorphous PET substrate, contained highly oriented PVA molecules, and formed a highly-functional polarizing film in which iodine adsorbed by the dyeing formed a polyiodide ion complex oriented highly in a single direction.

(Transparent Protective Films)

The following transparent protective films were used. The symbols in Tables 1 and 2 represent the following materials, respectively.

40TAC: A 40-μm-thick triacetylcellulose film (KC4UY manufactured by Konica Minolta Holdings, Inc., 0.3% in haze value)

80TAC: An 80-μm-thick triacetylcellulose film (TD80UL manufactured by Fujifilm Corporation, 0.3% in haze value)

20ACRYL: A 20-μm-thick acrylic resin film (0.2% in haze value)

22ZEONOR: A 22-μm-thick cyclic olefin-based resin film (ZEONOR ZD12 manufactured by ZEON CORPORATION, 0.1% in haze value)

40APET: A 40-μm-thick amorphous polyethylene terephthalate film (NOVACLEAR manufactured by Mitsubishi Plastics, Inc., 0.2% in haze value)

(Retardation Plates)

The following retardation plates were used. The symbols in Table 2 represent the following materials, respectively.

50POLYCA: A 50-μm-thick polycarbonate film (PUREACE WR manufactured by TEIJIN LIMITED., 147 nm in retardation)

34OLEFIN: A 34-μm-thick cyclic olefin-based resin film (a film manufactured by Kaneka Corporation, 140 nm in retardation)

33OLEFIN: A 33-μm-thick cyclic olefin-based resin film (a film manufactured by Kaneka Corporation, 270 nm in retardation)

(Optical Films)

The following optical films were used. The symbols in Table 3 represent the following materials, respectively.

40TAC: A 40-μm-thick triacetylcellulose film (KC4UY manufactured by Konica Minolta Holdings, Inc., 0.3% in haze value)

60TAC: A 60-μm-thick triacetylcellulose film (TD60UL manufactured by Fujifilm Corporation, 0.3% in haze value)

80TAC: An 80-μm-thick triacetylcellulose film (TD80UL manufactured by Fujifilm Corporation, 0.3% in haze value)

30ACRYL: A 30-µm-thick acrylic resin film (0.2% in haze value)

In Table 3, 40TAC:*1 represents an antiglare hard coat film prepared by the method described below. In Table 3, 40TAC:*2 represents an antireflection film (DSG-03 (trade name) manufactured by Dai Nippon Printing Co., Ltd.).

(Preparation of Antiglare Hard Coat Film)

A hard coat layer-forming material (OPSTAR Z7540 (trade name) manufactured by JSR Corporation, solids content: 56% by weight, solvent: butyl acetate/methyl ethyl ketone (MEK)=76/24 (in weight ratio)) was provided, which was a dispersion containing silica nanoparticles produced by coupling inorganic oxide particles with a polymerizable unsaturated group-containing organic compound. The hard coat layer-forming material contains components (A): dipentaerythritol and isophorone diisocyanate-based polyurethane and component (B): silica fine particles whose surface is modified with an organic molecule (100 nm or less in weight average particle size), in which the ratio of the total weight of components (A) to the weight of component (B) is 2:3. Based on 100 parts by weight of the resin solid in the hard coat layer-forming material, 5 parts by weight of acryl-styrene crosslinked fine particles (TECHNOPOLYMER XX80AA (trade name) manufactured by SEKISUI CHEMICAL CO., LTD., weight average particle size: 5.5 µm, refractive index: 1.515), 0.1 parts by weight of a leveling agent (GRANDIC PC-4100 (trade name) manufactured by DIC Corporation), and 0.5 parts by weight of a photopolymerization initiator (Irgacure 127 (trade name) manufactured by Ciba Specialty Chemicals Inc.) were added to the hard coat layer-forming material. The resulting mixture was diluted with butyl acetate/MEK (2/1 in weight ratio) to a solid concentration of 45% by weight, so that an antiglare hard coat layer-forming material was obtained.

A triacetylcellulose film (KC4UY (trade name) manufactured by Konica Minolta Holdings, Inc., 40 µm in thickness) was provided as a transparent plastic film substrate. The antiglare hard coat layer-forming material was applied to one side of the transparent plastic film substrate using a comma coater to form a coating film. The coating film was then dried by heating at 100° C. for 1 minute. Subsequently, the coating film was cured by ultraviolet irradiation at a total dose of 300 mJ/cm$^2$ using a high-pressure mercury lamp to form a 9-µm-thick antiglare hard coat layer, so that an antiglare hard coat film was obtained.

Example 1

(Preparation of Polarizing Plate)

A polarizing plate was prepared by bonding 40-µm-thick triacetylcellulose films (KC4UY manufactured by Konica Minolta Holdings, Inc., 0.3% in haze value) as first and second transparent protective films to both sides of the polarizer (1) with an polyvinyl alcohol-based adhesive.

(Preparation of Pressure-Sensitive Adhesive Coating Liquid)

The solution of the acrylic pressure-sensitive adhesive (1) prepared in Production Example 1 was diluted with ethyl acetate to a solid concentration of 15%, so that a pressure-sensitive adhesive coating liquid was obtained. The pressure-sensitive adhesive coating liquid had a viscosity of 65 P.

(Preparation of Pressure-Sensitive Adhesive Polarizing Plate)

The pressure-sensitive adhesive coating liquid prepared as described above was applied to one side of a 38-µm-thick, silicone-treated, polyethylene terephthalate (PET) film (MRF38 manufactured by Mitsubishi Polyester Film) with a fountain die coater so as to form a coating with a thickness of 134.0 µm. The coating was then dried at 155° C. for 1 minute to form a 20-µm-thick pressure-sensitive adhesive layer. The pressure-sensitive adhesive layer was transferred to the second transparent protective film side of the polarizing plate prepared as described above, so that a pressure-sensitive adhesive polarizing plate was obtained.

Examples 2 to 29 and Comparative Examples 1 to 4

Pressure-sensitive adhesive polarizing plates were prepared as in Example 1, except that the polarizing plates used were each produced with the polarizer and the first and second transparent protective films shown in Table 1, the pressure-sensitive adhesive coating liquid shown in Table 1 was used, the coating thickness of the pressure-sensitive adhesive coating liquid was changed as shown in Table 1, and the thickness of the pressure-sensitive adhesive layer was changed as shown in Table 1. When the polarizer (2), (3), or (4) was used, the polarizing plate was prepared as follows. The first transparent protective film was bonded to the resulting laminate film or the resulting optical film laminate with a polyvinyl alcohol-based adhesive being applied to the surface of the polarizing film of the laminate film or the optical film laminate. Subsequently, the amorphous PET substrate was peeled off, and the second transparent protective film was bonded to the product with a polyvinyl alcohol-based adhesive, so that the polarizing plate was obtained. When the second transparent protective film was not used in the polarizing plate, the pressure-sensitive adhesive layer was transferred to the polarizing film to form the pressure-sensitive adhesive polarizing plate.

Examples 30 to 37 and Comparative Examples 5 to 8

Pressure-sensitive adhesive polarizing plates were prepared as in Example 1, except that the polarizing plates used were each produced with the polarizer and the first and second transparent protective films shown in Table 2, the pressure-sensitive adhesive coating liquid shown in Table 2 was used, the coating thickness of the pressure-sensitive adhesive coating liquid was changed as shown in Table 2, and the thickness of the pressure-sensitive adhesive layer was changed as shown in Table 2. The pressure-sensitive adhesive layer bonded to the polarizing plate corresponds to the first pressure-sensitive adhesive layer in Table 2.

The structure shown in each of FIGS. 4 to 7 was further obtained using the resulting pressure-sensitive adhesive polarizing plate. The first retardation plate was bonded to the pressure-sensitive adhesive polarizing plate with the second pressure-sensitive adhesive layer, and the second retardation plate was bonded to the pressure-sensitive adhesive polarizing plate with the third pressure-sensitive adhesive layer, when the laminated pressure-sensitive adhesive polarizing plates were obtained. The second and third pressure-sensitive adhesive layers were each formed as follows. The pressure-sensitive adhesive coating liquid shown in Table 2 was applied to one side of a 38-µm-thick, silicone-treated, polyethylene terephthalate (PET) film (MRF38 manufactured by Mitsubishi Polyester Film) with a fountain die coater so as to form a coating with the thickness shown in Table 2. The coating was then dried at 155° C. for 1 minute to form a pressure-sensitive adhesive layer with the thickness shown in Table 2. The resulting second or third pressure-sensitive adhesive layer was transferred to the first or second retardation plate to form a pressure-sensitive adhesive retardation plate, which was used to form the laminated pressure-sensitive adhesive polarizing plate.

Examples 38 to 52 and Comparative Examples 9 to 13

Pressure-sensitive adhesive optical films were prepared as in Example 1, except that the optical film shown in Table 3 was used instead of the polarizing plate in the preparation of the pressure-sensitive adhesive polarizing plate, the pressure-sensitive adhesive coating liquid shown in Table 3 was used, the coating thickness of the pressure-sensitive adhesive coating liquid was changed as shown in Table 3, and the thickness of the pressure-sensitive adhesive layer was changed as shown in Table 3.

In each example, the pressure-sensitive adhesive coating liquid was prepared as follows. The acrylic pressure-sensitive adhesive was diluted with ethyl acetate (for a solution) or with water (for an aqueous dispersion) when the solid concentration and viscosity of the pressure-sensitive adhesive coating liquid were adjusted. When the polarizing plate did not have the second transparent protective film, the pressure-sensitive adhesive layer was transferred to a side of the polarizing plate opposite to a side where the first transparent protective film was provided (namely, transferred directly to the polarizer).

The pressure-sensitive adhesive polarizing plates, the laminated pressure-sensitive adhesive polarizing plates, and the pressure-sensitive adhesive optical films (the samples) obtained in the examples and the comparative examples were evaluated as described below. The evaluation results are shown in Tables 1 to 3.

<Thickness of Pressure-Sensitive Adhesive Layer and Standard Deviation>

The thickness of each pressure-sensitive adhesive layer in 5 cm square piece of each pressure-sensitive adhesive polarizing plate, laminated pressure-sensitive adhesive polarizing plate, or pressure-sensitive adhesive optical film (sample) was measured at 2,061 points at intervals of 1 mm by optical interferometry at a wavelength of 700 to 900 nm using a spectrophotometer MCPD-3700 manufactured by Otsuka Electronics Co., Ltd. The thickness of the pressure-sensitive adhesive layer and the thickness (μm) standard deviation were calculated from the measured values.

<Measurement of ISC>

The level of the in-plane irregularities of each pressure-sensitive adhesive polarizing plate, laminated pressure-sensitive adhesive polarizing plate, or pressure-sensitive adhesive optical film was determined as an ISC value using EyeScale-4W manufactured by I System Co., Ltd. in the ISC measurement mode of the 3CCD image sensor according to the operation manual of the system.

(Measurement Conditions)

The sample used was a laminate of a non-alkali glass plate (1737 manufactured by Corning Incorporated) and the pressure-sensitive adhesive polarizing plate, the laminated pressure-sensitive adhesive polarizing plate, or the pressure-sensitive adhesive optical film bonded to the glass plate. The light source, the sample, and the screen were placed in this order, and the transmission image of the sample projected on the screen was measured with the CCD camera. The sample (the pressure-sensitive adhesive layer bonded to the non-alkali glass plate) was placed 30 cm apart from the light source and the CCD camera. The screen was placed 100 cm apart from the light source and the CCD camera. The light source and the CCD camera were placed 20 cm apart equally from the sample and the screen.

The ISC value is an index for the evaluation of irregularities. An ISC value of 100 or less indicates that irregularities are controlled to be low. The lower ISC value indicates the lower level of irregularities. The ISC value is preferably 70 or less, and more preferably 50 or less.

<Visual Evaluation of Pressure-Sensitive Adhesive Polarizing Plate and Laminated Pressure-Sensitive Adhesive Polarizing Plate>

The pressure-sensitive adhesive polarizing plate or laminated pressure-sensitive adhesive polarizing plate (sample) was bonded to a black acrylic plate, and the appearance of it was visually evaluated under a fluorescent light according to the criteria below. Concerning the laminated pressure-sensitive adhesive polarizing plate, the first pressure-sensitive adhesive layer was used to form the pressure-sensitive adhesive polarizing plate, the second pressure-sensitive adhesive layer was used to form the pressure-sensitive adhesive retardation plate having the first retardation plate, and the third pressure-sensitive adhesive layer was used to form the pressure-sensitive adhesive retardation plate having the second retardation plate, when the samples were formed.

OOO: Unevenness is not observed at all.
OO: Unevenness is hardly observed.
O: Unevenness is observed but not significant.
X: Unevenness is observed.

<Visual Evaluation of Pressure-Sensitive Adhesive Optical Film>

The pressure-sensitive adhesive optical film (sample) was bonded to a transparent acrylic plate with a smooth surface, which was intended to represent a structure including a front face plate and an optical film bonded to the viewer side of the front face plate. The appearance of the resulting laminate was visually evaluated under a fluorescent light according to the criteria below. For the evaluation, the optical film side and the acrylic plate side were observed, respectively.

OOO: Surface irregularities are not observed at all.
OO: Surface irregularities are hardly observed.
O: Surface irregularities are observed but have no significant effect on visibility.
X: Surface irregularities are large and have a significant effect on visibility.

TABLE 1

| | Polarizing plate | | | | | | Pressure-sensitive adhesive layer | | | | | | | | Evaluations | | | |
|---|---|---|---|---|---|---|---|---|---|---|---|---|---|---|---|---|---|---|
| | Polarizer | | First transparent protective film | | Second transparent protective film | | Pressure-sensitive adhesive | | | | Pressure-sensitive adhesive coating liquid | | | | Pressure-sensitive adhesive layer | | | Unevenness |
| | Type | Thickness (μm) | Type | Haze (%) | Type | Type | Acryl-based polymer type | Weight average molecular weight (×10,000) | Degree of dispersion | Solid concentration (%) | Coating liquid viscosity Y (P) | Coating liquid thickness X (μm) | 0.8X − Y | Thickness (μm) | Standard deviation (μm) | ISC value | Visual check |
| Example 1 | (1) | 20 | 40TAC | 0.3 | 40TAC | (1) | A | 170 | 4.1 | 15 | 65 | 134.0 | 42.2 | 20.1 | 0.10 | 71 | ○ |
| Example 2 | (1) | 20 | 40TAC | 0.3 | 40TAC | (9) | A | 170 | 4.1 | 14 | 50 | 144.3 | 65.4 | 20.2 | 0.10 | 90 | ○ |
| Example 3 | (1) | 20 | 40TAC | 0.3 | 40TAC | (2) | B | 220 | 3.9 | 12 | 88 | 191.7 | 65.3 | 23.0 | 0.10 | 65 | ○ |
| Example 4 | (1) | 20 | 40TAC | 0.3 | 40TAC | (2) | B | 220 | 3.9 | 11 | 50 | 136.4 | 59.1 | 23.0 | 0.04 | 59 | ○ |
| Example 5 | (1) | 20 | 40TAC | 0.3 | 40TAC | (2) | B | 220 | 3.9 | 13 | 132 | 176.9 | 9.5 | 15.0 | 0.06 | 45 | ○ |
| Example 6 | (1) | 20 | 40TAC | 0.3 | 40TAC | (3) | C | 50 | 5 | 29 | 44 | 80.0 | 20.0 | 23.0 | 0.03 | 23 | ○ |
| Example 7 | (1) | 20 | 40TAC | 0.3 | 40TAC | (4) | D | 100 | 4 | 21 | 50 | 110.0 | 38.0 | 23.2 | 0.03 | 25 | ○ |
| Example 8 | (1) | 20 | 40TAC | 0.3 | 40TAC | (5) | E | 70 | 4.8 | 30 | 25 | 99.7 | 54.7 | 29.9 | 0.05 | 31 | ○ |
| Example 9 | (1) | 20 | 40TAC | 0.3 | 40TAC | (4) | D | 100 | 4 | 21 | 50 | 110.0 | 38.0 | 23.1 | 0.03 | 38 | ○ |
| Example 10 | (1) | 20 | 40TAC | 0.3 | 80TAC | (4) | D | 100 | 4 | 21 | 50 | 110.5 | 38.4 | 23.2 | 0.03 | 40 | ○ |
| Example 11 | (1) | 20 | 40TAC | 0.3 | 20ACRYL | (4) | D | 100 | 4 | 21 | 50 | 110.0 | 38.0 | 23.1 | 0.03 | 23 | ○ |
| Example 12 | (1) | 20 | 20ACRYL | 0.2 | 22ZEONOR | (4) | D | 100 | 4 | 21 | 50 | 110.0 | 38.0 | 23.1 | 0.03 | 20 | ○ |
| Example 13 | (1) | 20 | 80TAC | 0.3 | 80TAC | (4) | D | 100 | 4 | 21 | 50 | 109.5 | 37.6 | 23.0 | 0.03 | 98 | ○ |
| Example 14 | (1) | 20 | 40TAC | 0.3 | 40TAC | (4) | D | 100 | 4 | 21 | 50 | 110.5 | 38.4 | 23.2 | 0.03 | 23 | ○ |
| Example 15 | (1) | 20 | 40TAC | 0.3 | 40TAC | (4) | D | 100 | 4 | 21 | 50 | 109.0 | 37.2 | 22.9 | 0.03 | 30 | ○ |
| Example 16 | (1) | 20 | 40TAC | 0.3 | 40TAC | (4) | D | 100 | 4 | 21 | 50 | 110.0 | 38.0 | 23.1 | 0.03 | 42 | ○ |
| Example 17 | (1) | 20 | 40TAC | 0.3 | 40TAC | (6) | F | — | — | 38 | 10 | 52.4 | 31.9 | 19.9 | 0.03 | 24 | ○ |
| Example 18 | (2) | 5 | 40TAC | 0.3 | 40APET | (2) | B | 220 | 3.9 | 11 | 50 | 135.5 | 58.4 | 14.9 | 0.07 | 50 | ○ |
| Example 19 | (3) | 3 | 40TAC | 0.3 | 40APET | (2) | B | 220 | 3.9 | 11 | 50 | 135.5 | 58.4 | 14.9 | 0.07 | 47 | ○ |
| Example 20 | (3) | 3 | 40TAC | 0.3 | — | (2) | B | 220 | 3.9 | 11 | 50 | 137.3 | 59.8 | 15.1 | 0.07 | 45 | ○ |
| Example 21 | (2) | 5 | 40TAC | 0.3 | 40APET | (9) | A | 170 | 4.1 | 14 | 50 | 142.9 | 64.3 | 20.0 | 0.07 | 45 | ○ |
| Example 22 | (3) | 3 | 40TAC | 0.3 | 40APET | (9) | A | 170 | 4.1 | 14 | 50 | 143.6 | 64.9 | 20.1 | 0.07 | 43 | ○ |
| Example 23 | (3) | 3 | 40TAC | 0.3 | — | (9) | A | 170 | 4.1 | 14 | 50 | 142.9 | 64.3 | 20.0 | 0.07 | 40 | ○ |
| Example 24 | (2) | 5 | 40TAC | 0.3 | 40APET | (4) | D | 100 | 4 | 21 | 50 | 110.0 | 38.0 | 23.1 | 0.03 | 22 | ○ |
| Example 25 | (3) | 3 | 40TAC | 0.3 | 40APET | (4) | D | 100 | 4 | 21 | 50 | 110.5 | 38.4 | 23.2 | 0.03 | 20 | ○ |
| Example 26 | (3) | 3 | 40TAC | 0.3 | — | (4) | D | 100 | 4 | 21 | 50 | 109.0 | 37.2 | 22.9 | 0.03 | 15 | ○ |
| Example 27 | (4) | 4 | 40TAC | 0.3 | — | (2) | B | 220 | 3.9 | 11 | 50 | 135.5 | 58.4 | 14.9 | 0.07 | 45 | ○ |
| Example 28 | (4) | 4 | 40TAC | 0.3 | — | (9) | A | 170 | 4.1 | 14 | 50 | 142.9 | 64.3 | 20.0 | 0.07 | 35 | ○ |
| Example 29 | (4) | 4 | 40TAC | 0.3 | — | (4) | D | 100 | 4 | 21 | 50 | 110.0 | 38.0 | 23.1 | 0.03 | 15 | ○ |
| Comparative Example 1 | (1) | 20 | 40TAC | 0.3 | 40TAC | (7) | A | 170 | 4.1 | 13 | 35 | 162.3 | 94.8 | 21.1 | 0.14 | 107 | X |

TABLE 1-continued

| | Polarizing plate | | | | | | Pressure-sensitive adhesive layer | | | | | | | | Evaluations | | | |
| | Polarizer | | First transparent protective film | | Second transparent protective film | Pressure-sensitive adhesive | | | | Pressure-sensitive adhesive coating liquid | | | | Pressure-sensitive adhesive layer | | | |
| | Type | Thickness (µm) | Type | Haze (%) | Type | Type | Acryl-based polymer type | Weight average molecular weight (×10,000) | Degree of dispersion | Solid concentration (%) | Coating liquid viscosity Y (P) | Coating liquid thickness X (µm) | 0.8X − Y | Thickness (µm) | Standard deviation (µm) | ISC value | Unevenness Visual check |
|---|---|---|---|---|---|---|---|---|---|---|---|---|---|---|---|---|---|
| Comparative Example 2 | (1) | 20 | 40TAC | 0.3 | 40TAC | (8) | G | 200 | 3 | 13 | 50 | 181.5 | 95.2 | 23.6 | 0.17 | 140 | X |
| Comparative Example 3 | (1) | 20 | 40TAC | 0.3 | 40TAC | (9) | A | 170 | 4.1 | 13 | 35 | 153.8 | 88.1 | 20.0 | 0.14 | 108 | X |
| Comparative Example 4 | (1) | 20 | 40TAC | 0.3 | 40TAC | (2) | B | 220 | 3.9 | 11 | 50 | 210.9 | 118.7 | 23.2 | 0.13 | 118 | X |

TABLE 2

| | Polarizing plate | | | | | | Pressure-sensitive adhesive layer | | |
|---|---|---|---|---|---|---|---|---|---|
| | Polarizer | | First transparent protective film | | Second transparent protective film Type | Retardation plate | | | Pressure-sensitive adhesive | Acryl-based polymer type |
| | | | | | | First Retardation plate Type | Second retardation plate Type | | | |
| | Type | Thickness (μm) | Type | Haze (%) | | | | Type | Type | |
| Example 30 | (1) | 20 | 40TAC | 0.3 | 40TAC | 50POLYCA | — | First pressure-sensitive adhesive layer | (9) | A |
| | | | | | | | | Second pressure-sensitive adhesive layer | (4) | D |
| Example 31 | (1) | 20 | 40TAC | 0.3 | 40TAC | 34OLEFIN | 33OLEFIN | First pressure-sensitive adhesive layer | (9) | A |
| | | | | | | | | Second pressure-sensitive adhesive layer | (9) | A |
| | | | | | | | | Third pressure-sensitive adhesive layer | (4) | D |
| Example 32 | (3) | 3 | 40TAC | 0.3 | — | 50POLYCA | — | First pressure-sensitive adhesive layer | (9) | A |
| | | | | | | | | Second pressure-sensitive adhesive layer | (4) | D |
| Example 33 | (3) | 3 | 40TAC | 0.3 | — | 34OLEFIN | 33OLEFIN | First pressure-sensitive adhesive layer | (9) | A |
| | | | | | | | | Second pressure-sensitive adhesive layer | (9) | A |
| | | | | | | | | Third pressure-sensitive adhesive layer | (4) | D |
| Example 34 | (3) | 3 | 40TAC | 0.3 | — | 50POLYCA | — | First pressure-sensitive adhesive layer | (2) | B |
| | | | | | | | | Second pressure-sensitive adhesive layer | (2) | B |
| Example 35 | (4) | 4 | 40TAC | 0.3 | — | 50POLYCA | — | First pressure-sensitive adhesive layer | (9) | A |
| | | | | | | | | Second pressure-sensitive adhesive layer | (4) | D |
| Example 36 | (4) | 4 | 40TAC | 0.3 | — | 34OLEFIN | 33OLEFIN | First pressure-sensitive adhesive layer | (9) | A |
| | | | | | | | | Second pressure-sensitive adhesive layer | (9) | A |
| | | | | | | | | Third pressure-sensitive adhesive layer | (4) | D |
| Example 37 | (4) | 4 | 40TAC | 0.3 | — | 50POLYCA | — | First pressure-sensitive adhesive layer | (2) | B |
| | | | | | | | | Second pressure-sensitive adhesive layer | (2) | B |
| Comparative Example 5 | (1) | 20 | 40TAC | 0.3 | 40TAC | 50POLYCA | — | First pressure-sensitive adhesive layer | (2) | B |
| | | | | | | | | Second pressure-sensitive adhesive layer | (2) | B |

TABLE 2-continued

| | | | | | | | | | |
|---|---|---|---|---|---|---|---|---|---|
| Comparative Example 6 | (1) | 20 | 40TAC | 0.3 | 40TAC | 34OLEFIN | 33OLEFIN | First pressure-sensitive adhesive layer | (2) | B |
| | | | | | | | | Second pressure-sensitive adhesive layer | (2) | B |
| | | | | | | | | Third pressure-sensitive adhesive layer | (2) | B |
| Comparative Example 7 | (3) | 3 | 40TAC | 0.3 | — | 50POLYCA | — | First pressure-sensitive adhesive layer | (2) | B |
| | | | | | | | | Second pressure-sensitive adhesive layer | (2) | B |
| Comparative Example 8 | (3) | 3 | 40TAC | 0.3 | — | 34OLEFIN | 33OLEFIN | First pressure-sensitive adhesive layer | (2) | B |
| | | | | | | | | Second pressure-sensitive adhesive layer | (2) | B |
| | | | | | | | | Third pressure-sensitive adhesive layer | (2) | B |

| | Pressure-sensitive adhesive | | Pressure-sensitive adhesive coating liquid | | | | Evaluations Pressure-sensitive adhesive layer | | | |
|---|---|---|---|---|---|---|---|---|---|---|
| | Weight average molecular weight (×10,000) | Degree of dispersion | Solid concentration (%) | Coating liquid viscosity Y (P) | Coating liquid thickness X (μm) | 0.8X − Y | Thickness (μm) | Standard deviation (μm) | ISC value | Unevenness Visual check |
| Example 30 | 170 | 4.1 | 14 | 50 | 85.7 | 18.6 | 12.0 | 0.05 | 62 | ○○ |
| | 100 | 4.0 | 21 | 50 | 71.4 | 7.1 | 15.0 | 0.02 | | ○○ |
| Example 31 | 170 | 4.1 | 14 | 50 | 85.7 | 18.6 | 12.0 | 0.05 | 65 | ○○ |
| | 170 | 4.1 | 14 | 50 | 35.7 | −21.4 | 5.0 | 0.05 | | ○○ |
| | 100 | 4.0 | 21 | 50 | 71.4 | 7.1 | 15.0 | 0.02 | | ○○ |
| Example 32 | 170 | 4.1 | 14 | 50 | 85.7 | 18.6 | 12.0 | 0.05 | 27 | ○○○ |
| | 100 | 4.0 | 21 | 50 | 71.4 | 7.1 | 15.0 | 0.02 | | ○○○ |
| Example 33 | 170 | 4.1 | 14 | 50 | 85.7 | 18.6 | 12.0 | 0.05 | 30 | ○○○ |
| | 170 | 4.1 | 14 | 50 | 35.7 | −21.4 | 5.0 | 0.05 | | ○○○ |
| | 100 | 4.0 | 21 | 50 | 71.4 | 7.1 | 15.0 | 0.02 | | ○○○ |
| Example 34 | 220 | 3.9 | 11 | 50 | 109.1 | 37.3 | 12.0 | 0.09 | 83 | ○ |
| | 220 | 3.9 | 11 | 50 | 136.4 | 59.1 | 15.0 | 0.10 | | ○ |
| Example 35 | 170 | 4.1 | 14 | 50 | 85.7 | 18.6 | 12.0 | 0.05 | 22 | ○○○ |
| | 100 | 4.0 | 21 | 50 | 71.4 | 7.1 | 15.0 | 0.02 | | ○○○ |
| Example 36 | 170 | 4.1 | 14 | 50 | 85.7 | 18.6 | 12.0 | 0.05 | 25 | ○○○ |
| | 170 | 4.1 | 14 | 50 | 35.7 | −21.4 | 5.0 | 0.05 | | ○○○ |
| | 100 | 4.0 | 21 | 50 | 71.4 | 7.1 | 15.0 | 0.02 | | ○○○ |
| Example 37 | 220 | 3.9 | 11 | 50 | 109.1 | 37.3 | 12.0 | 0.09 | 70 | ○ |
| | 220 | 3.9 | 11 | 50 | 136.4 | 59.1 | 15.0 | 0.10 | | ○ |
| Comparative Example 5 | 220 | 3.9 | 11 | 50 | 181.8 | 95.5 | 20.0 | 0.13 | 122 | X |
| | 220 | 3.9 | 11 | 50 | 209.1 | 117.3 | 23.0 | 0.14 | | X |
| Comparative Example 6 | 220 | 3.9 | 11 | 50 | 181.8 | 95.5 | 20.0 | 0.13 | 132 | X |
| | 220 | 3.9 | 11 | 50 | 181.8 | 95.5 | 20.0 | 0.13 | | X |
| | 220 | 3.9 | 11 | 50 | 209.1 | 117.3 | 23.0 | 0.14 | | X |
| Comparative Example 7 | 220 | 3.9 | 11 | 50 | 181.8 | 95.5 | 20.0 | 0.13 | 111 | X |
| | 220 | 3.9 | 11 | 50 | 209.1 | 117.3 | 23.0 | 0.14 | | X |
| Comparative Example 8 | 220 | 3.9 | 11 | 50 | 181.8 | 95.5 | 20.0 | 0.13 | 115 | X |
| | 220 | 3.9 | 11 | 50 | 181.8 | 95.5 | 20.0 | 0.13 | | X |
| | 220 | 3.9 | 11 | 50 | 209.1 | 117.3 | 23.0 | 0.14 | | X |

TABLE 3

| | Optical film | | | | | Pressure-sensitive adhesive layer Pressure-sensitive adhesive | | | |
|---|---|---|---|---|---|---|---|---|---|
| | Type | Thickness (μm) | Haze (%) | Reflectance (%) | Remark | Type | Acryl-based polymer type | Weight average molecular weight (×10,000) | Degree of dispersion |
| Example 38 | 40TAC | 40 | 0.3 | 4.1 | — | (1) | A | 170 | 4.1 |
| Example 39 | 40TAC | 40 | 0.3 | 4.1 | — | (9) | A | 170 | 4.1 |
| Example 40 | 40TAC | 40 | 0.3 | 4.1 | — | (2) | B | 220 | 3.9 |
| Example 41 | 40TAC | 40 | 0.3 | 4.1 | — | (2) | B | 220 | 3.9 |
| Example 42 | 40TAC | 40 | 0.3 | 4.1 | — | (2) | B | 220 | 3.9 |
| Example 43 | 40TAC | 40 | 0.3 | 4.1 | — | (3) | C | 70 | 5 |
| Example 44 | 40TAC | 40 | 0.3 | 4.1 | — | (4) | D | 100 | 4 |
| Example 45 | 40TAC | 40 | 0.3 | 4.1 | — | (5) | E | 50 | 4.8 |
| Example 46 | 40TAC | 40 | 0.3 | 4.1 | — | (6) | F | — | — |
| Example 47 | 80TAC | 80 | 0.3 | 4.0 | — | (4) | D | 100 | 4 |
| Example 48 | 60TAC | 60 | 0.3 | 4.0 | — | (4) | D | 100 | 4 |
| Example 49 | 40TAC | 40 | 0.3 | 4.1 | — | (4) | D | 100 | 4 |
| Example 50 | 30ACRYL | 30 | 0.2 | 4.0 | — | (4) | D | 100 | 4 |
| Example 51 | 40TAC | 40 | 14 | — | *1 | (4) | D | 100 | 4 |
| Example 52 | 40TAC | 40 | 0.3 | 1.1 | *2 | (4) | D | 100 | 4 |
| Comparative Example 9 | 40TAC | 40 | 0.3 | 4.1 | — | (2) | B | 220 | 3.9 |
| Comparative Example 10 | 80TAC | 80 | 0.3 | 4.0 | — | (2) | B | 220 | 3.9 |
| Comparative Example 11 | 40TAC | 40 | 0.3 | 4.1 | — | (8) | G | 200 | 3 |
| Comparative Example 12 | 40TAC | 40 | 0.3 | 4.1 | — | (7) | A | 170 | 4.1 |
| Comparative Example 13 | 40TAC | 40 | 0.3 | 4.1 | — | (9) | A | 170 | 4.1 |

| | Pressure-sensitive adhesive layer | | | | | | Evaluations | | |
|---|---|---|---|---|---|---|---|---|---|
| | Pressure-sensitive adhesive coating liquid | | | | Pressure-sensitive adhesive layer | | | Unevenness | |
| | Solid concentration (%) | Coating liquid viscosity Y (P) | Coating liquid thickness X (μm) | 0.8X − Y | Thickness (μm) | Standard deviation (μm) | ISC value | Visual check (observation from film side) | Visual check (observation through acrylic plate) |
| Example 38 | 15 | 65 | 134.0 | 42.2 | 20.1 | 0.10 | 60 | ⊙⊙ | ⊙⊙ |
| Example 39 | 14 | 50 | 144.3 | 65.4 | 20.2 | 0.10 | 80 | ○ | ○ |
| Example 40 | 12 | 88 | 191.7 | 65.3 | 23.0 | 0.10 | 55 | ⊙⊙ | — |
| Example 41 | 11 | 50 | 136.4 | 59.1 | 15.0 | 0.04 | 50 | ⊙⊙ | ⊙⊙ |
| Example 42 | 13 | 132 | 176.9 | 9.5 | 23.0 | 0.06 | 35 | ⊙⊙⊙ | — |
| Example 43 | 29 | 44 | 80.0 | 20.0 | 23.2 | 0.03 | 20 | ⊙⊙⊙ | — |
| Example 44 | 21 | 50 | 110.0 | 38.0 | 23.1 | 0.03 | 25 | ⊙⊙⊙ | — |
| Example 45 | 30 | 25 | 99.7 | 54.7 | 29.9 | 0.05 | 30 | ⊙⊙⊙ | — |
| Example 46 | 38 | 10 | 60.8 | 38.6 | 23.1 | 0.03 | 20 | ⊙⊙⊙ | ⊙⊙⊙ |
| Example 47 | 21 | 50 | 110.0 | 38.0 | 23.1 | 0.03 | 52 | ⊙⊙ | ⊙⊙ |
| Example 48 | 21 | 50 | 110.0 | 38.0 | 23.1 | 0.03 | 45 | ⊙⊙ | ⊙⊙ |
| Example 49 | 21 | 50 | 110.0 | 38.0 | 23.1 | 0.03 | 25 | ⊙⊙⊙ | ⊙⊙⊙ |
| Example 50 | 21 | 50 | 110.0 | 38.0 | 23.1 | 0.03 | 20 | ⊙⊙⊙ | ⊙⊙⊙ |
| Example 51 | 21 | 50 | 110.0 | 38.0 | 23.1 | 0.03 | 20 | ⊙⊙⊙ | ⊙⊙⊙ |
| Example 52 | 21 | 50 | 110.0 | 38.0 | 23.1 | 0.03 | 20 | ⊙⊙⊙ | ⊙⊙⊙ |
| Comparative Example 9 | 11 | 50 | 210.9 | 118.7 | 23.2 | 0.13 | 110 | X | X |
| Comparative Example 10 | 11 | 50 | 210.9 | 118.7 | 23.2 | 0.13 | 130 | X | X |
| Comparative Example 11 | 13 | 50 | 181.5 | 95.2 | 23.6 | 0.17 | 120 | X | X |
| Comparative Example 12 | 13 | 35 | 162.3 | 94.8 | 21.1 | 0.14 | 100 | X | X |
| Comparative Example 13 | 13 | 35 | 153.8 | 88.1 | 20.0 | 0.14 | 90 | X | X |

DESCRIPTION OF REFERENCE SIGNS

1 Optical film
2 Pressure-sensitive adhesive layer
A Polarizing plate
B Retardation plate
C Surface treatment film
a Polarizer
b1 First transparent protective film
b2 Second transparent protective film
10 Thin high-performance polarizing film
11 Resin substrate
12 PVA-type resin layer
13 Laminate film
14 Dyeing solution containing dichroic material 14'
15 Aqueous boric acid solution
16 Roll type stretching apparatus having a plurality of sets of rollers different in circumferential speed
(A) Manufacturing process of laminate film including resin substrate and PVA resin layer
(B) Dyeing process
(C) Crosslinking process
(D) Stretching process
(E) Crosslinking process before dyeing process
(F) Crosslinking process before stretching process (D)
(G) Cleaning process
(H) Drying process
(I) Transferring process

The invention claimed is:

1. A method for producing a pressure-sensitive adhesive optical film comprising an optical film and a pressure-sensitive adhesive layer provided on the optical film, the method comprising the steps of:
   (1A) applying a pressure-sensitive adhesive coating liquid with a viscosity Y (P) to the optical film to form a coating with a thickness X (μm); and
   (2A) drying the applied pressure-sensitive adhesive coating liquid to form a pressure-sensitive adhesive layer,
   wherein the viscosity Y of the pressure-sensitive adhesive coating liquid and the thickness X of the coating satisfy the relation $0.8X-Y \leq 68$,
   wherein the pressure-sensitive adhesive coating liquid has a thickness X (μm) of 20 to 250 μm,
   wherein the pressure-sensitive adhesive coating liquid has a viscosity Y (P) of 2 to 160 P,
   wherein the pressure-sensitive adhesive layer has a thickness (μm) standard deviation of 0.12 μm or less, and
   wherein the pressure-sensitive adhesive coating liquid is a water-based or aqueous dispersion pressure-sensitive adhesive containing a (meth)acryl-based polymer having a weight average molecular weight in the range of 1,400,000 to 3,000,000.

2. The method for producing a pressure-sensitive adhesive optical film according to claim 1, wherein
   the optical film is a polarizing plate comprising a polarizer and a first transparent protective film provided on one side of the polarizer or first and second transparent protective films provided on both sides of the polarizer,
   the first transparent protective film has a haze value of 15% or less, and
   the pressure-sensitive adhesive layer is provided on a side of the polarizing plate opposite to a side where the first transparent protective film is provided.

3. The method for producing a pressure-sensitive adhesive optical film according to claim 2, wherein the first transparent protective film has a thickness of 60 μm or less.

4. The method for producing a pressure-sensitive adhesive optical film according to claim 2, wherein the polarizing plate has first and second transparent protective films on both sides of the polarizer, and at least one of the first and second transparent protective films has a thickness of 60 μm or less.

5. The method for producing a pressure-sensitive adhesive optical film according to claim 2, wherein the polarizer has a thickness of 10 μm or less.

6. The method for producing a pressure-sensitive adhesive optical film according to claim 1, wherein the optical film is a retardation plate.

7. The method for producing a pressure-sensitive adhesive optical film according to claim 6, wherein the retardation plate has a thickness of 60 μm or less.

8. The method for producing a pressure-sensitive adhesive optical film according to claim 1, wherein the optical film has a haze value of 15% or less.

9. The method for producing a pressure-sensitive adhesive optical film according to claim 8, wherein the optical film is intended to be bonded to a front face plate or a touch panel.

10. The method for producing a pressure-sensitive adhesive optical film according to claim 8, wherein the optical film has a thickness of 60 μm or less.

11. The method for producing a pressure-sensitive adhesive optical film according to claim 8, wherein the optical film is a surface treatment film.

12. The method for producing a pressure-sensitive adhesive optical film according to claim 1, wherein the pressure-sensitive adhesive coating liquid has a viscosity Y (P) of 2 to 100.

13. The method for producing a pressure-sensitive adhesive optical film according to claim 1, wherein the pressure-sensitive adhesive coating liquid has a viscosity Y (P) of 5 to 50.

14. The method for producing a pressure-sensitive adhesive optical film according to claim 1, wherein the pressure-sensitive adhesive coating liquid has a viscosity Y (P) of 10 to 40.

15. A method for producing a pressure-sensitive adhesive optical film comprising an optical film and a pressure-sensitive adhesive layer provided on the optical film, the method comprising the steps of:
   (1B) applying a pressure-sensitive adhesive coating liquid with a viscosity Y (P) to a release film to form a coating with a thickness X (μm);
   (2B) drying the applied pressure-sensitive adhesive coating liquid to form a pressure-sensitive adhesive layer; and
   (3) bonding the pressure-sensitive adhesive layer, which is formed on the release film, to the optical film,
   wherein the viscosity Y of the pressure-sensitive adhesive coating liquid and the thickness X of the coating satisfy the relation $0.8X-Y \leq 68$,
   wherein the pressure-sensitive adhesive coating liquid has a thickness X (μm) of 20 to 250 μm,
   wherein the pressure-sensitive adhesive coating liquid has a viscosity Y (P) of 2 to 160 P,
   wherein the pressure-sensitive adhesive layer has a thickness (μm) standard deviation of 0.12 μm or less, and
   wherein the pressure-sensitive adhesive coating liquid is a water-based or aqueous dispersion pressure-sensitive adhesive containing a (meth)acryl-based polymer having a weight average molecular weight in the range of 1,400,000 to 3,000,000.

16. The method for producing a pressure-sensitive adhesive optical film according to claim 15, wherein
the optical film is a polarizing plate comprising a polarizer and a first transparent protective film provided on one side of the polarizer or first and second transparent protective films provided on both sides of the polarizer,
the first transparent protective film has a haze value of 15% or less, and
the pressure-sensitive adhesive layer is provided on a side of the polarizing plate opposite to a side where the first transparent protective film is provided.

17. The method for producing a pressure-sensitive adhesive optical film according to claim 16, wherein the first transparent protective film has a thickness of 60 μm or less.

18. The method for producing a pressure-sensitive adhesive optical film according to claim 16, wherein the polarizing plate has first and second transparent protective films on both sides of the polarizer, and at least one of the first and second transparent protective films has a thickness of 60 μm or less.

19. The method for producing a pressure-sensitive adhesive optical film according to claim 16, wherein the polarizer has a thickness of 10 μm or less.

20. The method for producing a pressure-sensitive adhesive optical film according to claim 15, wherein the optical film is a retardation plate.

21. The method for producing a pressure-sensitive adhesive optical film according to claim 20, wherein the retardation plate has a thickness of 60 μm or less.

22. The method for producing a pressure-sensitive adhesive optical film according to claim 15, wherein the optical film has a haze value of 15% or less.

23. The method for producing a pressure-sensitive adhesive optical film according to claim 22, wherein the optical film is intended to be bonded to a front face plate or a touch panel.

24. The method for producing a pressure-sensitive adhesive optical film according to claim 22, wherein the optical film has a thickness of 60 μm or less.

25. The method for producing a pressure-sensitive adhesive optical film according to claim 22, wherein the optical film is a surface treatment film.

26. A method for producing a pressure-sensitive adhesive optical film comprising at least two optical films and at least two pressure-sensitive adhesive layers alternately laminated, the method comprising the steps of:
applying a pressure-sensitive adhesive coating liquid with a viscosity Y (P) to a first one of said at least two optical films to form a first coating with a first thickness $X_1$ (μm); and
drying the applied pressure-sensitive adhesive coating liquid to form a first one of said at least two pressure-sensitive adhesive layers,
applying the pressure-sensitive adhesive coating liquid with the viscosity Y (P) to a second one of said at least two optical films to form a second coating with a second thickness $X_2$ (μm); and
drying the applied pressure-sensitive adhesive coating liquid to form a second one of said at least two pressure-sensitive adhesive layers,
wherein the viscosity Y of the pressure-sensitive adhesive coating liquid and the first thickness $X_1$ of the first coating satisfy the relation $0.8X_1-Y \leq 68$,
wherein the viscosity Y of the pressure-sensitive adhesive coating liquid and the second thickness $X_2$ of the second coating satisfy the relation $0.8X_2-Y \leq 68$,
wherein the pressure-sensitive adhesive coating liquid of the first coating has the first thickness $X_1$ (μm) of 20 to 250 μm and the pressure-sensitive adhesive coating liquid of the second coating has the second thickness $X_2$ (μm) of 20 to 250 μm,
wherein the pressure-sensitive adhesive coating liquid has a viscosity Y (P) of 2 to 160 P,
wherein at least one of the pressure-sensitive adhesive layers has a thickness (μm) standard deviation of 0.12 μm or less, and
wherein the pressure-sensitive adhesive coating liquid is a water-based or aqueous dispersion pressure-sensitive adhesive containing a (meth)acryl-based polymer having a weight average molecular weight in the range of 1,400,000 to 3,000,000.

27. The method for producing a pressure-sensitive adhesive optical film according to claim 26, wherein each of the at least two pressure-sensitive adhesive layers has a thickness (μm) standard deviation of 0.12 μm or less.

28. The method for producing a pressure-sensitive adhesive optical film according to claim 26, wherein one of the optical films is a polarizing plate comprising a polarizer and a first transparent protective film provided on one side of the polarizer or first and second transparent protective films provided on both sides of the polarizer,
the first transparent protective film has a haze value of 15% or less, and
the pressure-sensitive adhesive layer is provided on a side of the polarizing plate opposite to a side where the first transparent protective film is provided.

29. The method for producing a pressure-sensitive adhesive optical film according to claim 28, wherein the first transparent protective film has a thickness of 60 μm or less.

30. The method for producing a pressure-sensitive adhesive optical film according to claim 28, wherein the polarizing plate has first and second transparent protective films on both sides of the polarizer, and at least one of the first and second transparent protective films has a thickness of 60 μm or less.

31. The method for producing a pressure-sensitive adhesive optical film according to claim 28, wherein the polarizer has a thickness of 10 μm or less.

32. The method for producing a pressure-sensitive adhesive optical film according to claim 26, wherein one of the optical films is a polarizing plate comprising a polarizer and a first transparent protective film provided on one side of the polarizer or first and second transparent protective films provided on both sides of the polarizer,
the first transparent protective film has a haze value of 15% or less,
the pressure-sensitive adhesive layer is provided on a side of the polarizing plate opposite to a side where the first transparent protective film is provided, and
at least one of the other optical film or films is a retardation plate.

33. The method for producing a pressure-sensitive adhesive optical film according to claim 32, wherein the retardation plate has a thickness of 60 μm or less.

34. The method for producing a pressure-sensitive adhesive optical film according to claim 26, wherein the pressure-sensitive adhesive coating liquid has a viscosity Y (P) of 2 to 100.

35. The method for producing a pressure-sensitive adhesive optical film according to claim 26, wherein the pressure-sensitive adhesive coating liquid has a viscosity Y (P) of 5 to 50.

36. The method for producing a pressure-sensitive adhesive optical film according to claim 26, wherein the pressure-sensitive adhesive coating liquid has a viscosity Y (P) of 10 to 40.

37. A method for producing a pressure-sensitive adhesive optical film comprising at least two optical films and at least two pressure-sensitive adhesive layers alternately laminated, the method comprising the steps of:

applying a pressure-sensitive adhesive coating liquid with a viscosity Y (P) to a release film to form a coating with a thickness X (μm);

drying the applied pressure-sensitive adhesive coating liquid to form a pressure-sensitive adhesive layer; and bonding the pressure-sensitive adhesive layer, which is formed on the release film, to at least one of the at least two optical films, wherein the viscosity Y of the pressure-sensitive adhesive coating liquid and the thickness X of the coating satisfy the relation $0.8X-Y \leq 68$, wherein the pressure-sensitive adhesive coating liquid has a thickness X (μm) of 20 to 250 μm, wherein the pressure-sensitive adhesive coating liquid has a viscosity Y (P) of 2 to 160 P, wherein at least one of the pressure-sensitive adhesive layer has a thickness (μm) standard deviation of 0.12 μm or less, and wherein the pressure-sensitive adhesive coating liquid is a water-based or aqueous dispersion pressure-sensitive adhesive containing a (meth)acryl-based polymer having a weight average molecular weight in the range of 1,400,000 to 3,000,000.

38. The method for producing a pressure-sensitive adhesive optical film according to claim 37, wherein each of the at least two pressure-sensitive adhesive layers has a thickness (μm) standard deviation of 0.12 μm or less.

39. The method for producing a pressure-sensitive adhesive optical film according to claim 37, wherein one of the optical films is a polarizing plate comprising a polarizer and a first transparent protective film provided on one side of the polarizer or first and second transparent protective films provided on both sides of the polarizer, the first transparent protective film has a haze value of 15% or less, and the pressure-sensitive adhesive layer is provided on a side of the polarizing plate opposite to a side where the first transparent protective film is provided.

40. The method for producing a pressure-sensitive adhesive optical film according to claim 39, wherein the first transparent protective film has a thickness of 60 μm or less.

41. The method for producing a pressure-sensitive adhesive optical film according to claim 39, wherein the polarizing plate has first and second transparent protective films on both sides of the polarizer, and at least one of the first and second transparent protective films has a thickness of 60 μm or less.

42. The method for producing a pressure-sensitive adhesive optical film according to claim 39, wherein the polarizer has a thickness of 10 μm or less.

43. The method for producing a pressure-sensitive adhesive optical film according to claim 37, wherein one of the optical films is a polarizing plate comprising a polarizer and a first transparent protective film provided on one side of the polarizer or first and second transparent protective films provided on both sides of the polarizer, the first transparent protective film has a haze value of 15% or less, the pressure-sensitive adhesive layer is provided on a side of the polarizing plate opposite to a side where the first transparent protective film is provided, and at least one of the other optical film or films is a retardation plate.

44. The method for producing a pressure-sensitive adhesive optical film according to claim 43, wherein the retardation plate has a thickness of 60 μm or less.

* * * * *